United States Patent
Novek

(10) Patent No.: US 10,759,669 B2
(45) Date of Patent: Sep. 1, 2020

(54) SYSTEMS AND METHODS FOR BASIC GAS RECOVERY, ACID GAS SEPARATION, OR COMBINATION THEREOF

(71) Applicant: Ethan J. Novek, Greenwich, CT (US)

(72) Inventor: Ethan J. Novek, Greenwich, CT (US)

(*) Notice: Subject to any disclaimer, the term of this patent is extended or adjusted under 35 U.S.C. 154(b) by 0 days.

(21) Appl. No.: 16/548,240

(22) Filed: Aug. 22, 2019

(65) Prior Publication Data

US 2020/0087154 A1 Mar. 19, 2020

Related U.S. Application Data

(63) Continuation of application No. 16/258,311, filed on Jan. 25, 2019, now Pat. No. 10,427,948.

(60) Provisional application No. 62/772,177, filed on Nov. 28, 2018, provisional application No. 62/726,503, filed on Sep. 4, 2018.

(51) Int. Cl.
| | | |
|---|---|---|
| *B01D 53/14* | (2006.01) | |
| *B01D 53/22* | (2006.01) | |
| *B01D 61/02* | (2006.01) | |
| *C01C 1/12* | (2006.01) | |

(52) U.S. Cl.
CPC ............ *C01C 1/12* (2013.01); *B01D 53/1418* (2013.01); *B01D 53/1468* (2013.01); *B01D 53/1475* (2013.01); *B01D 53/1493* (2013.01); *B01D 53/229* (2013.01); *B01D 61/025* (2013.01); *B01D 53/1462* (2013.01); *B01D 2251/2067* (2013.01); *B01D 2252/102* (2013.01); *B01D 2257/406* (2013.01); *B01D 2257/504* (2013.01)

(58) Field of Classification Search
CPC .................................................. B01D 53/1475
See application file for complete search history.

(56) References Cited

U.S. PATENT DOCUMENTS

| | | |
|---|---|---|
| 5,139,764 A | 8/1992 | Szekely |
| 6,027,552 A | 2/2000 | Ruck et al. |
| 6,187,278 B1 | 2/2001 | Brown et al. |
| 7,866,638 B2 * | 1/2011 | Neumann .......... B01D 53/1475 239/594 |
| 9,463,410 B2 | 10/2016 | Bockman et al. |

(Continued)

OTHER PUBLICATIONS

Chen et al., "CO2 Capture and Crystallization of Ammonia Bicarbonate in a Lab-Scale Scrubber", Scrubber vol. 8 (1), No. 39 (2018). D0110.3390/cryst8010039, p. 11, fig. 13 [Cited in Parent U.S. Appl. No. 16/258,311, filed Jan. 25, 2019].

(Continued)

*Primary Examiner* — Cabrena Holecek
(74) *Attorney, Agent, or Firm* — Gregory L. Porter; Hunton Andrews Kurth LLP

(57) ABSTRACT

The present invention relates to processes and systems for basic gas, e.g., ammonia, recovery and/or acid-gas separation. In some embodiments, a system for acid gas separation may be integrated with an ammonia abatement cycle employing a high temperature absorber. In some embodiments, a system for acid gas separation may employ a higher temperature absorber due to the lower energy consumption and cost of the integrated ammonia abatement cycle. Advantageously, heat may be recovered from the absorber to power at least a portion of any acid gas desorption in the process. Reverse osmosis or other membranes may be employed.

9 Claims, 18 Drawing Sheets

(56) References Cited

U.S. PATENT DOCUMENTS

| | | |
|---|---|---|
| 2010/0064889 A1 | 3/2010 | Gal |
| 2011/0100218 A1 | 5/2011 | Wolfe |
| 2011/0272365 A1 | 11/2011 | Defosse et al. |
| 2013/0098242 A1 | 4/2013 | Ungerank et al. |
| 2013/0333568 A1 | 12/2013 | Bockman et al. |
| 2016/0288050 A1 | 10/2016 | Dube |
| 2019/0071338 A1* | 3/2019 | Bassani ............... C01C 1/26 |

OTHER PUBLICATIONS

Int'l Search Report & Written Opinion (PCT/US2019/015262), dated Jun. 20, 2019 [Cited in Parent U.S. Appl. No. 16/258,311, filed Jan. 25, 2019].

Darde et al, "CO2 capture using aqueous ammonia: kinetic study and process simulation", 4 Energy Procedia '2011), pp. 1443-1450 [Cited in Parent U.S. Appl. No. 16/258,311, filed Jan. 25, 2019].

* cited by examiner

SYSTEMS AND METHODS FOR BASIC GAS RECOVERY, ACID GAS SEPARATION, OR COMBINATION THEREOF

CROSS-REFERENCE TO RELATED APPLICATIONS

The instant application claims priority to the following provisional applications wach of which is incorporated by reference for U.S. purposes: U.S. Ser. Nos. 62/622,528 filed Jan. 26, 2018; 62/648,549 filed Mar. 27, 2018; 62/670,124 filed May 11, 2018; 62/684,085 filed Jun. 12, 2018; 62/684,796 filed Jun. 14, 2018; 62/686,749 filed Jun. 19, 2018; 62/713,711 filed Aug. 2, 2018; 62/726,503 filed Sep. 4, 2018; and 62/772,177 filed Nov. 28, 2018.

BACKGROUND AND SUMMARY OF INVENTION

Conventional steam stripper ammonia abatement cycles suffer from a number of deficiencies. These deficiencies include, for example, relatively high energy requirements, slow reaction kinetics, and large absorber requirements to name just a few. It would be advantageous if new systems and methods could be developed which required less energy, had faster reaction kinetics, and smaller absorber requirements. The embodiments described herein solve many of the aforementioned deficiencies and offer their own advantages as well.

In one embodiment the invention pertains to a process for separating or recovering basic gases comprising first absorbing ammonia from an ammonia containing gas stream into an ammonia-lean solution, forming an ammonia-rich solution. The ammonia rich solution is enriched with one or more acid gases. One or more ammonia-acid gas salts are precipitated before enriching, during enriching, after enriching, or a combination thereof. In a second embodiment the invention pertains to a process for separating or recovering basic gases comprising first absorbing ammonia from an ammonia containing gas stream into an ammonia-lean, an ammonia-ultra-lean, or ammonia-free solution, to form an ammonia-rich solution. The ammonia-rich solution is enriched with one or more acid gases to form an ammonia-rich, acid gas rich solution. The ammonia-rich, acid gas rich solution is concentrated using one or more membranes to form a retentate and a permeate. The permeate is suitable for use as at least a portion of the ammonia-ultra-lean or ammonia-free solution.

A third embodiment pertains to an integrated process for separating or recovering basic gases comprising a first cycle and a second cycle. The first cycle comprised absorbing ammonia from an ammonia containing gas stream into an ammonia-lean solution, forming an ammonia-rich solution; enriching said ammonia rich solution with one or more acid gases; precipitating one or more ammonia-acid gas salts wherein said precipitating occurs before enriching, during enriching, after enriching, or a combination thereof; and separating said precipitate from any remaining liquid. The second cycle comprises (a) absorbing ammonia from an ammonia containing gas stream into an ammonia-lean, an ammonia-ultra-lean, or ammonia-free solution, to form an ammonia-rich solution; (b) enriching said ammonia-rich solution with one or more acid gases to form an ammonia-rich, acid gas rich solution; and (c) concentrating said ammonia-rich, acid gas rich solution using one or more membranes to form a retentate and a permeate wherein said permeate is suitable for use as at least a portion of the ammonia-ultra-lean or ammonia-free solution in step (a) of the second cycle.

DETAILED DESCRIPTION

Example Terms and Example Definitions

Figure 1:
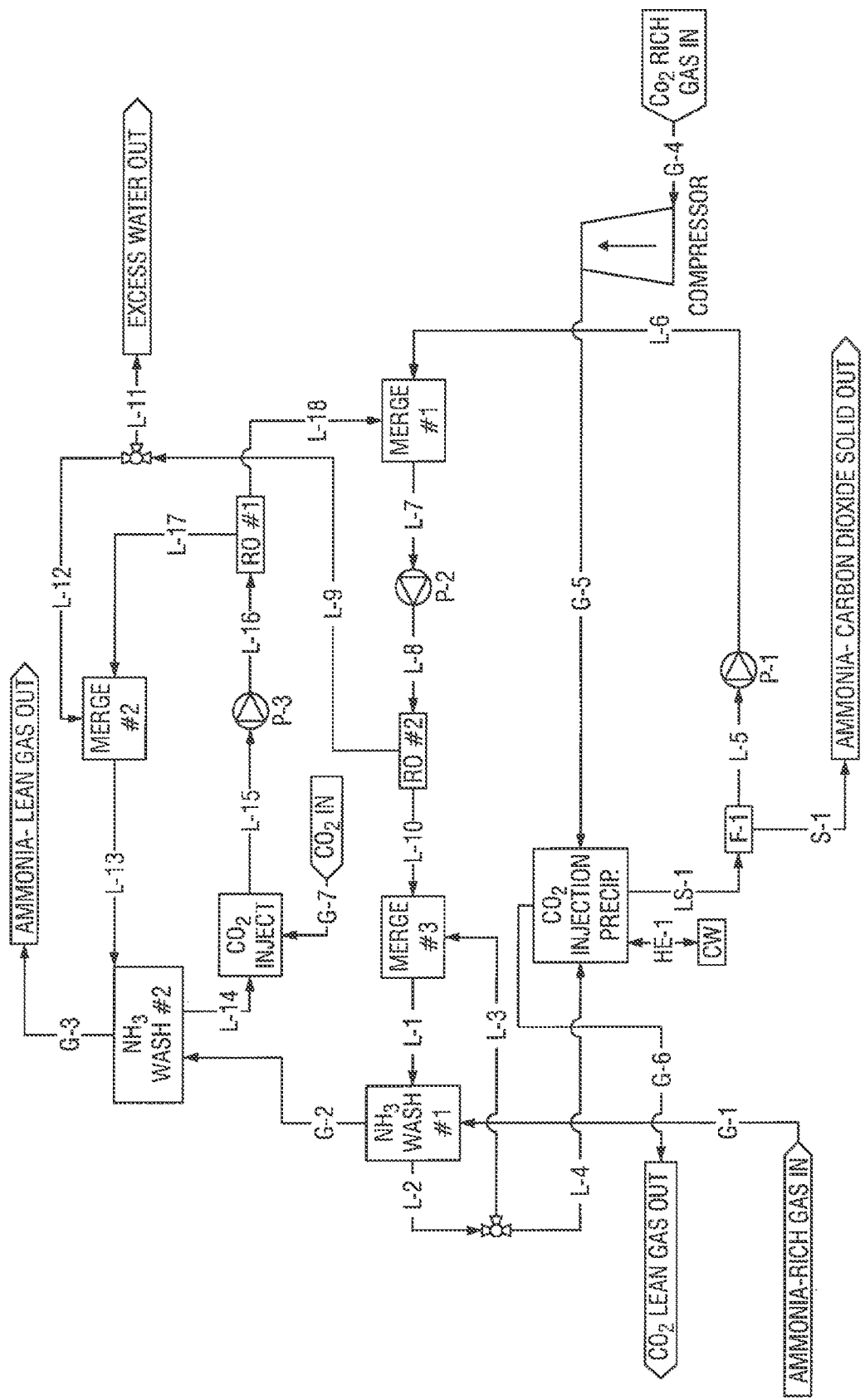
FIG. 1: The present embodiment pertains to a system for ammonia removal or separation from ammonia gas, liquid, solid, or combination thereof streams.

"basic gas", "volatile basic chemicals": Basic chemicals may comprise one or more or a combination of compounds which form a basic pH solution when dissolved in a one or more or a combination of solvents. Volatile basic chemicals may comprise basic chemicals which exhibit a vapor pressure when dissolved in solution or as an independent liquid or a combination thereof under one or more conditions. Basic gases may also include urea, even though urea may not be necessarily basic in solution or may or may not be in the gas phase. Urea may be a component of gas streams containing one or more basic gases and may be treated or recovered, including, but not limited to, using one or more methods described herein.

"acid gas". "volatile acidic chemicals": Acidic chemicals may comprise one or more or a combination of compounds which form an acidic pH solution when dissolved in a one or more or a combination of solvents. Volatile acidic chemicals may comprise acidic chemicals which exhibit a vapor pressure when dissolved in solution or as an independent liquid or a combination thereof under one or more conditions.

"ammonia laden gas or liquid stream", "ammonia containing streams": May comprise a gas or liquid stream which contains at least a portion of ammonia or other basic gas(es) or a combination thereof.

"ammonia-rich gas stream or liquid stream": May comprise gas or liquid stream with a greater concentration of ammonia or other basic gas(es) or a combination thereof relative to one or more gas or liquid streams in the same process or section of a process or steps of a process or combination thereof.

"wash solutions": Wash solutions may comprise liquids which may be employed to absorb ammonia or other basic gas(es) or other gases or a combination thereof. Wash solutions may be regenerable, releasing or regenerating absorbed reagents in one or more forms using, for example, systems and methods described herein.

"precipitated ammonia-acid gas solid", "ammonia-carbon dioxide-water [or other reversible anion]", "ammonia-carbon dioxide solid (or other reversible anion or acid gas)": May comprise the solid precipitate forming before, during, or after, or a combination thereof acid gas enriching within, for example, one or more ammonia abatement cycles described herein. Said solid may contain other reacted basic gases than ammonia or a combination of basic gases. Said solid may desirably be reversible or thermally reversible or may be the desired form employed in one or more connected processes (for example: acid gas removal).

"absorbing", "enriching": Absorbing or enriching may involve the dissolution of one or more reagents into a solution. Absorbing or enriching may involve dissolving one or more acid gases or basic gases of one or more different phases into a liquid phase. Absorbing or enriching may involve absorbing acid gases or basic gases of one or more of the same forms (e.g. liquid-liquid), however it may require employing one or more vapor gap membranes or other separatory means. Absorbing or enriching may involve absorbing acid gases or basic gases in the form of liquid or supercritical acid gases or basic gases. Enriching may be employed in the context of, for example, ammonia abatement cycles described herein to show one of the primary purposes of a process step may be to increase the concentration of, for example, acid gas in a solution, rather than to separate said acid gas from one or more other gases. Absorbing may indicate the separation of one or more gases from one or more other gases or the separation of one or more gases from a gas mixture.

"system conditions", "changing system conditions": May involve, including, but not limited to, one or more or a combination of the following: cooling, heating, changing the concentration of one or more reagents, changing the concentration of one or more reagents using a membrane based process, anti-solvent dissolution, introducing new reversible reagents, radiation change, magnetism change, polarity swing, radiation, electromagnetic radiation, light, or solventing out "wash process element": A wash process element may comprise one or more process steps or unit operations for absorbing. In the context of some embodiments described herein, it may be referring to the one or more unit operations employed to absorb ammonia or other basic gases or a combination thereof from one or more gas streams.

"wash process elements and associated reagent cycles", "wash process element cycles", "wash cycle", "associated reagent cycles": May refer to a wash process element and connected process elements which regenerate or which enable the regeneration and/or function of said wash process element.

"bulk", "relatively bulk ammonia absorption": Bulk absorption may involve the absorption of a large proportion of the ammonia or other basic gases or acid gases or a combination thereof from one or more gas or liquid streams relative to the total ammonia or other basic gases or acid gases or a combination thereof in said one or more gas or liquid streams. A large proportion may comprise greater than 10%, or greater than 20%, or greater than 30%, or greater than 40%, or greater than 50%, or greater than 60%, or greater than 70%, or greater than 80%, or greater than 90%, or greater than 95%, or a combination thereof.

"residual", "resident", "resident reagent": May comprise reagents which are remain present in one or more phases within the process, intentionally or unintentionally. Residual reagents may comprise, for example, one or more reagents in the liquid phase of the ammonia abatement cycle which may be present in solution to, for example, reduce the solubility of one or more ammonia-acid gas salts. An example of said residual reagents may comprise, for example, including, but not limited to, non-volatile organic compounds, organic compounds with a molecular weight below the molecular weight cutoff of one or more membranes or a combination thereof.

"partially absorbed": May involve absorbing only a portion of the one or more reagents from one or more streams. May involve separating one or more reagents from one or more streams wherein, for example, only a portion of one or more reagents are separated. May involve absorbing one or more gases from a gas mixture, wherein, following absorption, a portion of said one or more gases absorbed from said gas mixture may be present in the one or more exiting gas streams.

"significant portion absorbed", "substantially absorbed": May involve absorbing a large proportion of one or more reagents in one or more streams. A large proportion may comprise greater than 10%, or greater than 20%, or greater than 30%, or greater than 40%, or greater than 50%, or greater than 60%, or greater than 70%, or greater than 80%, or greater than 90%, or greater than 95%, or a combination thereof.

"membrane separation process elements", "membrane based process": May comprise one or more membrane separation processes described herein. May include other unit operations related to or required for the operation of said membrane separation processes (for example, may include, but are not limited to, one or more or a combination of the following: pumps, piping, energy recovery equipment, draw solution, feed solution, permeate solution, concentrate solution).

"concentrate", "dewater", "partially dewater": May comprise increasing the concentration of one or more reagents relative to one or more other related streams. For example, may involve increasing the concentration of one or more solutes in a feed solution by employing one or more membrane based processes to form a solution more concentrated in one or more solutes and a permeate solution without or with a limited concentration of one or more of said solutes. The permeate solution may contain water.

"concentrate", "concentrate liquid", "retentate", "concentrate stream", "concentrate liquid", "concentrate solution", "retentate stream", "retentate liquid", "retentate solution": May comprise a solution or other phase composition which results from increasing the concentration of one or more solutes in a solution using one or more membrane based processes. For example, in a reverse osmosis process, these words may refer to the solution or solutions which may have a higher concentration of one or more solutes than the one or more solutions entering the reverse osmosis process.

"permeate", "permeate liquid", "permeate solution": May comprise the liquid (or other phase) reagents resulting from one or more membrane based concentrating steps. A permeate solution may contain a low concentration of or nearly complete absence of one or more reagents which may have been present in the one or more feed solutions entering said one or more membrane based concentrating steps.

"permeate equivalent": Permeate equivalent may comprise a liquid (or other phase) which may comprise similar or the same composition or characteristics as the one or more permeates in one or more steps of one or more embodiments. Permeate equivalent may be, for example, added to one or more process steps, when, for example, there may not be sufficient permeate available to operate one or more process steps (for example: when starting up one or more processes, one or more reagents employed in steps generally employing permeate may comprise 'permeate equivalent', as said one or more reagents may not have passed through one or more membranes).

"concentrate equivalent": Concentrate equivalent may comprise a liquid (or other phase) which may comprise similar or the same composition or characteristics as the one or more concentrates in one or more steps of one or more embodiments. Concentrate equivalent may be, for example, added to one or more process steps, when, for example, there may not be sufficient concentrate available to operate one or more process steps (for example: when starting up one or more processes, one or more reagents employed in steps generally employing concentrate may comprise 'concentrate equivalent', as said one or more reagents may not have been rejected by one or more membranes).

"the rich presence": May involve the high concentration or high partial pressure of one or more reagents in or in close proximity to something.

"an ammonia-lean gas or liquid stream": May comprise gas or liquid stream with a lower concentration of ammonia or other basic gas(es) or a combination thereof relative to one or more gas or liquid streams in the same process or section of a process or steps of a process or combination thereof.

"ammonia species": May comprise a chemical which may be derived from ammonia or may form ammonia or may reversibly form ammonia or a combination thereof. May also refer to other basic compounds than ammonia, or ammonia, derivatives thereof, or a combination thereof.

"free of ammonia" or "practically free of ammonia" or "ultra-low concentration of ammonia" or "ultra-lean concentration of ammonia": May comprise a solution which contains ammonia at concentrations less than one or more or a combination of the following: 50,000 PPM ammonia, or less than 40,000 PPM ammonia, or less than 35,000 PPM ammonia, or less than 30,000 PPM ammonia, or less than 25,000 PPM ammonia, or less than 20,000 PPM ammonia, or less than 15,000 PPM ammonia, or less than 10,000 PPM ammonia, less than 5,000 PPM ammonia, or less than 2500 PPM ammonia, or less than 1500 PPM ammonia, or less than 1000 PPM ammonia, or less than 500 PPM ammonia, or less than 400 PPM ammonia, or less than 300 PPM ammonia, or less than 200 PPM ammonia, or less than 100 PPM ammonia, or less than 50 PPM ammonia, or less than 25 PPM ammonia, or less than 10 PPM ammonia. For example, some permeate solutions may comprise these solutions.

"RecovAm": May refer to one or more ammonia recovery technologies described herein.

Example Summary and Description (FIG. 1)

The present embodiment may recover ammonia or other volatile basic chemicals from gas or liquid streams containing said ammonia or other volatile basic chemicals. The process may recover ammonia from one or more ammonia laden gas or liquid stream through, for example, absorption of ammonia or other basic chemical in one or more in wash solutions described herein and, for example, the recovery of at least a portion of said absorbed ammonia as a precipitated ammonia-acid gas solid (for example: ammonia-carbon dioxide-water [or other reversible anion]). The ammonia-acid gas solid may be utilized in its existing form or further treated to form, which may include, but are not limited to, one or more or a combination of the following: anhydrous ammonia, aqueous ammonia, ammonium hydroxide, aqua ammonia, ammonium carbamate, urea, a derivative thereof, or a combination thereof.

In principle, the process may comprise recovering ammonia from an ammonia laden stream by 1) absorbing ammonia in a liquid solution, 2) enriching said liquid solution with $CO_2$ or one or more other acid gases, and 3) recovering said ammonia as an ammonia-carbon dioxide solid (or other reversible anion or acid gas) during step '2)' and/or by changing one or more other or additional system conditions before, during, or after, or combination thereof step '2)'. Said changing of one or more system conditions may include, but are not limited to, one or more or a combination of the following: cooling, changing the concentration of one or more reagents, changing the concentration of one or more reagents using a membrane-based process, anti-solvent dissolution, or solventing out. Said solid may be continuously or subsequently separated, returned to the process or application where the ammonia originated (if applicable), or undergo further treatment or use, sold, or a combination thereof.

The present embodiment may comprise additional aspects to enable, for example, including, but not limited to, one or more or a combination of the following: further reduction in energy consumption, greater ammonia removal or absorption efficiency, greater recovery of ammonia, less ammonia losses in gas or liquid streams exiting the process, or minimization or prevention of acid gas losses in gas or liquid streams exiting the process.

The present embodiment may comprise one or more than one wash process element. For example, the present embodiment may comprise two wash process elements and associated reagent cycles, wherein, for example, the first wash process element, $NH_3$ Wash #1, may be employed for relatively bulk ammonia absorption and, for example, the second wash process element, $NH_3$ Wash #2, may be employed for the removal of lower concentration or at least a portion of remaining or residual ammonia.

Example $NH_3$ Wash #1 and $NH_3$ Wash #1 Cycle:

$NH_3$ Wash #1 may involve absorbing relatively significant or proportionally significant amounts of ammonia from an ammonia-rich or laden gas stream or liquid stream or combination thereof. Residual ammonia may remain in the gas or liquid stream following absorption in $NH_3$ Wash #1 Cycle. Said residual ammonia may be partially absorbed, significant portion absorbed, substantially absorbed, or otherwise absorbed in the $NH_3$ Wash #2. The $NH_3$ Wash #1 Cycle may be employed to recover ammonia as, for example, an ammonia-carbon dioxide solid, from ammonia absorbed in $NH_3$ Wash #1 and $NH_3$ Wash #2. The present embodiment may employ further treatment following $NH_3$ Wash #1 and #2, which may, comprise, for example, further removing residual ammonia using one or more or a combination thereof of acid washes or oxidation or destruction processes.

1) $NH_3$ Wash #1 may involve absorbing ammonia from one or more ammonia containing streams in a relatively $CO_2$-rich (or other acid gas rich or combination of acid gases rich), relatively ammonia-lean (or other basic gas rich or combination of acid gases rich) wash solution, forming an ammonia-rich Wash #1 solution. 2) The ammonia-rich Wash #1 solution may be subsequently enriched with $CO_2$ (or one or a combination of acid gases) using, for example, the injection of one or more $CO_2$ containing or acid gas containing gas streams into the ammonia-rich Wash #1 solution. 3) Solid ammonia-carbon dioxide or ammonia-acid gas precipitate may form during or following said enrichment, or due to one or more changes in system conditions, or a combination thereof. 4) Said solid may be at least partially separated from the remaining liquid phase and further employed as described herein. 5) Said remaining liquid phase may comprise a relatively ammonia-lean, $CO_2$-rich solution. 6) Said relatively ammonia-lean, $CO_2$-rich solution is mixed or otherwise combined with a $CO_2$-rich concentrate solution produced by one or more membrane separation process elements of $NH_3$ Wash #2 cycle. 7) Said combined solution may be subsequently concentrated or partially dewatered using a membrane-based process, to, for example, including, but not limited to, remove the water added to $NH_3$ Wash #1 from $NH_3$ Wash #2. Said concentrating or partial dewatering may form one or more concentrate streams and a permeate streams. Said concentrating or partial dewatering may produce a concentrate stream with the ammonia-carbon dioxide from '5)' and most or all of the added ammonia-carbon dioxide species from the $CO_2$-rich concentrate solution produced by the $NH_3$ Wash #2 cycle, and/or a permeate stream comprising water added to the $NH_3$ Wash #1 cycle from the $NH_3$ Wash #2 cycle and additional water absorbed in the $NH_3$ Washes. 8) Said permeate stream may be returned to the $NH_3$ Wash #2 cycle, for example, following the removal of a portion of excess water from said permeate stream or addition of makeup water to make-up for water losses, depending on the state, conditions, and/or water balance of the process. 9) Said concentrate solution may be mixed with a portion of ammonia-rich $NH_3$ Wash #1 solution produced by $NH_3$ Wash #1 to, for example, including, but not limited to, slightly or incrementally increase the molar concentration of $NH_3$ species relative to molar concentration of $CO_2$ species in the relatively ammonia-lean, relatively $CO_2$-rich solution. Said slight molar increase of $NH_3$ species relative to $CO_2$ species may minimize or prevent $CO_2$ or other acid gas losses during one or more washes. Said solution may be employed as said relatively ammonia-lean, relatively $CO_2$-rich solution employed as the ammonia-lean wash solution entering $NH_3$ Wash #1 (from step 1).

Example Further Descriptions of Each Step $NH_3$ Wash #1 and $NH_3$ Wash #1 Cycle:

1) $NH_3$ Wash #1 may involve absorbing ammonia from one or more ammonia containing streams in a relatively $CO_2$-rich (or other acid gas rich or combination of acid gases rich), relatively ammonia-lean (or other basic gas rich or combination of acid gases rich) wash solution, forming an ammonia-rich Wash #1 solution.

$NH_3$ Wash #1 may involve bulk absorption of one or more basic gases, such as ammonia, in a the gas phase (for example: ammonia containing gas stream) or liquid phase (for example: ammonia-laden effluent, waste water). The absorption solution may comprise an ammonia-carbon dioxide or ammonia-acid gas solution.

Multiple benefits may derive from employing said ammonia-carbon dioxide (and/or other acid gas) solution as the ammonia-lean wash solution.

For example, if the gas or liquid stream from which ammonia is separated comprises a mixture of ammonia with a portion of one or more acid gases, the rich presence of one or more dissolved acid gases in the ammonia-lean wash solution may enable relatively selective absorption of ammonia over said one or more acid gases. This may be beneficial in a process where, for example, ammonia or other basic gases may desirably be removed or separated from one or more acid gases. This may be beneficial in a process where, for example, carbon dioxide or other acid gases may desirably be removed or separated from one or more basic gases. This may be beneficial in a process where, for example, specific acid gases may desirably be removed from specific other acid gases and/or separated from one or more basic gases. For example, this may be beneficial in a Urea production process, where it may be desirable to separate a portion ammonia from carbon dioxide or adjust the concentration of ammonia, carbon dioxide, water, or a combination thereof.

For example, the rich presence of carbon dioxide or other acid gas or gases in solution may reduce or suppress the equilibrium partial pressure of ammonia relative to a solution without or with lesser relatively presence or concentration of carbon dioxide or acid gas. This may significantly improve ammonia absorption efficiency, while enabling greater ammonia absorption capacity per a unit mass or volume of solution. Additionally, the concentration of basic gas relative to acid gas and the total concentration of both reagents in solution may be tailored to maximize absorption capacity of ammonia, minimize or prevent acid gas volatility or losses, minimize acid gas equilibrium partial pressure, minimize ammonia equilibrium partial pressure, minimize energy consumption, or a combination thereof.

The one or more or two or more washes or absorbers may comprise, including, but not limited to, one or more or a combination of the following: gas-liquid contactors, gas-liquid-solid contactors, liquid-liquid contactors, vapor gap contactors, vapor gap membrane contactors, membrane contactors, centrifugal contactors, wetted wall contactors, spray column, bubble column, packed column, injection device, or a combination thereof.

The concentration of ammonia or ammonia species in the ammonia-lean solution may be near, at, or greater than the concentration of ammonia species in liquid remaining following the separation of precipitate in step '4)'. The concentration of ammonia or ammonia species in the ammonia-lean solution may be near, at, or greater than the solubility limit of one or more ammonia-carbon dioxide or ammonia-acid gas species at the temperatures and compositions employed in step '3'.

2) The ammonia-rich Wash #1 solution may be subsequently enriched with $CO_2$ (or one or a combination of acid gases) using, for example, the injection of one or more $CO_2$ containing or acid gas containing gas streams into the ammonia-rich Wash #1 solution.

The present step may involve dissolving $CO_2$ (or one or a combination of acid gases) into the ammonia-rich wash #1 solution and/or other solutions. Enriching may involve, including, but not limited to, one or more or a combination of the following: A) Enriching may involve injection of pure $CO_2$ or desorbed $CO_2$ into one or more carbonation vessels. B) Enriching may involve absorbing one or more acid gases from a gas mixture containing one or more acid gases. Enriching may involve simultaneous absorption and precipitate formation. C) Enriching may involve simultaneous absorption, precipitate formation, and liquid solid separation. D) Enriching may involve absorbing followed by later precipitation.

Said enriching may reduce the solubility of one or more ammonia species or form lower solubility acid gas rich salts or a combination thereof to, for example, facilitate the precipitate of one or more ammonia or basic gas species salts.

Cooling prior to, during, or after or a combination thereof said enriching may facilitate precipitation.

$CO_2$ or acid gas can come from or comprise multiple sources, such as emissions sources, pure $CO_2$, pure acid gas, desorbed $CO_2$, desorbed acid gas, gas mixture comprising one or more acid gases, gas mixture comprising one or more acid gases and one or more other gases, or a combination thereof.

In some embodiments, it may be beneficial to allow the ammonia-rich solution to increase in temperature with the heat generated from the absorption of one or more acid gases during said enrichment. Due to, for example, the higher temperature of the solution, the resulting acid gas-rich or $CO_2$-rich solution exiting the one or more $CO_2$ enriching vessels may comprise a liquid with the solutes dissolved due to, for example, higher solubility of one or more ammonia-acid gas salts at higher temperatures. The higher temperature solution with fully dissolved solutes may be subsequently transferred from said container and cooled to, for example, precipitate one or more acid-gas-rich ammonia salts, enabling, for example, controlled precipitation and potentially more methods for solid handling. The previously described configuration may enable the enrichment with acid gas without precipitation in the precipitation vessel, which may be beneficial in some embodiments or versions of the present embodiment. In some embodiments, however, it may desirable for precipitation to occur in said enrichment vessel. Heat may be recovered from said higher temperature solution or said precipitation or both and may be employed within the present embodiment or for other applications.

3) Solid ammonia-carbon dioxide or ammonia-acid gas precipitate may form during or following said enrichment, or due to one or more changes in system conditions, or a combination thereof.

Ammonia-acid gas precipitate formation may occur within vessel or vessels employed for said enrichment, subsequent to said vessels, or a combination thereof. Precipitation may be conducted to, for example, separate ammonia absorbed in step '1)'. Said precipitate may comprise one or more ammonia-acid gas salts.

It may be desirable for said precipitates salts to be capable of reversibly forming ammonia and one or more acid gases. For example, ammonia-carbon dioxide salts generally are reversible using heat to form their individual constituent reagents. The characteristic or characteristics of being reversible may enable ammonia to be economically recoverable from said precipitate in more forms than the form of the precipitate. For example, the ammonia precipitate may be re-introduced into one or more applications employing said one or more reagents, such as, including, but not limited to, urea production, ammonium nitrate production, the production of phosphate salts containing ammonia, ammonium sulfate production, ammonium fertilizer production, gas separation process, fertilizer production, aqueous ammonia production, anhydrous ammonia production, or a combination thereof.

Said precipitation may be further facilitated using an antisolvent. For example, supercritical carbon dioxide or liquid carbon dioxide may be employed as an antisolvent, as, for example, it is partially soluble in water, however one or more acid gas-ammonia salts or acid gas-basic gas salts or one or more salts may be insoluble in supercritical carbon dioxide.

For example, salts with relatively lower solubility compared to other acid gas-ammonia salts, may include, but are not limited to ammonium bicarbonate and ammonium sesqui-carbonate.

In some embodiments, it may be desirable for salts of lower $CO_2$-loading or acid gas loading to precipitate. In said lower acid gas loading embodiments, acid gas enrichment may be more limited.

Embodiments may employ common-ion salts or antisolvents to facilitate precipitation for example, as residual reagents or added reagents or both.

4) Said solid may be at least partially separated from the remaining liquid phase and further employed as described herein.

Solid-liquid separation and solid handling may be conducted employing one or more or a combination of methods, which may include, but are not limited to, devices known in the art. Solid-liquid separation may be conducted continuously, semi-continuously, semi-batch, batch, or a combination thereof.

Solids may be separated, for example, by decanting or draining remaining liquid from one or more acid gas enriching vessels, while at least a portion of solids remain in said vessel or vessels. Then, for example, adding one or more solutions from one or more acid gas recovery technologies (for example: 'CO$_2$-Rich' acid gas absorption solution from an acid gas separation or removal technology) to said vessel and dissolving said one or more solids. A portion of the resulting solution may be drained and returned to said acid gas separation process. A portion of the resulting solution may remain in said vessel, for example, to make up for the water transferred to the acid gas separation process in the dissolved precipitate and/or to maintain water balance. After said draining, ammonia rich solution from step '1)' may be added back to the one or more acid gas enriching vessels. The benefits of the presently described embodiment may include potentially simpler solid-liquid separation and reduction or elimination of the requirement for solid transport or handling.

Solid-liquid separation may be continuous. For example, solid-liquid separation may involve one or more continuous rotary filters or funnel filters or centrifuges separating solids and liquids and directing or transferring said solids to one or more applications or uses employing said solids and directing or transferring said liquid to one or more applications within the ammonia recovery process.

The solids generated by the technology may comprise one or more or a combination of basic gas-acid gas salts and may contain residual water or other liquids or reagents.

The concentration of ammonia or ammonia species in said remaining liquid may be near, at, or greater than the concentration ammonia-lean solution in step 1.

5) Said remaining liquid phase may comprise a relatively ammonia-lean, CO$_2$-rich solution.

Remaining liquid phase may comprise one or more liquid phase separation from one or more solid phases in one or more solid-liquid separation devices or steps. Said remaining liquid phase may exhibit a relatively rich dissolved acid gas to dissolved basic gas molar ratio. The concentration of one or more basic gases or basic gas species in said remaining liquid phase, for example ammonia or ammonium or other ammonia species, may be lower than the concentration of the ammonia-rich solution generated in step '1)', thus said remaining liquid phase may be relatively ammonia-lean.

It may be important to note the solubility of ammonia species in aqueous solutions in water may be greater at lower acid gas-ammonia species molar ratios than at higher acid gas-ammonia molar ratios. NH$_3$ Wash #1 may make use of this phenomenon to enable ultra-low energy consumption, low complexity reversible ammonia recovery.

6) Step where ammonia absorbed in NH$_3$ Wash #2 may be transferred to the NH$_3$ Wash #1 Cycle as an ammonia-carbon dioxide solution (CO$_2$-rich concentrate solution from the NH$_3$ Wash #2 Cycle). The NH$_3$ Wash #1 Cycle may, for example, recover said ammonia as an ammonia-carbon dioxide solid and return the water transferred from NH$_3$ Wash #2 to NH$_3$ Wash #2. The CO$_2$-rich concentrate solution from the NH$_3$ Wash #2 Cycle may comprise a significantly smaller amount of solution relative to the ammonia-lean, CO$_2$-rich solution from the NH$_3$ Wash #1 Cycle. By combining the CO$_2$-rich concentrate solution from the NH$_3$ Wash #2 Cycle with the ammonia-lean, CO$_2$-rich solution from the NH$_3$ Wash #1 Cycle, ammonia-carbon dioxide from the NH$_3$ Wash #2 Cycle may be recovered, while the water removed from NH$_3$ Wash #2 Cycle may be regenerated and returned. The significant difference in liquid amounts may enable the water added from NH$_3$ Wash #2 to be recovered from said combined solution using a membrane-based process, such as one or more versions of reverse osmosis, while, for example, while having the concentration of the solution at or below the maximum concentrations or osmotic pressures feasibly possible in membrane based separation processes or below the solubility limits of the system or a combination thereof. Furthermore, during said concentrating or dewatering, the ammonia-carbon dioxide transferred from the NH$_3$ Wash #2 Cycle may remain in the NH$_3$ Wash #1 Cycle, for example, where it may be recovered as ammonia-carbon dioxide solid. As a result, the steps described herein may enable the transfer of ammonia-carbon dioxide from NH$_3$ Wash #2 Cycle to NH$_3$ Wash #1 Cycle and the recovery of said ammonia from NH$_3$ Wash #2 Cycle and NH$_3$ Wash #1 Cycle. Among multiple benefits, said transfer may enable the present embodiment to employ one process element for precipitation of ammonia-carbon dioxide, minimizing CAPEX and complexity. Further minimizing CAPEX and complexity, NH$_3$ Wash #1 Cycle may operate with in-situ or simultaneous acid gas enriching and ammonia-carbon dioxide precipitation, which may enable, for example, one or more steps described thereof to occur, if desired, within one process element. The present step may enable ammonia in dilute concentrations to be recovered with relatively similar energy consumption as higher concentration ammonia sources in the process.

7) The present step may recover water from the combined ammonia-lean, acid gas-rich solution to, for example, recover water from NH$_3$ Wash #1 and return water to NH$_3$ Wash #2 Cycle. The present step may involve concentrating said solution using reverse osmosis, or forward osmosis, or high-pressure reverse osmosis (HPRO), or Disc-Tube Reverse Osmosis (DTRO), or a combination thereof, producing, for example, one or more permeate streams and one or more concentrate streams. The permeate volume may be relatively small compared to the concentrate volume. For example, the permeate volume may comprise less than 50%, or less than 40%, or less than 30%, or less than 20%, or less than 15%, or less than 10%, or less than 5%, or a combination thereof the volume of the concentrate. The volume of permeate may be sufficient to return sufficient water to NH$_3$ Wash #2 cycle to help enable or achieve water balance or nearly complete water balance between NH$_3$ Wash #1 and NH$_3$ Wash #2. The present step as well as other steps in the present embodiment enable NH$_3$ Wash #2 to absorb ammonia from low concentration ammonia streams, while enabling recovery of ammonia from said low concentration ammonia streams using the novel low energy consumption bulk ammonia recovery systems & methods employed in NH$_3$ Wash #1.

8) Said permeate stream may be returned to the NH$_3$ Wash #2 cycle, for example, following the removal of a portion of excess water from said permeate stream or addition of makeup water to make-up for water losses, depending on the state, conditions, and/or water balance of the process. Said permeate stream may be returned to the $NH_3$ Wash #2 cycle without the removal or addition of water.

Said returning of permeate stream to $NH_3$ Wash #2 cycle from $NH_3$ Wash #1 may involve mixing said permeate stream with one or more permeate stream generated by, for example, one or more membrane-based processes employed within $NH_3$ Wash #2 cycle.

Said one or more permeate streams may be free or practically free of ammonia or may contain an ultra-low concentration of ammonia.

9) Said concentrate solution may be mixed with a portion of ammonia-rich $NH_3$ Wash #1 solution produced by $NH_3$ Wash #1 to, for example, including, but not limited to, slightly or incrementally increase the molar concentration of $NH_3$ species relative to molar concentration of $CO_2$ species in the relatively ammonia-lean, relatively $CO_2$-rich solution. Said slight molar increase of $NH_3$ species relative to $CO_2$ species may minimize or prevent $CO_2$ or other acid gas losses during one or more washes. Said solution may be employed as said relatively ammonia-lean, relatively $CO_2$-rich solution employed as the ammonia-lean wash solution entering $NH_3$ Wash #1 (from step 1).

The one or more concentrate solutions resulting from the membrane based concentrating step in reverse osmosis may be nearly or completely saturated with $CO_2$ or other acid gases or a combination thereof. To prevent said nearly or completely acid gas saturated solution from releasing acid gas or relatively significant amounts of acid gas during basic gas absorption, a portion of the ammonia-rich solution exiting $NH_3$ Wash #1 (from step 1) may be mixed with said nearly or completely acid gas saturated solution. Said mixing may increase the ammonia concentration relative to acid gas concentration. Said mixing may be tailored or optimized to minimize acid gas losses (for example: if acid gases are in the gas or liquid stream entering $NH_3$ Wash #1, if may be desirable for the equilibrium partial pressure of acid gases in the ammonia-lean wash solution to be less than, equal to, or similar to the partial pressure of acid gases in the gas stream entering $NH_3$ Wash #1) or maximize ammonia absorption or both.

Note: One or more steps or stages of one or more embodiments may be heated or cooled to, for example, including, but not limited to, one or more or a combination of the following: to facilitate precipitation, to prevent precipitation, to increase solubility, to decrease solubility, to increase absorption efficiency, to increase absorption rate, to facilitate transport, to facilitate desorption. Said heating or cooling may be conducted at points shown or not shown in one or more diagrams.

$NH_3$ Wash #2 and $NH_3$ Wash #2 Cycle:

$NH_3$ Wash #2 may involve absorbing a portion of the residual ammonia in one or more ammonia gas or liquid streams following, for example, ammonia absorption in $NH_3$ Wash #1. $NH_3$ Wash #2 Cycle concentrates said ammonia to, for example, enable it to be transferred to the $NH_3$ Wash #1 Cycle for further recovery. The intersection of $NH_3$ Wash #2 Cycle and $NH_3$ Wash #1 Cycle may enable the recovery of the ammonia absorbed in $NH_3$ Wash #2 and the regeneration of the ammonia lean or the predominately freshwater solution employed as an ammonia lean solution in $NH_3$ Wash #2.

1) $NH_3$ Wash #2 may involve absorbing ammonia from an ammonia-lean gas or liquid stream, which may contain ammonia. Said absorbing may be conducted employing an input ammonia-ultra-lean solution, which may comprise freshwater or substantially freshwater, which may contain impurities or residuals. The resulting solution following ammonia absorption may be ammonia-rich relative to the input ammonia-lean solution in $NH_3$ Wash #2, although may be ammonia-lean in the context of or relative to the ammonia species concentration in solutions employed in $NH_3$ Wash #1. 2) The ammonia rich solution from $NH_3$ Wash #2 may be enriched with one or more acid gases, which may result in one or more acid gas-rich solutions with a $CO_2$ loading or acid gas loading or pH or combination thereof suitable for the ammonia species in solution to be rejected by, for example, one or more reverse osmosis membranes. 3) Said acid gas-rich solution may be concentrated or partially dewatered using one or more semipermeable membrane systems, resulting in, for example, one or more permeate or concentrate streams. Said one or more semipermeable membrane systems may include, but are not limited to, reverse osmosis. 4) Said one or more permeate streams may be returned to $NH_3$ Wash #2 as the ammonia-lean input wash solution. Said permeate may be mixed with the permeate from $NH_3$ Wash #1 Cycle before or during $NH_3$ Wash #2. Said mixed permeate stream may comprise the ammonia from said ammonia-ultra-lean solution employed in $NH_3$ Wash #2, step '1)'. 5) Said resulting concentrate solution or stream may be transferred to and combined with an ammonia-lean, carbon dioxide-rich solution in the $NH_3$ Wash #1 Cycle. The ammonia in said concentrate solution may be recovered within the $NH_3$ Wash #1 Cycle.

Example Further Descriptions of Each Step $NH_3$ Wash #2 and $NH_3$ Wash #2 Cycle:

1) The gas or liquid streams entering $NH_3$ Wash #2 may contain a wide range of concentrations of ammonia. For example, the one or more feed gases entering $NH_3$ Wash #2 may contain lean concentrations of ammonia, for example, compared to, for example, one or more of the feed gas or liquid streams entering $NH_3$ Wash #1.

It may be desirable to operate $NH_3$ Wash #2 independent of or without of $NH_3$ Wash #1. Similarly, it may be desirable to operate $NH_3$ Wash #1 independent of or without $NH_3$ Wash #1. The combination of both washes, however, may be particularly beneficial, as, for example, $NH_3$ Wash #1 and $NH_3$ Wash #2 may operate at different flow rates, ammonia absorption capacities, and concentration ranges which enable, for example, $NH_3$ Wash #1 to absorb significant concentrations of ammonia while $NH_3$ Wash #2 may absorb ammonia down to very low ammonia concentrations in the feed gas or liquid stream. The integration of $NH_3$ Wash #1 and $NH_3$ Wash #2 may enable simultaneous ultra-low energy consumption ammonia recovery and high ammonia absorption efficiency.

2) During enriching, it may be desirable to inject pure $CO_2$ or a relatively high partial pressure $CO_2$ containing gas stream or a relatively concentrated acid gas stream or a gas stream with soluble acid gas, or a combination thereof into said solution due to, for example, potentially including, but not limited to, the relatively low amount of $CO_2$ consumption or the potential reduction in CAPEX due to the use of potentially widely available $CO_2$ injection or carbonation equipment. The potentially relatively low concentration of ammonia in the ammonia-rich solution in $NH_3$ Wash #1 may necessitate the use of pure or high partial pressure $CO_2$ or one or more or a combination of acid gases to enrich the solution with $CO_2$ one or more or a combination of acid gases under, for example, an application to minimize CAPEX or OPEX.

Aqueous ammonia or aqueous ammonia-acid gas may require a pH below 9.5, or below 9, or below 8.8, or below, 8.7, or below 8.6, or below 8.5, or below 8.3, or below 8.2 to be possess a sufficient hydration radius to be rejected by one or more semi-permeable membranes. Said rejection may be required for said aqueous ammonia to be effectively concentrated using one or more semi-permeable membranes. Achieving a sufficiently low pH may require the injection of pure $CO_2$ or relatively high partial pressure acid gas or soluble acid gas or a combination thereof before concentrating.

3) For example, due to the potentially relatively low concentration and osmotic pressure of the ammonia-carbon dioxide species or ammonia-acid gas species or a combination thereof in said acid gas rich solution, one or more of the reverse osmosis stages may operate at relatively low or standard reverse osmosis desalination pressures. This may enable benefits, for example, which may include, but are not limited to, relatively lower energy consumption and CAPEX.

4) The present step may involve returning water and/or one or more other non-ammonia reagents from $NH_3$ Wash #1 to $NH_3$ Wash #2 that may have previously been transferred to $NH_3$ Wash #1 in the concentrate solution described in step '5)'. The 5) The present step may enable ammonia absorbed in $NH_3$ Wash #2 to be recovered as a solid ammonia-acid gas precipitated or another form of separated ammonia. The present embodiment may achieve this without a steam stripper and may achieve this while achieving water balance.

Example Wash Cycles with Representative Concentrations

NH3 Wash #1 Cycle with Exemplary Concentrations (M is Molarity Concentration)

Ammonia-Lean in the context of NH3 Wash #1 contains ~1.5M-2M NH3. This is about the saturated concentration of CO2-Rich ammonia-carbon dioxide at, for example, 10 C. In contrast, Ammonia-Ultra-Lean in the context of NH3 Wash #2 comprises permeate, which may contain 0.01M or less ammonia.

CO2 is injected into the ammonia-rich solution from 'NH3 Wash #1 Cycle, step 5' (e.g. 5M NH3, 2M CO2). Precipitate forms. Precipitate is separated from the remaining solution. Said remaining solution comprises e.g. 2M NH3, 2M CO2, which is ammonia-lean in the context of NH3 wash #1 Cycle.

Said ammonia-lean remaining solution from 'NH3 Wash #1 Cycle step 1' (e.g. 2M NH3, 2M CO2) is mixed with retentate from 'NH3 Wash #2 Cycle step 3' (e.g. 1.5M NH3(aq), 1.5M CO2(aq)), forming a combined feed solution (e.g. 1.9545M NH3(aq), 1.9545M CO2(aq)) for a second reverse osmosis unit (RO #2).

Said combined feed solution (e.g. 1.9545M NH3(aq), 1.9545M CO2(aq)) is concentrated using said second reverse osmosis unit (RO #2), forming a retentate (e.g. 2.15M NH3, 2.15M CO2) and a permeate (e.g. less than 0.01M NH3). Said permeate is transferred to 'NH3 Wash #2 Cycle, step 4'. Said retentate (e.g. 2.15M NH3, 2.15M CO2) is transferred to 'NH3 Wash #1 Cycle, step 4'.

Said retentate from 'NH3 Wash #1 Cycle, step 3' (e.g. 2.15M NH3, 2.15M CO2) is mixed with a small portion of ammonia-rich solution from 'NH3 Wash #1 Cycle, step 5' to increase the NH3:CO2 molar ratio to minimize the volatility of CO2 during ammonia absorption in 'NH3 Wash #1 Cycle, step 5'. Said mixing will result in a mixed solution (e.g. 2.28M NH3, 2.14M CO2).

Ammonia is absorbed in said mixed solution from 'NH3 Wash #1 Cycle, step 4' (e.g. 2.28M NH3, 2.14M CO2), forming an ammonia-rich solution (e.g. 5M NH3, 2M CO2). Said ammonia-rich solution is transferred to 'NH3 Wash #1 Cycle, step 1'.

NH3 Wash #2 Cycle with Exemplary Concentrations (M is Molarity Concentration)

Ammonia is absorbed in an ammonia-ultra-lean liquid (e.g. less than 0.01M NH3), forming an ammonia-rich solution (e.g. 0.1M NH3, which is ammonia-rich in the context of NH3 Wash #2).

CO2 is injected into the ammonia-rich liquid from 'NH3 Wash #2 step 1', forming a CO2-rich, ammonia-rich solution (e.g. 0.1M NH3, 0.1M CO2, which is CO2-rich and ammonia-rich in the context of NH3 Wash #2).

Said CO2-rich, ammonia-rich solution from 'NH3 Wash #2 step 2' is concentrated with a reverse osmosis unit (RO #1), forming a retentate (e.g. 1.5M NH3(aq), 1.5M CO2(aq)) and a permeate (e.g. less than 0.01M NH3). Said retentate is transferred to 'NH3 Wash #1, step 2' and said permeate is transferred to 'NH3 Wash #2, step 4'.

Permeate from RO #1 (NH3 Wash #2 step 3) and permeate from RO #2 (NH3 Wash #1 step 3) are mixed, forming a combined permeate (less than 0.01M NH3). Said combined permeate is transferred to 'NH3 Wash #2 step 1' as the ammonia-ultra-lean liquid.

Integration of the NH3 Wash #1 and #2 Cycles

The two wash cycles integrate at 'NH3 Wash #1 Cycle, step 2', 'NH3 Wash #1 Cycle, step 3', 'NH3 Wash #2 Cycle, step 3', and 'NH3 Wash #2 Cycle, step 4', as summarized in the step-by-step description above and reiterated below.

Liquid is traveling from NH3 Wash Cycle #2 to NH3 Wash #1 during 'NH3 Wash #2 Cycle, step 3'.

Liquid is traveling to NH3 Wash Cycle #1 from NH3 Wash Cycle #2 during 'NH3 Wash #1 Cycle, step 2'.

Liquid is traveling from NH3 Wash Cycle #1 to NH3 Wash Cycle #2 during 'NH3 Wash #1 Cycle, step 3'.

Liquid is traveling to NH3 Wash Cycle #2 from NH3 Wash Cycle #1 during 'NH3 Wash #2 Cycle, step 4'.

Example Concentrations:

Ammonia-Ultra-Lean:
(a) In the context of $NH_3$ Wash Cycle #1: 0M-0.3M $NH_3(aq)$
(b) In the context of $NH_3$ Wash Cycle #2: 0M-0.3M $NH_3(aq)$ Ammonia Lean:
(a) In the context of $NH_3$ Wash Cycle #1: 0.5-3 M $NH_3$ Ammonia-Rich:
(a) In the context of $NH_3$ Wash Cycle #1: 2 M-20M $NH_3$
(b) In the context of $NH_3$ Wash Cycle #2: 0.01M-1M $NH_3$ Retentate:
(a) In the context of RO #1: 0.8M-3M $NH_3$
(b) In the context of RO #2: 0.5M-2.5M $NH_3$ $CO_2$ Rich:
(a) In the context of $NH_3$ Wash Cycle #1: $CO_2$ Loading ($CO_2$:$NH_3$ molar ratio) greater than 0.5
(b) In the context of $NH_3$ Wash Cycle #2: $CO_2$ Loading ($CO_2$:$NH_3$ molar ratio) greater than 0.5 or sufficiently great to be rejected by a membrane Summary (FIG. 2)

Figure 2:
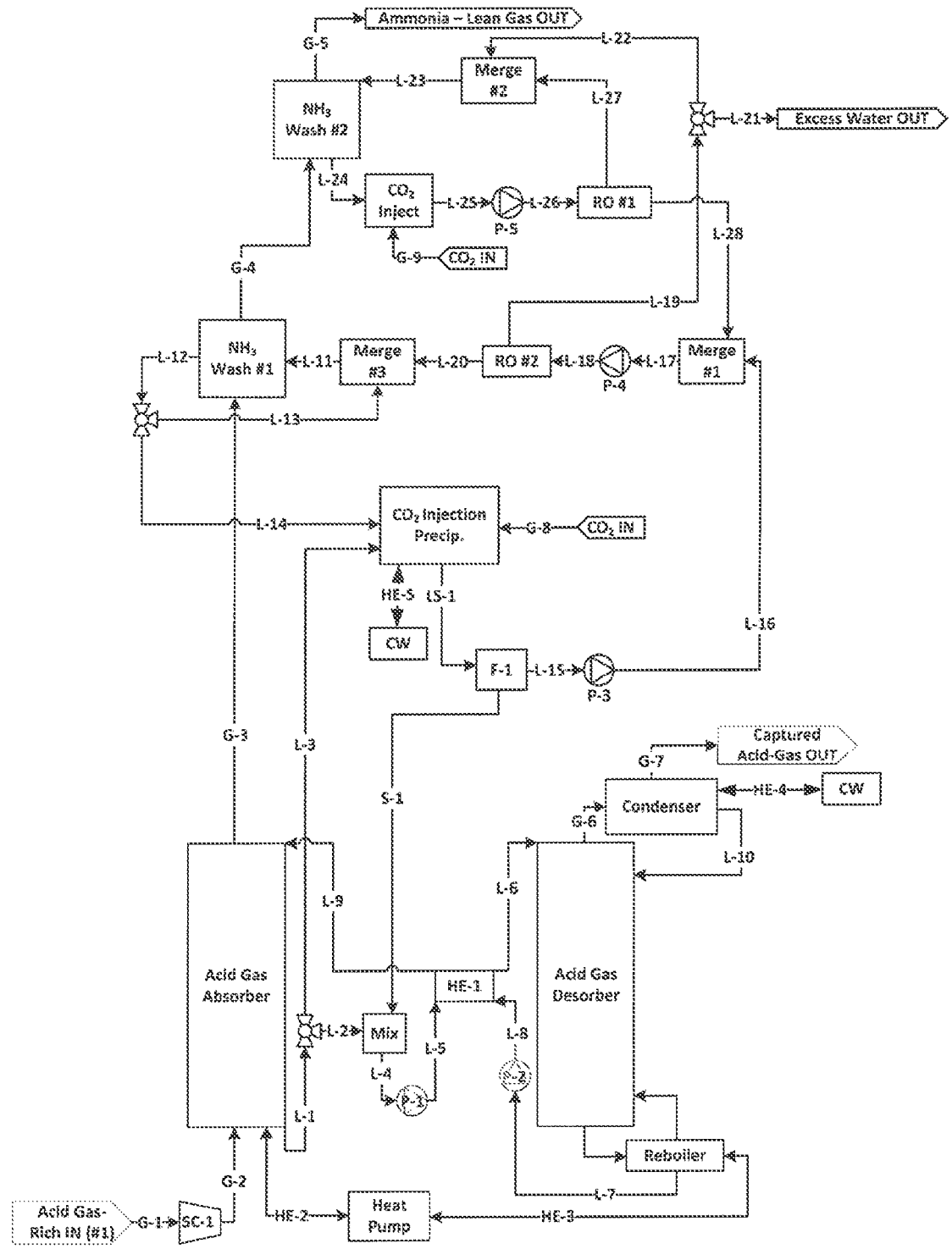
FIG. 2: The present embodiment pertains to a system for acid gas separation with integrated ammonia abatement cycle employing relatively high temperature absorber and heat pump between recovering heat from absorber to power at least a portion of acid gas desorption.

FIG. 2 may involve a process for separating or removing or capturing one or more acid gases from one or more gas streams or mixtures containing one or more acid gases. FIG. 2 may show an example integration of an aqueous ammonia acid gas separation or capture technology with one or more of the ammonia recovery technologies shown in FIG. 1 or described herein. Said integration with one or more ammonia recovery technologies described herein may enable multiple OPEX, CAPEX, and energetic advantages for the one or more acid gas recovery technologies.

Higher Temperature Acid Gas Absorber

Significantly greater tolerance for greater ammonia concentrations relative to prior art steam stripper ammonia abatement cycles. Greater temperature may result in greater amounts of ammonia slip relative to acid gas absorbed and/or greater concentration of ammonia slip. The ultra-low energy consumption of the present embodiment's ammonia recovery device enables As a result, prior art aqueous ammonia absorbers are generally cooled, which increases energy costs and reduces absorption kinetics.

Faster Kinetics

Smaller Absorber

Absorber may not have to be chilled or at least chilled below ambient temperature Relatively close temperature between absorber and desorber. Heat of absorption may be recovered using one or more heat pumps or heat exchanges between absorber(s) and desorber(s).

Low energy consumption $NH_3$ recovery: Less energy consumption $CO_2$ capture, potentially higher absorption efficiency, potentially higher solution capacity Greater Acid Gas Capture Capacity Higher temperature absorber may enable absorber to absorb a greater concentration of $CO_2$ or other acid gas while the solution remains at a liquid phase. One or more acid gas rich salts may have greater solubility with greater temperature.

$CO_2$ or other acid gas or gases absorbed/employed in acid gas enriching in the ammonia abatement cycle may, in part, comprise emissions gases Water balance between ammonia recovery technology Basic gas recovery section may comprise, for example, including, but not limited to, one or more or a combination of the following: '$NH_3$ Wash #1', '$NH_3$ Wash #2', '$CO_2$ Injection Precip.', '$CO_2$ Inject', 'Merge #1', 'Merge #2', 'Merge #3', 'RO #1', 'RO #2', P-3, P-4, P-5, HE-5, LS-1, F-1, G-4, G-5, G-8, G-9, liquid streams L-11 to L-28. Streams entering said basic gas recovery section from one or more acid gas separation sections may comprise, for example, including, but not limited to, one or more or a combination of the following: G-3, L-3. Streams transferred from said basic gas recovery section to one or more acid gas separation sections may comprise, for example, including, but not limited to, S-1.

Acid gas removal or separation section may comprise for example, including, but not limited to, one or more or a combination of the following: 'Acid Gas Absorber', 'Acid Gas Desorber', 'Mix', 'HE-1', 'HE-2', 'HE-3', 'HE-4', 'Condenser', 'Reboiler', G-1, G-2, G-6, G-7, P-1, P-2, SC-1, liquid streams L-1-L-9. Streams entering said acid gas separation section from one or more basic gas recovery sections may comprise, for example, including, but not limited to, one or more or a combination of the following: S-1. Streams transferred from said acid gas separation section to one or more basic gas recovery sections may comprise, for example, including, but not limited to, G-3, L-3.

Step-by-Step Description (FIG. 2):

$CO_2$ or Acid Gas or Combination Thereof Capture:

1) Acid Gas Absorption: One or more acid gas-rich gas streams (G-1, G-2) may be blown or pressurized or fed or a combination thereof (SC-1) into one or more acid gas absorbers ('Acid Gas Absorber'). In said one or more acid gas absorbers, acid gas may be contacted with one or more acid gas lean aqueous ammonia absorption solutions (L-9). Acid gas may absorb into said one or more acid gas lean aqueous ammonia absorption solutions, which may result in the formation of one or more acid gas rich aqueous ammonia absorption solutions (L-1) and one or more acid gas lean gas streams (G-3).

2) Transfer of Portion of Acid Gas-Rich Absorption Solution to Ammonia Abatement Cycle: Acid gas rich aqueous ammonia absorption solution (L-1) may be divided into separate liquid streams of, for example, the same compositions. One or more of said separate liquid streams may be transferred to one or more steps of the ammonia abatement cycle (for example: before or during the '$CO_2$ Injection Precip.' step) (L-3). L-3 may be employed to return water (and/or residuals) to the ammonia abatement cycle to make-up for water previously transferred from the ammonia abatement cycle to the acid gas capture section (S-1, Step '3)'). One or more of said separate liquid streams may be transferred to Step '3)' (L-2). The relative volume of L-2 and L-3 may be dependent on the amount of ammonia slip in G-3 and the amount of water in S-1.

3) Mixing and Dissolution of Ammonia Return Stream from Ammonia Abatement Cycle: Acid gas rich aqueous ammonia absorption solution (L-2) may be mixed ('Mix') with an ammonia return stream from the ammonia abatement cycle, which may comprise ammonia-acid gas solid. Said mixing may form an acid gas rich aqueous ammonia-acid gas solution to be transferred to the cross heat exchanger (L-4). L-4 may possess a greater amount of ammonia than L-2 and/or a may be more $CO_2$-rich than L-2. Said dissolution may be endothermic and may partially facilitate cooling of L-8 in cross heat exchanger, HE-1, during, for example, step '4)'.

4) Cross Heat Exchanger-Heating: L-4 may be pumped (P-1, L-5) to one or more cross heat exchangers, which may heat exchange L-5 (which may be relatively cooler) with acid gas lean solution exiting from the acid gas desorber (L-8) (which may be relatively warmer). The heat exchange may result in a relatively warmer acid gas rich solution (L-6) and a relatively cooler acid gas lean solution from the acid gas desorber (L-9). L-9 may be transferred to step '1)'. L-6 may be transferred to step '5)'.

5) Acid Gas Desorption: Relatively warmer acid gas rich solution (L-6) from step '4)' may be fed into one or more acid gas desorbers. One or more acid gases, as well as other volatile gases at equilibrium (such as, including, but not limited to, water vapor and ammonia) may volatize or desorb from solution as, for example, the solution passes through the one or more stages of the one or more desorbers. Desorbed gases (G-6) may be cooled (HE-4) in a condenser ('Condenser'), which may result in the condensation of condensable vapors (for example: water, ammonia, a portion carbon dioxide or other acid gas or gases or a combination thereof) and may form substantially separated or capture one or more acid gases (G-7). G-7 may be further treated to remove residual water vapor or ammonia or a combination thereof using, for example, including, but not limited to, one or more or a combination of the following: the one or more ammonia abatement cycles described herein, an acid wash, a desiccant wash, further chilling, compression, or other treatment. Condensed vapors in said 'Condenser' may be returned to the one or more desorbers (L-10). During acid gas desorption, the acid gas-rich aqueous ammonia solution may desorb one or more acid gases and may become an acid gas-lean aqueous ammonia solution (L-7). Heat for desorption may be supplied by, for example, a reboiler or other heat exchange method or a combination thereof.

6) Cross Exchanger Cooling: L-7 may be pumped (P-2, L-8) to one or more cross heat exchangers, which may heat exchange L-8 (which may be relatively warmer) with acid gas-rich solution exiting from 'Mix' (L-5) (which may be relatively cooler). The heat exchange may result in a relatively cooler acid gas lean solution from the acid gas desorber (L-9) and a relatively warmer acid gas rich solution (L-6). L-9 may be transferred to step '1)'. L-6 may be transferred to step '5)'.

Heat Pump:

The temperature difference between the one or more absorbers and the one or more desorbers may be sufficiently small to enable a heat pump to transfer heat generated in the enthalpy of absorption of one or more acid gases in the one or more acid gas absorbers to supply heat to power the enthalpy of desorption in one or more acid gas desorbers. The relatively small temperature difference between one or more absorber or desorber stages may be enabled by, for example, the one or more ammonia abatement cycles described herein, as, for example, ammonia abatement cycles described herein may require significantly less energy than prior art ammonia abatement cycles, enabling, for example, higher operating temperature in the one or more absorbers.

Sufficiently small temperature difference may comprise a temperature difference sufficiently small such that the coefficient of performance of the heat pump is greater than 1. Alternatively, sufficiently small temperature difference may comprise a temperature difference sufficiently small such that heat pump consumes a lower cost or value of electricity or other heat pump energy input relative to the cost of directly supplying heat to said one or more desorbers using conventional heat means (for example: steam or thermal combustion).

Heat exchanging with the one or more heat pumps may involve, including, but not limited to, one or more or a combination of the following: heat exchanging within the one or more absorbers or desorbers, heat exchanging the outside of one or more absorbers or desorbers, heat exchanging with the one or more streams entering or exiting said one or more absorbers or desorbers, or facilitating the one or more cross heat exchanges between the one or more absorbers or desorbers.

The one or more heat pumps may remove heat from the one or more absorbers and more supply heat to the one or more desorbers.

NH$_3$ Wash #1:

1) Ammonia Absorption: Acid gas-lean gas exiting one or more acid gas absorbers (G-3) may contain volatilized ammonia, which may be rich in concentration relative to concentration of other ammonia gas streams in the absorption section of the process. G-3 may be contacted with one or more ammonia-lean solutions (L-11) in NH$_3$ Wash #1, forming one or more ammonia-rich solutions (L-12) and one or more ammonia-lean gas streams (G-4). G-4 may contain ammonia, although the concentration of ammonia in G-4 may be lower than the concentration of ammonia in G-3.

2) Partial Ammonia-Rich Solution Recirculation (Also Step '7)'): L-12 may be divided into separate streams. Said separate streams may comprise the same composition as the L-12 stream. One or more of said separate streams (L-13) may be mixed with one or more ammonia-lean concentrate solutions from 'RO #2' in NH$_3$ Cycle #1, to, for example, reduce the CO$_2$ or other acid gas vapor pressure before or during NH$_3$ Wash #1, which may be conducted to prevent or minimize volatilization of CO$_2$ or one or more acid gases into G-3 and/or G-4. The volume of L-13 may be dependent on the amount of solution or ammonia required to sufficiently reduce the CO$_2$ or other acid gas loading to a sufficiently low equilibrium partial pressure of one or more acid gases. One or more of said separate streams (L-14) may be transferred to the acid gas enrichment stage ('CO$_2$ Injection Precip.').

3) Acid Gas Injection and Ammonia-Acid Gas Precipitation: L-14 may be mixed with L-3, for example, before or during the acid gas enrichment stage ('CO$_2$ Injection Precip.'). Ammonia-rich solution, which may comprise L-14 or a mixture of L-14 and L-3, may be enriched with one or more acid gases. Said enriching may result in an acid gas rich solution, ammonia rich solution, or may result in acid gas rich ammonia precipitate, or may result in acid gas rich ammonia precipitate and ammonia-lean, acid gas rich solution, or may result in a combination thereof. A liquid-solid mixture may form before, during, or following, or combination thereof said acid gas enriching (LS-1)

4) Liquid-Solid Separation: LS-1 may be separated into at least a portion acid gas rich ammonia solid (S-1) and at least a portion of acid gas rich, ammonia-lean liquid (L-15). Separation may be conducted using one or more solid-liquid separation techniques (F-1). S-1 may comprise ammonia returned to the acid gas separation or removal section. L-15 may be pumped (P-3, L-16) and transferred to step '5)'.

For example, one means of minimizing solid handling may involve draining one or more 'CO$_2$ Injection Precip.' vessels in the presence of one or more filters, for example, within or near said vessel, which may form remaining solid and may form separated liquid. The remaining solid may be mixed within the same vessel with a separate acid gas-rich liquid stream from one or more acid gas absorbers (for example: one of the separate liquid streams divided from L-1), which may result in the dissolution of said precipitate and formation of a solution originating from the acid gas separation unit containing the recovered ammonia previously volatilized from ammonia slip. The solution or vessel may be heated to facilitate said dissolution. Said formed solution may be returned to the acid gas separation unit in, for example, HE-1. One or more of the 'CO$_2$ Injection Precip.' vessels may be re-filled with ammonia-rich solution. The present example solid-liquid separation and solid dissolution step may be batch, semi-batch, or continuous. Alternatively or additionally, one or more the previously described steps may be conducted in vessels connected to said CO$_2$ Injection Precip.', wherein, for example, acid gas Injection may be continuous, precipitation may occur during or following said acid gas injection, and precipitation separation and precipitate dissolution may be conducted in a semi-batch or batch manner.

5) Merging Acid Gas-Rich, Ammonia-Lean Solution from Liquid-Solid Separation with RO #1 Concentrate Solution from NH$_3$ Wash #2 Cycle: L-16 may be mixed (Merge #1) with concentrate solution (L-28) from reverse osmosis #1 (RO #1) from NH$_3$ Wash #2 Cycle, which may form a combined solution (L-17).

6) Recoverying Water from Acid-Gas Rich, Ammonia-Lean Solution using One or more Membrane Based Processes: L-17 may be pumped using, for example, a high pressure pump (P-4), which may pressurize L-17 into a feed solution (L-18) with sufficient pressure for concentrating using one or more membrane based processes (RO #2). RO #2 concentrates L-18, forming one or more concentrate solutions (L-20) and one or more permeates (L-19). L-19 may be transferred to NH$_3$ Wash #2 Cycle. L-20 may be transferred to Step '7)'.

RO #2 may comprise one or more membrane-based processes, which may include, but not limited to, one or more or a combination of the following: reverse osmosis, disc-tube reverse osmosis, high pressure reverse osmosis, osmotically assisted reverse osmosis, forward osmosis, or nanofiltration. Pressure or energy recovery devices, such as pressure exchangers and other devices which may be known in the art, may be employed, for example, to increase the efficiency of the one or more membrane-based processes.

7) Combining Acid-Gas Rich, Ammonia-Lean Solution with Partially Recirculated Ammonia-Rich Stream: L-20 may comprise an acid gas rich, ammonia-lean concentrate from RO #2. The concentration of acid gases relative to ammonia in solution may result in the solution possessing a vapor pressure of acid gases potentially great enough to release acid gases in G-3 or G-4 if it were to be contacted with said gas stream. The equilibrium vapor pressure of acid gas in L-20 may be reduced by mixing L-20 with ammonia-rich solution, L-13, in 'Merge #3', which may result in a solution with greater ammonia to acid gas molar ratio than L-20 (L-11). Said greater ammonia to acid gas molar ratio may be optimized to provide an equilibrium acid gas vapor pressure near or at or below the partial pressure of acid gas in G-3. Said optimization may be conducted by adjust the volume of the ammonia-rich solution recycle stream mixed (L-13) relative to L-20.

$NH_3$ Wash #2:

1) Absorption of Ammonia from Ammonia-Lean Gas: Ammonia-lean gas, which may be exiting $NH_3$ Wash #1 (G-4), may be contacted with $NH_3$-Ultra-Lean wash liquid (L-23), which may form one or more ammonia containing solutions (L-24) and one or more ammonia-ultra-lean gas streams (G-5).

2) Acid Gas Enriching: One or more ammonia containing wash solutions (L-24) may be enriched with one or more acid gases (G-9) in one or more acid gas injection or carbonation vessels ('$CO_2$ Inject'), which may form an acid gas rich ammonia containing solution (L-25).

3) Membrane Based Concentrating: Acid gas rich ammonia containing solution (L-25) may be pumped using a pressurization pump (P-5). The resulting pressurized solution (L-26) may comprise a feed solution to one or more membrane based concentrating processes, such as reverse osmosis (RO #1). L-26 may be concentrated into one or more concentrate streams and one or more permeate streams. Depending on, for example, the concentration of ammonia in the ammonia containing solution, one or more of the concentrate stream may comprise significantly less liquid volume than one or more permeate streams. One or more concentrate streams (L-28) may be transferred and mixed with the solution following liquid-solid separation in $NH_3$ Wash #1 (Merge #1).

4) Merging of Permeate Streams to Regenerate $NH_3$-Ultra-Lean $NH_3$ Wash #2 Liquid: One or more permeate solutions may be merged with one or more permeate streams transferred from $NH_3$ Wash #1 RO #2 (Merge #2). Merge #2 may form the $NH_3$-Ultra-Lean $NH_3$ Wash #2 Liquid employed in $NH_3$ Wash #2 Step '1)'. Merge #2 may re-introduced water lost to $NH_3$ Wash #1 in step '3)'.

Figure 3:
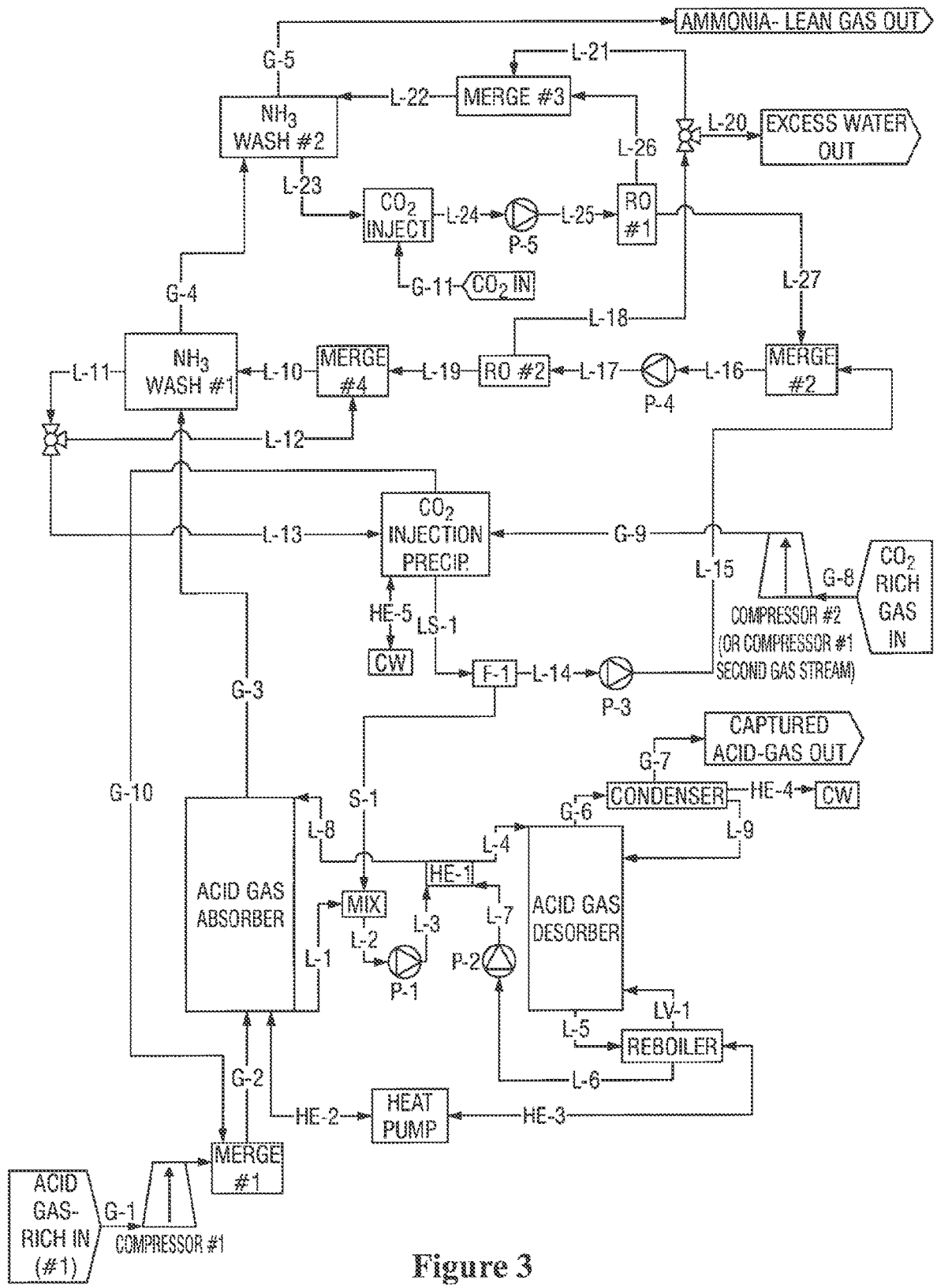
FIG. 3: Similar to FIG. 2. The present embodiment pertains to a system for acid gas separation with integrated ammonia abatement cycle employing compressed gas mixtures containing one or more acid gases.

Summary (FIG. 3)

FIG. 3 may be similar to FIG. 2. FIG. 3 may differ from FIG. 2 in that the "$CO_2$ Injection Precip.' step may employ emissions gases or more dilute concentration of acid gas as input acid gas for acid gas enrichment. This may be beneficial, as, for example, it may increase the acid gas capture capacity of the acid gas separation unit and may further reduce the 'parasitic loading' the ammonia abatement cycle. If the acid gas in absorbed in '$CO_2$ Injection Precip.' in a manner more similar to an absorption column, it may be desirable to avoid precipitation during a portion or all of acid gas absorption, then, subsequently, for example, precipitate one or more ammonia-acid gas salts by reducing temperature or injecting further acid gas or both. Precipitate may be avoided, for example, by allowing the temperature of the solution to increase during, for example, acid gas injection, as, for example, acid gas absorption may be exothermic. At a higher temperature, one or more acid gas rich-ammonia salts may exibit greater solubility than at a lower temperature. Heat may be recovered during said 'reducing of temperature'.

It may be desirable for '$CO_2$ Injection Precip.' to only absorb a portion of one or more acid gases in G-9, as this may enable higher acid gas loading in the resulting enriched solution or enriched solid-liquid mixture or less compression requirement in 'Compressor #2', or a combination thereof. At least a portion of the remaining acid gases (G-10) may be absorbed in the Acid Gas Absorber.

FIG. 3 may employ compressors in both '$CO_2$ Injection Precip.' and the acid gas absorber.

Figure 4:
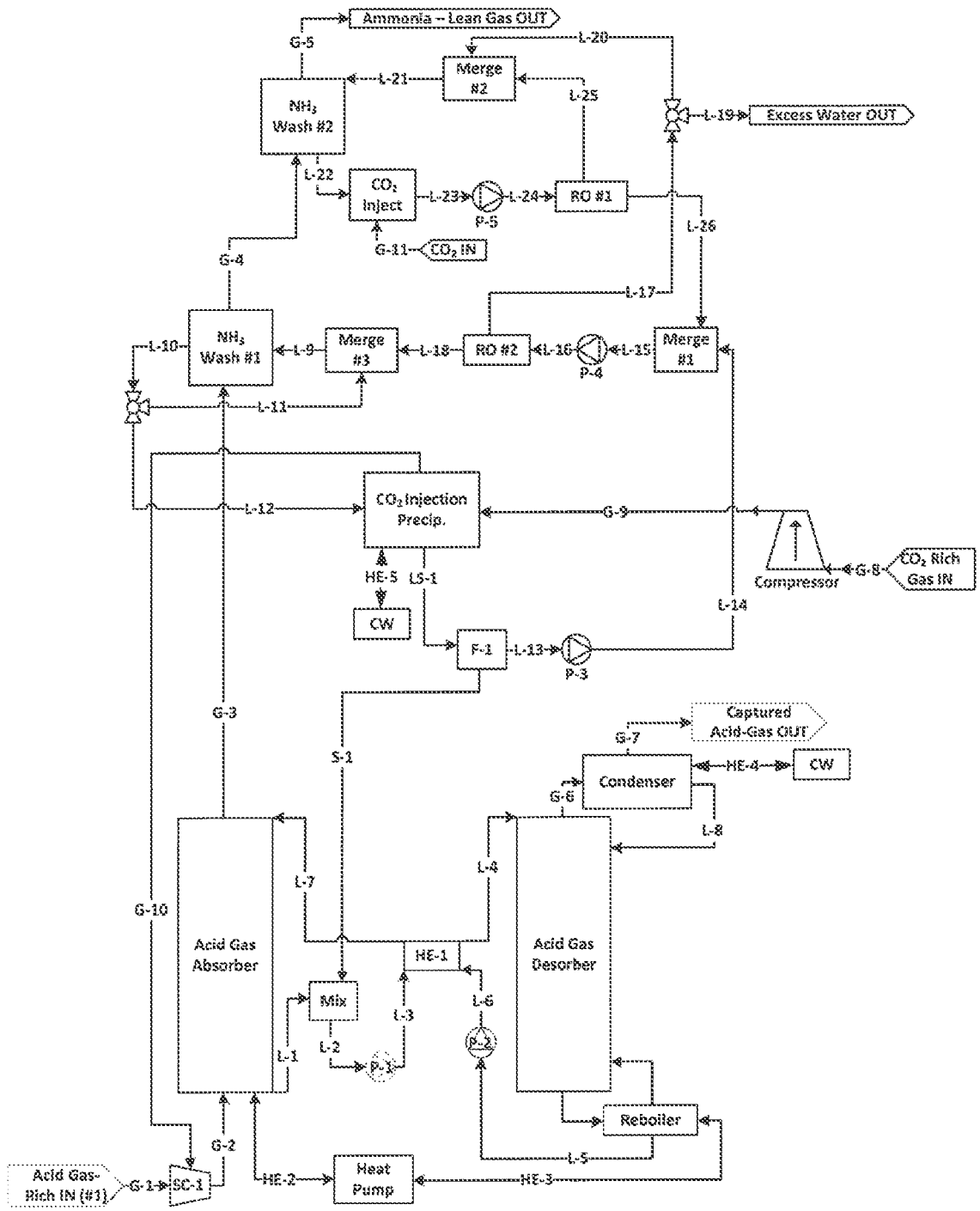
FIG. 4: Similar to FIG. 2. The present embodiment pertains to a system for acid gas separation with integrated ammonia abatement cycle employing compresses gas mixtures containing one or more acid gases in one or more steps of the ammonia abatement cycle and gas blower in acid gas capture acid gas absorber.

Summary (FIG. 4)

FIG. 4 may be similar to FIG. 3. FIG. 4 may differ in that it may employ a gas blower or low pressure gas feeder as an alternative to a gas compressor in the acid gas absorption unit. Gas blowers, compressors, or other gas pressurization or feeding mechanisms may be employed. The device or devices employed for gas transfer may be optimized for one or more applications, gas compositions, or desired results.

Figure 5:
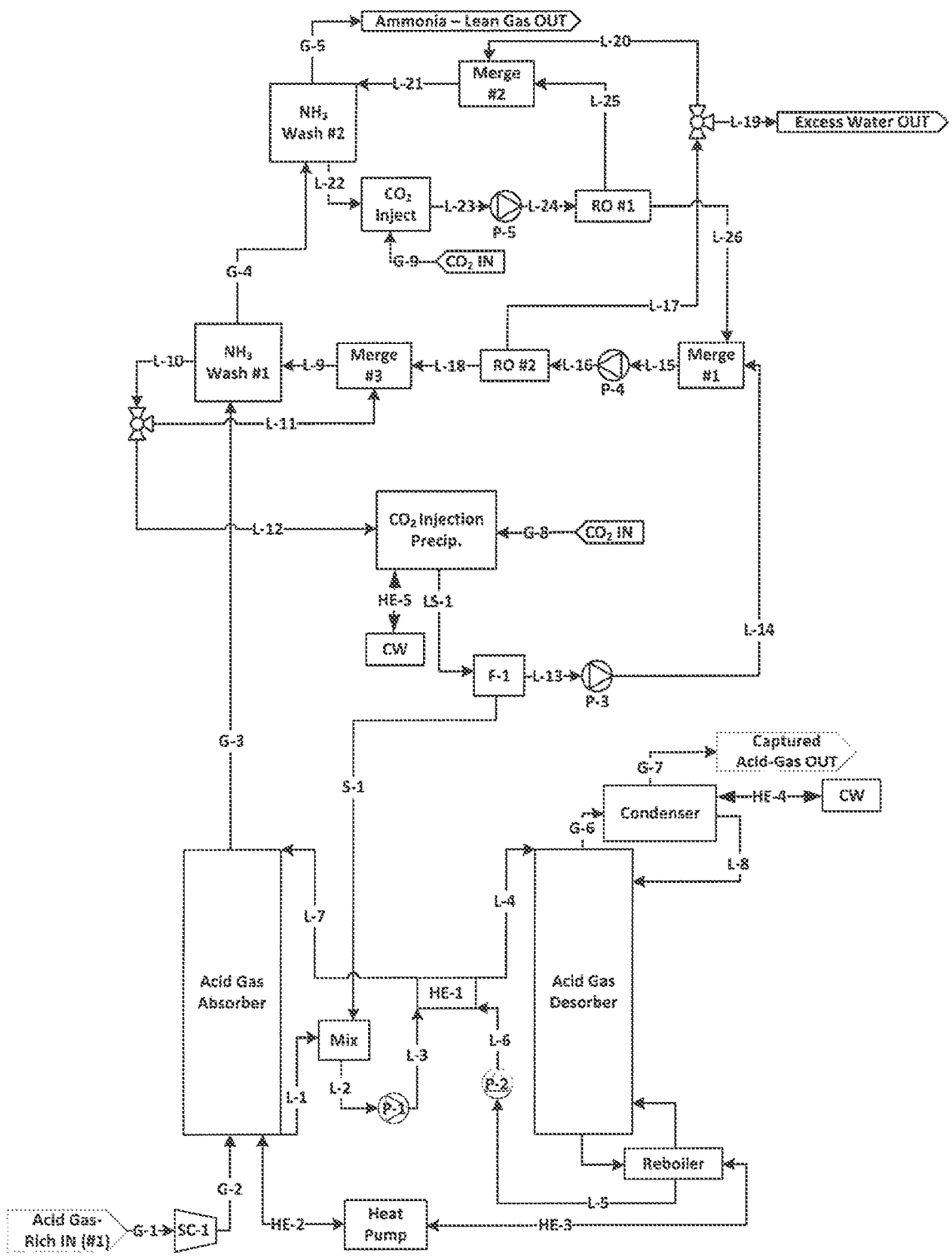
FIG. 5: Similar to FIG. 2. The present embodiment pertains to a system for acid gas separation with integrated ammonia abatement cycle employing gas blower in absorber and pure $CO_2$ or nearly pure $CO_2$ in ammonia abatement cycle.

Summary (FIG. 5)

FIG. 5 may be similar to FIG. 2. It may differ from FIG. 2 in that liquid solution may remain in the acid gas separation section of the process. This may be desirable, for example, if water balance needs are met without the need to transfer liquid solution from the acid gas separation unit to the ammonia abatement cycle. For example, the present embodiment may be employed if sufficient water vapor is evaporated in acid gas absorber and condensed in $NH_3$ Wash #1 or $NH_3$ Wash #2 or both.

Figure 6:
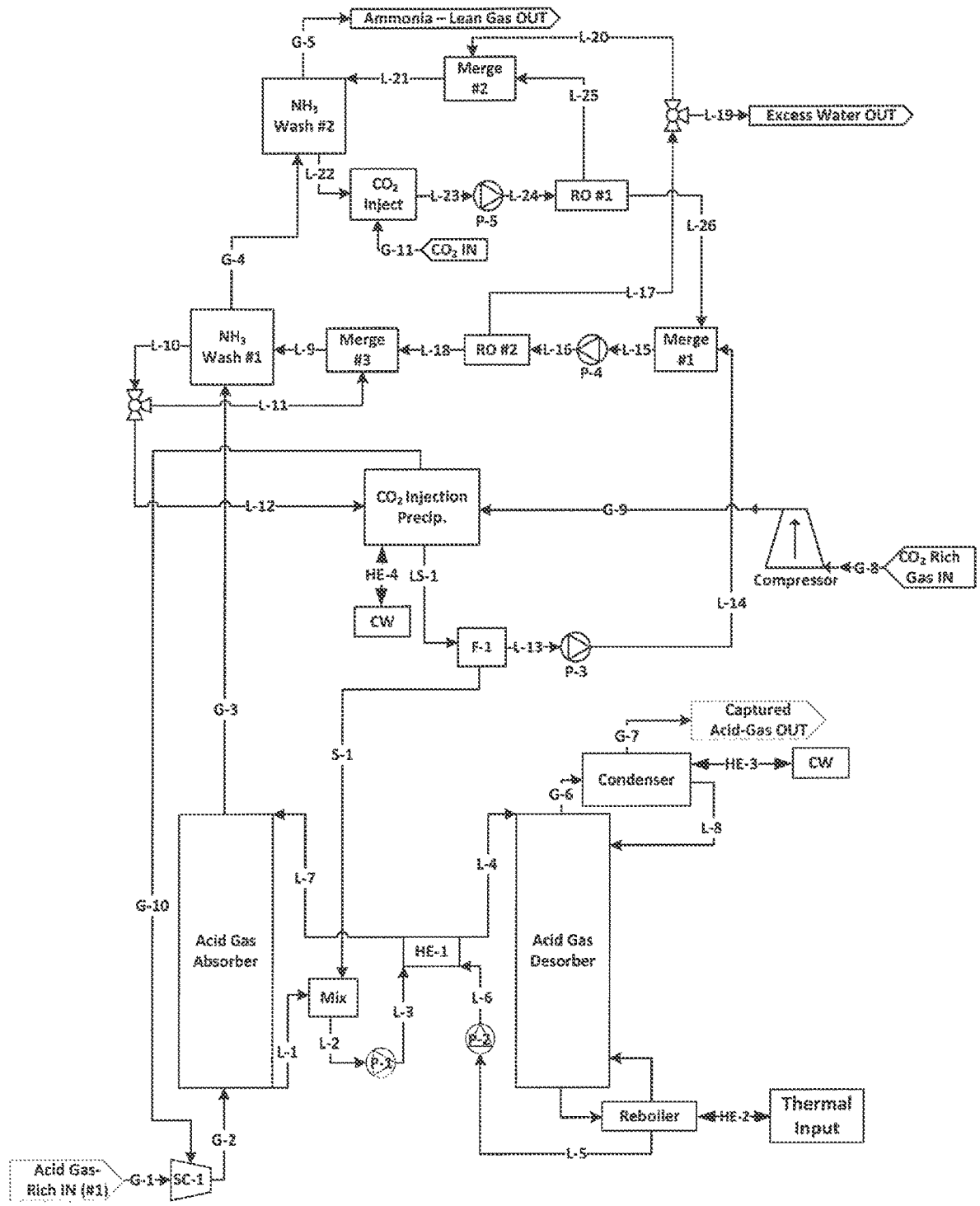
FIG. 6: The present embodiment pertains to a system for acid gas separation with integrated ammonia abatement cycle employing pressure swing desorption or thermal input desorption or a combination thereof.

Summary (FIG. 6)

FIG. 6 may be similar to FIG. 4. FIG. 6 may differ from FIG. 4 in that it may employ thermal energy input or direct heat exchange with absorber or a combination thereof to power desorption.

The present embodiment may be employed, for example, if the temperature difference between the absorber and desorber is large to be powered efficiently using a heat pump. In this instance, the acid gas separation process continues to be significantly more efficient than technologies in the art because, including, but not limited to, the significantly lower energy requirement of the ammonia abatement cycle relative to steam stripper ammonia abatement cycles used in the art. Additionally, an absorber with relatively higher temperature operation than absorbers in the art may be employed due to lower energy consumption ammonia abatement, which may result in faster absorption kinetics relative to absorbers in the art and may enable a lower cost or small or a combination thereof absorption column.

Alternatively, the present embodiment may be employed, for example, if absorber and desorber temperatures are very small or the temperature of the absorber is greater than the desorber. In said instances, desorption may be entirely or in part powered by absorption and one of the driving force for acid gas separation may be, for example, acid gas partial pressure differences between the absorber and desorber.

EXEMPLARY EMBODIMENTS

Example Embodiments 1

Process for recovering basic gases comprising:
Absorbing one or more basic gases from one or more feed gas or liquid streams into a solution containing one or more dissolved acid gases and relatively lean in basic gas
Forming a solution relatively rich in basic gas
Forming one or more feed gas or liquid streams with a lower amount of one or more basic gases
Injecting one or more acid gases into said solution rich in basic gas
Precipitating at least a portion of said basic gas during, or after, or combination thereof said acid gas absorption
Separating said precipitate from remaining liquid

Example Sub-Embodiments

Wherein said remaining liquid comprises said solution containing one or more dissolved acid gases and relatively lean in basic gas
2) Wherein said one or more feed gas or liquid streams with a lower amount of one or more basic gases in example embodiment 1 are further treated
Wherein further treatment comprises absorbing a portion of the remaining one or more basic gases in said gas or liquid streams in an ammonia-ultra-lean or practically ammonia free wash liquid, forming an ammoniated wash liquid and one or more ammonia-lean gas or liquid exiting streams
Wherein said ammoniated wash liquid is treated with one or more acid gases to form an acid gas-rich, ammonia solution
Wherein said acid gas-rich, ammonia solution is concentrated using a first reverse osmosis step to form one or more concentrate solutions and permeate liquids
Wherein said permeate liquid comprises said ammonia-ultra-lean or practically ammonia free liquid
Wherein said one or more concentrate solutions from said first reverse osmosis step are mixed with said remaining liquid from embodiment 1 to form a combined solution
3) The process of example sub-embodiment '2)' further comprises:
Concentrating said combined solution with a second reverse osmosis step, forming one or more concentrate and permeate solutions
Employing said one or more concentrate solutions from said second reverse osmosis step as said solution containing one or more dissolved acid gases and relatively lean in basic gas in example embodiment 1
Employing said one or more permeate solution from said second reverse osmosis step as said ammonia-ultra-lean or practically ammonia free wash liquid in sub-embodiment '2)'
4) The process of example sub-embodiment '2)' further comprising:
Concentrating said combined solution with a second reverse osmosis step, forming one or more concentrate and permeate solutions
Mixing one or more concentrate solutions from said second reverse osmosis step with a portion of said solution relatively rich in basic gas to form a second combined solution Employing said second combined solution as said solution containing one or more dissolved acid gases and relatively lean in basic gas in example embodiment 1
Employing said one or more permeate solutions from said second reverse osmosis step as said ammonia-ultra-lean or practically ammonia free wash liquid in sub-embodiment '2)'
Wherein a portion of said solution relatively rich in basic gas is mixed with said solution relatively lean in basic gas to increasing basic gas: acid gas molar ratio, minimize or prevent losses of acid gas during basic gas absorption, or a combination thereof
Wherein said precipitating may be facilitated by cooling before, during, or after, or combination thereof said precipitating
Wherein at least a portion of precipitate comprises one or more basic gas cation-acid gas anion salts
Wherein the solvent of said solution comprises one or more or a combination of the following: water, organic solvent, non-volatile organic compound, non-volatile low molecular weight compound, non-volatile organic solvent with a molecular weight less than 100 grams per mole, non-volatile organic solvent with a molecular weight less than 150 grams per mole, non-volatile organic solvent with a molecular weight less than 80 grams per mole, non-volatile organic solvent with a molecular weight less than 50 grams per mole, non-volatile organic solvent with a molecular weight less than 200 grams per mole, or a combination thereof
Wherein at least a portion of precipitate comprises ammonium bicarbonate, ammonium sesquicarbonate, ammonium carbonate, ammonium carbamate, or a combination thereof
Wherein said salt is subsequently separated
Wherein said acid gas comprises one or more or a combination of the following: $CO_2$, $H_2S$, HCN, $SO_2$, $NO_2$, sulfurous compounds
Wherein basic gas comprises ammonia, amine, volatile basic compound, or a combination thereof
Wherein the one or more basic gases may be recovered as a salt of one or more basic gases bonded with one or more other reagents
Wherein said salt may undergo further treatment to form aqueous ammonia, aqueous amine, or carbon dioxide, or gaseous acid gas, gaseous basic gas, gaseous ammonia, gaseous amine, dissolved acid gas, or anhydrous ammonia, one or more acid gas lean salts, a solution, an acid gas lean solution, an acid gas rich solution, or combination thereof
Wherein said absorbing is conducted in one or more or a combination of the following: a wash column, an absorption column, a membrane contactor, a gas-liquid membrane containing, a vapor gap membrane contactor, a liquid-gas-liquid membrane contactor, a liquid-solid-liquid contactor, a hydrophobic surface contactor, a liquid-liquid membrane contactor, rotational contactor, centrifugal contactor
Wherein said treating with one or more acid gases is conducted one or more or a combination of the following: a wash column, an absorption column, a membrane contactor, a gas-liquid membrane containing, a vapor gap membrane contactor, a liquid-gas-liquid membrane contactor, a liquid-solid-liquid contactor, a hydrophobic surface contactor, a liquid-liquid membrane contactor, a carbonation vessel, rotational contactor, centrifugal contactor
Wherein said treating with one or more acid gases comprises using one or more gas streams containing one or more acid gases comprising one or more or a combination of the following: pure $CO_2$, concentrated $CO_2$, separated $H_2S$, separated acid gas, biogas, natural gas, untreated natural gas, sour gas, tail gas, flue gas, emissions gas, flaring gas, synthesis gas, $CO_2$ EOR recycle gas, $CO_2$ EOR reprocessing gas, claus process gas, or a combination thereof Wherein said precipitating is facilitated using an antisolvent Wherein said precipitating is facilitated using through the dissolution of supercritical $CO_2$

Example Embodiments 2

Process for recovering basic gases comprising:

One or more basic gases are absorbed from an ammonia rich gas or liquid feed stream in an ammonia-ultra-lean or practically ammonia free liquid, forming an ammoniated liquid and ammonia-lean gas or liquid exiting stream Wherein said ammoniated liquid is treated with one or more acid gases to form an acid gas-rich, ammonia solution Wherein said acid gas-rich, ammonia solution is concentrated using a first reverse osmosis step to form one or more concentrate solutions and permeate liquids

Example Sub-Embodiments

Wherein said permeate liquid comprises said ammonia-ultra-lean or practically ammonia free liquid Wherein said treatment with acid gas reduces the pH of the solution such that one or more ions may be ionic or possess a sufficient hydration radius to be rejected by one or more semi-permeable membranes or combination thereof

Example Embodiments 3

Low energy process for recovering basic gases at high absorption efficiency comprising:

Absorbing the bulk of $NH_3$ from an ammonia-laden gas stream in a relatively ammonia-lean solution containing acid gas in a first absorbing step, forming a concentrated ammonia rich solution and an ammonia-lean gas stream Further treating said ammonia-lean gas with an ammonia-ultra-lean liquid in a second ammonia absorbing step, forming a dilute ammonia solution and ammonia-ultra-lean gas Wherein one or more acid gases are absorbed into said ammonia rich solution from said first absorbing step Wherein at least a portion of said ammonia in said ammonia rich solution from said first absorbing step is precipitated as one or more ammonia-acid gas salts during or following said absorbing of one or more acid gases Wherein said precipitate is separated from the remaining liquid solution using one or more solid-liquid separation methods Wherein one or more acid gases are absorbed into said dilute ammonia solution from said second ammonia absorbing step, forming an acid gas rich dilute ammonia solution Wherein said acid gas rich dilute ammonia solution is concentrated using a first reverse osmosis step to form one or more retentates and one or more permeates Wherein said retentate solution from said first reverse osmosis step is mixed with said remaining liquid solution, forming a combined solution Wherein said combined solution is concentrated using a second reverse osmosis step, forming one or more second reverse osmosis retentates and permeates Wherein said second reverse osmosis retentate is employed as said relatively ammonia-lean solution containing acid gas in a first absorbing step Wherein said second reverse osmosis permeate is combined with said first reverse osmosis step permeate to form the ammonia-ultra-lean liquid employed in said second ammonia absorbing step

Example Embodiments 4

Low energy process for recovering basic gases at high absorption efficiency comprising:

Two ammonia absorbing and regenerating cycles composed of a $NH_3$ Wash #1 cycle and a $NH_3$ Wash #2 cycle Wherein $NH_3$ Wash #1 absorbs ammonia from a relatively ammonia-rich gas or liquid feed stream in an ammonia-lean wash solution, forming an ammonia-lean gas or liquid exiting stream and an ammonia-rich wash solution Wherein ammonia is absorbed from said ammonia-lean gas or liquid exiting stream from $NH_3$ Wash #1 in an ammonia-ultra-lean or practically ammonia free wash liquid in $NH_3$ Wash #2, forming an ammonia-ultra-lean gas or liquid exiting stream and a dilute ammonia wash solution Wherein said ammonia-rich wash solution from $NH_3$ Wash #1 is treated with one or more acid gases to precipitate ammonia as one or more ammonia-acid gas salts as part of $NH_3$ Wash #1 cycle Wherein said precipitate is separated from remaining liquid solution as a part of $NH_3$ Wash #1 cycle Wherein said dilute ammonia wash solution from $NH_3$ Wash #2 is treated with one or more acid gases to form an acid gas-rich, dilute ammonia solution as a part of $NH_3$ Wash #2 cycle Wherein said acid gas-rich, dilute ammonia solution is concentrated using a first reverse osmosis step to form one or more concentrate solutions and permeate liquids as a part of NH3 Wash #2 cycle Wherein said concentrate from said first reverse osmosis step is transferred from $NH_3$ Wash #2 cycle to $NH_3$ Wash #1 cycle by mixing with said remaining liquid solution from $NH_3$ Wash #1 cycle, forming a combined solution as a part of $NH_3$ Wash #1 cycle Wherein said combined solution is concentrated using a second reverse osmosis step, forming one or more concentrate solutions and one or more permeate liquids as a part of $NH_3$ Wash #1 cycle Wherein said one or more concentrate solutions from said second reverse osmosis step comprise said ammonia-lean wash solution in $NH_3$ Wash #1

Wherein said one or more permeate liquids from said second reverse osmosis step are transferred to $NH_3$ Wash #2 cycle by mixing with said one or more permeate liquids from said first reverse osmosis step to form said ammonia-ultra-lean or practically ammonia free wash liquid in $NH_3$ Wash #2

Low energy process for recovering basic gases at high absorption efficiency comprising:

Two ammonia absorbing and regenerating cycles composed of a $NH_3$ Wash #1 cycle and a $NH_3$ Wash #2 cycle $NH_3$ Wash #1 Cycle:

1. Wherein $NH_3$ Wash #1 absorbs ammonia from a relatively ammonia-rich gas or liquid feed stream in an ammonia-lean wash solution, forming an ammonia-lean gas or liquid exiting stream and an ammonia-rich wash solution 2. Wherein said ammonia-rich wash solution from $NH_3$ Wash #1 is treated with one or more acid gases to precipitate ammonia as one or more ammonia-acid gas salts 3. Wherein said precipitate is separated from remaining liquid solution 4. Wherein said concentrate from said first reverse osmosis step is transferred from NH$_3$ Wash #2 cycle to NH$_3$ Wash #1 cycle by mixing with said remaining liquid solution from NH$_3$ Wash #1 cycle, forming a combined solution 5. Wherein said combined solution is concentrated using a second reverse osmosis step, forming one or more concentrate solutions and one or more permeate liquids 6. Wherein said one or more concentrate solutions from said second reverse osmosis step comprise said ammonia-lean wash solution in NH$_3$ Wash #1, step 1).

NH$_3$ Wash #2 Cycle:

1. Wherein ammonia is absorbed from said ammonia-lean gas or liquid exiting stream from NH$_3$ Wash #1 in an ammonia-ultra-lean or practically ammonia free wash liquid in NH$_3$ Wash #2, forming an ammonia-ultra-lean gas or liquid exiting stream and a dilute ammonia wash solution 2. Wherein said dilute ammonia wash solution from NH$_3$ Wash #2 is treated with one or more acid gases to form an acid gas-rich, dilute ammonia solution 3. Wherein said acid gas-rich, dilute ammonia solution is concentrated using a first reverse osmosis step to form one or more concentrate solutions and permeate liquids 4. Wherein said one or more permeate liquids from said second reverse osmosis step in NH$_3$ Wash #1 are transferred to NH$_3$ Wash #2 cycle by mixing with said one or more permeate liquids from said first reverse osmosis step to form said ammonia-ultra-lean or practically ammonia free wash liquid in NH$_3$ Wash #2

Example Sub-Embodiments

Wherein said permeate transferred to NH$_3$ Wash #2 cycle from NH$_3$ Wash #1 cycle in step 4 of the NH$_3$ Wash #2 cycle is similar in water mass to the amount of water transferred from NH$_3$ Wash #2 cycle to NH$_3$ Wash #1 cycle in step 4 of the NH$_3$ Wash #1

Wherein said permeate comprises a solution with the concentration of ammonia in a permeate solution from a reverse osmosis process wherein the feed solution comprises at least a portion of ammonia and said solution has a pH below 8.8

Wherein said permeate comprise a solution containing less than 50,000 PPM ammonia, or less than 40,000 PPM ammonia, or less than 35,000 PPM ammonia, or less than 30,000 PPM ammonia, or less than 25,000 PPM ammonia, or less than 20,000 PPM ammonia, or less than 15,000 PPM ammonia, or less than 10,000 PPM ammonia, less than 5,000 PPM ammonia, or less than 2500 PPM ammonia, or less than 1500 PPM ammonia, or less than 1000 PPM ammonia, or less than 500 PPM ammonia, or less than 400 PPM ammonia, or less than 300 PPM ammonia, or less than 200 PPM ammonia, or less than 100 PPM ammonia, or less than 50 PPM ammonia, or less than 25 PPM ammonia, or less than 10 PPM ammonia Wherein ammonia-acid gas salts comprise one or more salts comprising one or more or a combination of the following: ammonia, ammonium, amine, water, carbon dioxide, hydrogen sulfide, sulfur dioxide Wherein said reverse osmosis comprises one or more membrane devices, energy recovery devices, or combinations thereof Wherein said reverse osmosis comprises one or more membrane based processes for separating or concentrating solutes, liquids, or combinations thereof Wherein said reverse osmosis may comprise standard reverse osmosis, low pressure reverse osmosis, nanofiltration, high pressure reverse osmosis, or disc tube reverse osmosis, or a combination thereof Wherein 'bulk' is defined as greater than 50% of the ammonia in said feed gas stream Wherein ammonia-ultra-lean gas is defined as a gas containing less than 50,000 PPM ammonia, or less than 40,000 PPM ammonia, or less than 35,000 PPM ammonia, or less than 30,000 PPM ammonia, or less than 25,000 PPM ammonia, or less than 20,000 PPM ammonia, or less than 15,000 PPM ammonia, or less than 10,000 PPM ammonia, less than 5,000 PPM ammonia, or less than 2500 PPM ammonia, or less than 1500 PPM ammonia, or less than 1000 PPM ammonia, or less than 500 PPM ammonia, or less than 400 PPM ammonia, or less than 300 PPM ammonia, or less than 200 PPM ammonia, or less than 100 PPM ammonia, or less than 50 PPM ammonia, or less than 25 PPM ammonia, or less than 10 PPM ammonia Wherein ammonia-lean gas is defined as a gas with a greater concentration or partial pressure of ammonia than an ammonia-ultra-lean gas in said system Wherein ammonia-lean gas is defined as a gas with a lesser concentration or partial pressure of ammonia in one or more ammonia-laden gas streams, one or more ammonia-laden gas feed streams, or one or more ammonia-rich gas streams Wherein an ammonia lean solution is a solution with a lower concentration of ammonia relative to said solution in one or more other steps in the process Wherein a relatively ammonia lean solution is a solution with a lower concentration of ammonia relative to said solution in one or more other steps directly before or after the present process step Wherein an ammonia rich solution is a solution with a greater concentration of ammonia relative to said solution in one or more other steps in the process Wherein an ammonia-ultra-lean liquid comprises a solution with less than 50,000 PPM ammonia, or less than 40,000 PPM ammonia, or less than 35,000 PPM ammonia, or less than 30,000 PPM ammonia, or less than 25,000 PPM ammonia, or less than 20,000 PPM ammonia, or less than 15,000 PPM ammonia, or less than 10,000 PPM ammonia, less than 5,000 PPM ammonia, or less than 2500 PPM ammonia, or less than 1500 PPM ammonia, or less than 1000 PPM ammonia, or less than 500 PPM ammonia, or less than 400 PPM ammonia, or less than 300 PPM ammonia, or less than 200 PPM ammonia, or less than 100 PPM ammonia, or less than 50 PPM ammonia, or less than 25 PPM ammonia, or less than 10 PPM ammonia Wherein an ammonia-ultra-lean liquid comprises a solution with the concentration of ammonia in a permeate solution from a reverse osmosis process wherein the feed solution comprises at least a portion of ammonia and said solution has a pH below 8.8

Wherein at least a portion of any remaining basic gas is treated using one or more or a combination of the following: washing with an acid, catalytic decomposition, thermal decomposition, reactive decomposition, acid-base reaction Example Embodiments 5

Integrating acid gas separation with ultra-efficient basic gas recovery comprising:

Acid Gas Removal Unit:

1) Absorbing one or more acid gases in one or more absorbers into an acid gas lean solution, forming an acid gas rich acid gas absorption solution and forming one or more remaining gas streams lean in one or more acid gases and rich with one or more basic gases 2) Dissolving at least a portion of said separated precipitate in 'Basic gas recovery unit or abatement cycle: 5)' with said acid gas rich acid gas absorption solution, forming an acid gas rich solution Basic Gas Recovery Unit or Abatement Cycle:

1) Absorbing said one or more basic gases from said one or more remaining gas streams rich with one or more basic gases, forming a basic gas rich solution and one or more gas streams lean with one or more basic gases 2) Mixing a portion of said acid gas rich acid gas absorption solution from 'Acid Gas Removal Unit: 1)' with said basic gas rich solution, forming a combined solution 3) Enriching said combined solution with at least a portion of one or more acid gases 4) Precipitating at least a portion of one or more basic gases as one or more basic gas-acid gas salts before, during, or after, or combination thereof said acid gas enriching 5) Separating at least a portion of said precipitate from remaining liquid Example Embodiments 6

Integrating acid gas separation with ultra-efficient basic gas recovery comprising:

Acid Gas Removal Unit:

1) Absorbing one or more acid gases in one or more absorbers into an acid gas lean solution, forming an acid gas rich acid gas absorption solution and forming one or more remaining gas streams lean in one or more acid gases and rich with one or more basic gases 2) Dissolving at least a portion of said separated precipitate in 'Basic gas recovery unit or abatement cycle: 4)' with said acid gas rich acid gas absorption solution, forming an acid gas rich solution Basic Gas Recovery Unit or Abatement Cycle:

1) Absorbing said one or more basic gases from said one or more remaining gas streams rich with one or more basic gases, forming a basic gas rich solution and one or more gas streams lean with one or more basic gases 2) Enriching said basic gas rich solution with at least a portion of one or more acid gases 3) Precipitating at least a portion of one or more basic gases as one or more basic gas-acid gas salts before, during, or after, or combination thereof said acid gas enriching 4) Separating at least a portion of said precipitate from remaining liquid Example Sub-Embodiments Wherein 'Basic gas recovery unit or abatement cycle: 2)' returns at least a portion of the water added to said 'Acid Gas Removal Unit' in step 'Acid Gas Removal Unit: 2)' to the Basic gas recovery unit Wherein 'Basic gas recovery unit or abatement cycle: 2)' contributes to maintaining water balance between the 'Basic gas recovery unit or abatement cycle' and the 'Acid Gas Removal Unit'

Wherein said 'Acid Gas Removal Unit' further comprises desorbing one or more acid gases from said acid gas rich solution Wherein said 'Acid Gas Removal Unit' further comprises desorbing one or more acid gases from said acid gas rich solution Wherein one or more of said desorbed gas streams may be treated by employing at least a portion of said one or more of said desorbed gas streams as the source of one or more gas streams for said enriching with acid gases in 'basic gas recovery unit or abatement cycle'

Mixing a portion of said acid gas rich acid gas absorption solution from 'Acid Gas Removal Unit: 1)' with said basic gas rich solution before, during, or after, or combination thereif said enriching with one or more acid gases Mixing a portion of said acid gas rich acid gas absorption solution from 'Acid Gas Removal Unit: 1)' with said basic gas rich solution before, during, or after, or combination thereof said precipitating Wherein one or more solid-liquid separation methods are employed which may include one or more or a combination of the following of the following: rotary filter, continuous separatory funnel, bath precipitating-draining vessel, trap door separator, filter, membrane, centrifuge, cyclone, floatation, frothing, sedimentation, decanting, crystilization Wherein said basic gases are volatilized before, during, or following the absorption of one or more acid gases in one or more absorbers Wherein said basic gases are volatilized from one or more solutions containing dissolved basic gases Wherein energy efficient ammonia recovery enables a higher practical absorber temperature, higher concentration of ammonia in gases exiting acid gas absorber, greater partial pressure of ammonia in gases exiting acid gas absorber, or a combination thereof Wherein said higher temperature absorber enables one or more or a combination of the following: faster absorption kinetics, prevents precipitation in one or more absorbers or stages, higher $CO_2$ loading, relatively fast absorption kinetics at higher $CO_2$ loading, smaller absorption column, lower cost absorption column, reduced need to cool acid gas or acid gas containing gas stream before entering absorber, reduced need to remove water vapor form acid gas or acid gas containing gas stream before entering absorber Wherein the temperature difference between the absorber and desorber may be less than 60° C., or less than 50° C., or less than 40° C., or less than 30° C., or less than 20° C., or less than 10° C., or a combination thereof Wherein the temperature difference between the absorber and desorber may be sufficiently low to enable the implementation of a heat pump Wherein said heat pump extracts heat from said absorber and releases said heat into said desorber Wherein said heat pump absorbs at least a portion of the enthalpy of absorption before, during, or after, or combination thereof the absorption of one or more acid gases and desorbs said heat to facilitate acid gas desorption Wherein said heat pump absorbs at least a portion of the enthalpy of absorption internally within during absorption Wherein said heat pump heat exchanges directly with or within the units or components inside, or within trays, or within packing materials, or as packing materials, or as trays, or surrounding, or outside or combination thereof one or more absorbers Wherein said heat pump possesses a coefficient of performance greater than 1, greater than 1.25, greater than 1.5, greater than 1.75, greater than 2, greater than 2.25, greater than 2.5, greater than 2.75, greater than 3, greater than 3.25, greater than 3.5, greater than 3.75, greater than 4, greater than 4.25, greater than 4.5, greater than 4.75, greater than 5, greater than 5.25, greater than 5.5, greater than 5.75, greater than 6, greater than 7, greater than 8, greater than 9, greater than 10, or a combination thereof Wherein said heat pump is powered by electricity Wherein said heat pump is powered by steam or heat Wherein said absorber operates at a temperature above the dew point of one or more hydrocarbons in a $CO_2$ EOR gas processing gas stream Wherein said absorber operates at a temperature above the dew point of one or more components of one or more gas streams Wherein acid gas streams or inputs may comprise one or more or a combination of the following:

Wherein the temperature of one or more acid gas absorbers is greater than 20° C., greater than 30° C., or greater than 40° C., or greater than 45° C., or greater than 50° C., or greater than 55° C., or greater than 60° C., or greater than 65° C., or greater than 70° C., or greater than 75° C., or greater than 80° C., or greater than 85° C., or greater than 90° C., or greater than 95° C.

Wherein the acid gas removal unit comprises a $CO_2$ capture unit

Wherein the integrated process comprises a $CO_2$ capture unit

Wherein the acid gas removal unit employs aqueous ammonia as an absorbent

Wherein the basic gas recovery unit or abatement cycle employs water mixed with one or more reagents to reduce solubility of one or more basic gas-acid gas salts Wherein the basic gas recovery unit or abatement cycle employs one or more reagents to reduce solubility of one or more basic gas-acid gas salts Wherein the basic gas recovery unit or abatement cycle employs a mixture of one or more non-volatile organic solvents with water as a solvent Wherein the basic gas recovery unit or abatement cycle employs one or more common ion salts with water as a solvent Wherein the basic gas recovery unit or abatement cycle employs one or more salts with water as a solvent Wherein the acid gas removal unit employs the comprises similar or the same reagents as the basic gas recovery unit Example Embodiments 7

A process for separating or recovering basic gases comprising:

Absorbing ammonia from an ammonia containing gas stream into an ammonia-lean solution, forming an ammoniated solution Contacting said ammoniated solution with an acid gas to form an acid gas rich ammoniated solution Concentrating said acid gas rich ammoniated solution using a semipermeable membrane Cooling said acid gas rich ammoniated solution to induce ammonia-acid gas salt precipitation Example Sub-Embodiments Wherein the acid gases comprise one or more or a combination of the following: $CO_2$, $H_2S$, HF, $SO_x$, $NO_x$, HCl Wherein the membrane concentrating step is conducted at a higher temperature than the ammonia absorption step Wherein the concentrated ammonia-acid gas solution is cooled to induce precipitation Wherein semipermeable membrane forms a concentrate solution and a permeate solution Wherein the permeate solution is employed as the ammonia-lean solution employed in ammonia absorption Wherein semipermeable membrane forms a concentrate solution and a permeate solution Wherein the permeate solution comprises freshwater Wherein semipermeable membrane forms a concentrate solution and a permeate solution Wherein the permeate solution comprises mostly freshwater with traces of ammonia Wherein the precipitate is removed Wherein the precipitate is removed and the removal process comprises one or more or a combination of the following: cyclone, filter, centrifuge Wherein the precipitate is returned to a process from which the ammonia originated Wherein the solution after precipitation removal is recycled to the acid gas contacting column Wherein the solution after precipitation removal is recycled to the acid gas contacting column and mixed with the acid gas contacting solution Wherein the membrane-based process comprises one or more or a combination of the following: reverse osmosis, forward osmosis Wherein the precipitate is further decomposed to form ammonium carbonate or ammonium carbamate and carbon dioxide Wherein the precipitate is further decomposed to form ammonium carbonate or ammonium carbamate or carbon dioxide or mixture thereof Wherein the ammonium carbonate or ammonium carbamate is further converted into urea or a derivative thereof Process of example sub-embodiment 1 wherein the precipitate is further decomposed to form ammonia, water, carbon dioxide, or a combination thereof Example Embodiments 9

A process for separating or recovering basic gases comprising:

Absorbing ammonia from an ammonia containing gas stream into an ammonia-lean solution, forming an ammonia-rich solution Enriching said ammoniated solution with one or more acid gas Precipitating one or more ammonia acid gas salts during or following or a combination thereof said enriching A process for separating or recovering basic gases comprising:

Absorbing ammonia from an ammonia containing gas stream into an ammonia-lean solution, forming an ammoniated solution Contacting said ammoniated solution with an acid gas to form an acid gas rich ammoniated solution Inducing precipitation of said acid gas-ammonia salt via one or more or a combination of the following:
  a. Cooling
  b. Concentrating using a membrane
  c. Concentrating using a desiccant
  d. Precipitation via the dissolution anti-solvent
  e. Precipitation via increasing the concentration of an anti-solvent
  f. Increasing the partial pressure of said acid gas
  g. Increasing the concentration of said acid gas
  h. Common-ion precipitation
  i. Introduction of an acid gas

Example Embodiments 10

A process for separating or recovering acid gases comprising:

Absorbing ammonia from an ammonia containing gas stream into an ammonia-lean solution, forming an ammoniated solution Recovering ammonia from said ammoniated solution by absorbing an acid gas at a sufficient concentration to induce precipitation

Example Embodiments 11

1. A process for separating or recovering basic gases comprising:

Absorbing ammonia from an ammonia containing gas stream into an ammonia-lean solution, forming an ammonia-rich solution Enriching said ammonia rich solution with one or more acid gases Precipitating one or more ammonia-acid gas salts before, during, or following or a combination thereof said enriching 2. A process for separating or recovering basic gases comprising:

Absorbing ammonia from an ammonia containing gas stream into an ammonia-lean or ammonia-ultra-lean or ammonia-free solution, forming an ammonia-rich solution Enriching said ammonia rich solution with one or more acid gases, forming an ammonia-rich, acid gas rich solution Concentrating said ammonia-rich, acid gas rich solution using one or more membrane-based processes, forming one or more retentate and/or permeate streams Employing said permeate as an ammonia-ultra-lean or ammonia-free solution in said 'absorbing ammonia' step Transferring said retentate to one or more further treatment steps 3. The process of example sub-embodiment 1 further comprising separating at least a portion of said precipitate from remaining liquid 4. The process of example sub-embodiment 3 further comprising converting said solid into aqueous ammonia, ammonia, amine, carbon dioxide, ammonium carbamate, ammonium carbonate, ammonia salt fertilizer, aqueous ammonia, aqueous amine, or carbon dioxide, or gaseous acid gas, gaseous basic gas, gaseous ammonia, gaseous amine, dissolved acid gas, or anhydrous ammonia, one or more acid gas lean salts, a solution, an acid gas lean solution, an acid gas rich solution, or combination thereof 5. The process of example sub-embodiment 3 further comprising employing said solid in one or more applications in its exiting form 6. The process of example sub-embodiment 3 further comprising returning said solid to one or more applications wherein the one or more basic gases originated 7. The process of example sub-embodiment 3 further comprising combining said remaining liquid in example sub-embodiment 3 with said retentate in example sub-embodiment 2, forming a combined solution 8. The process of example sub-embodiment 7 further comprising concentrating said combined solution using one or more membrane based processes, forming a second permeate stream and second retentate stream 9. The process of example sub-embodiment 8 wherein said second permeate stream is combined with said permeate in example sub-embodiment 2 and employed as an ammonia-ultra-lean or ammonia-free solution in example sub-embodiment 2

10. The process of example sub-embodiment 8 wherein said second retentate stream is employed as said ammonia-lean solution in example sub-embodiment 1

11. The process of example sub-embodiment 8 wherein said second retentate stream is mixed with a portion of said ammonia-rich solution from example sub-embodiment 1 before or while being employed as said ammonia-lean solution in example sub-embodiment 1

12. The process of example sub-embodiment 1 wherein a portion of said ammonia-rich solution is recirculated and mixed with said ammonia-lean solution before or while said ammonia-lean solution is employed in absorbing ammonia 13. The process of example sub-embodiment 1 wherein a portion of said ammonia-rich solution is recirculated and mixed with said ammonia-lean solution to reduce the partial pressure of one or more acid gases in said ammonia-lean solution before or while said ammonia-lean solution is employed in ammonia absorption 14. The process of example sub-embodiment 6 wherein said one or more applications wherein the one or more basic gases originated comprise one or more or a combination of the following: acid gas removal process, acid gas separation process, urea production, ammonia derived fertilizer production, chemical synthesis, amine synthesis, amine derivative synthesis, ammonia derivative synthesis 15. The process of example sub-embodiment 6 wherein water and/or one or more other reagents transferred to said 'one or more applications from which the one or more basic gases originated' is returned to the process of example sub-embodiment 1 by mixing a portion of one or more streams from said 'one or more applications from which the one or more basic gases originated' with one or more solutions before or during the acid gas enriching step of example sub-embodiment 1

16. The process of example sub-embodiment 15 wherein the amount of water and/or one or more other reagents in one or more streams added to the process of example sub-embodiment 1 from said 'one or more applications from which the one or more basic gases originated' is equivalent water and/or one or more other reagents transferred to said 'one or more applications from which the one or more basic gases originated' in the process of example sub-embodiment 1

17. The process of example sub-embodiment 3 wherein water and/or one or more other reagents transferred out of the process are returned to the process as water and/or one or more other reagents 18. The process of example sub-embodiment 3 wherein water and/or one or more other reagents transferred out of the process are added to the process of example sub-embodiment 1 as a makeup stream comprising water and/or one or more other reagents 19. The process of example sub-embodiment 1 wherein ammonia may comprises one or more or a combination of basic gases 20. The process of example sub-embodiment 2 wherein ammonia may comprises one or more or a combination of basic gases 21. The process of example sub-embodiment 1 wherein one or more solutions may contain one or more resident reagents, wherein said one or more resident reagents comprise one or more organic or non-volatile organic or inorganic reagents or a combination thereof which may remain in solution 22. The process of example sub-embodiment 1 wherein one or more solutions may contain one or more resident reagents, wherein said one or more resident reagents comprise one or more reagents which have a molecular weight or hydration radius below the molecular weight cutoff of one or more semipermeable membranes 23. The process of example sub-embodiment 21 and/or example sub-embodiment 22 wherein said resident reagents comprise one or more reagents which reduce the solubility of one or a more basic gas-acid gas salts or one or more acid gas-rich ammonia-acid gas salts relative to the solubility of said salts in water without said one or more reagents 24. The process of example sub-embodiment 1 and/or example sub-embodiment 2 wherein the one or more solutions may contain urea 25. The process of example sub-embodiment 1 and/or example sub-embodiment 2 wherein urea absorbs or accumulates in one or more solutions and may be recovered using precipitation 26. The process of example sub-embodiment 1 and/or example sub-embodiment 2 wherein one or more or a combination of acid gases absorb in solution simultaneous to the absorbing of one or more basic gases, forming a first acid gas rich, basic gas rich solution 27. The process of example sub-embodiment 1 and/or example sub-embodiment 2 wherein the gas stream containing one or more basic gases may also contain one or more acid gases 28. The process of example sub-embodiment 26 wherein one or more acid gases are desorbed from said acid gas rich, basic gas rich solution, forming an acid gas lean, basic gas rich solution and desorbed acid gases 29. Wherein said desorbed acid gases may comprise at least a portion $H_2S$ 30. The process of example sub-embodiment 26 wherein said first acid gas rich, basic gas rich solution is further enriched with carbon dioxide, or cooled to precipitate at least a portion ammonia-carbon dioxide, or concentrated with one or more membranes, or a combination thereof 31. Process of example sub-embodiment 30 wherein precipitate is separated and the remaining solution may contain hydrogen sulfide 32. Process of example sub-embodiment 31 wherein hydrogen sulfide is desorbed from said remaining solution 33. The process of example sub-embodiment 28 wherein $CO_2$ and/or one or more acid gases are absorbed in said acid gas lean, basic gas rich solution, forming a second acid gas rich, basic gas rich solution, or a precipitate, or a basic gas lean solution-precipitate slurry, or a basic gas lean solution, or a combination thereof 34. The process of example sub-embodiment 33 wherein said $CO_2$ is from one or more gas mixtures or one or more emission gases Other Example Embodiments and Subembodiments A process further comprising employing said precipitate in one or more applications in its existing form. A process further comprising returning said precipitate to one or more applications from which the gas stream originated.

A process wherein one or more applications from which the gas stream originated comprise one or more or a combination of the following: acid gas removal process, acid gas separation process, urea production, ammonia derived fertilizer production, chemical synthesis, amine synthesis, amine derivative synthesis, and ammonia derivative synthesis.

A process wherein one or more of the solutions comprise a resident reagent selected from the group consisting of organic reagents, non-volatile, organic reagents, inorganic reagents, and combinations thereof wherein said reagent remains in solution.

A process wherein resident reagent comprises a reagent which has a molecular weight or hydration radius below the molecular weight cutoff of a semipermeable membrane.

A process wherein resident reagent comprises a reagent which reduces the solubility of a basic gas-acid gas salt or an acid gas-rich ammonia-acid gas salt relative to the solubility of said salt in water without said resident reagent.

A process which further comprises recovering urea by precipitation or as a precipitate.

A wherein said precipitate is separated and any remaining solution comprises hydrogen sulfide.

A process desorbing hydrogen sulfide.

A process wherein $CO_2$ and/or one or more acid gases or other acid gases is from one or more gas mixtures or one or more emission gases A process wherein desorbed acid gas comprises $H_2S$ A process wherein the volume ratio of permeate to retentate is greater than about 10:1.

A process wherein the volume ratio of permeate to retentate is greater than about 100:1.

A process wherein the volume ratio of second retentate to second permeate is greater than about 3:1.

A process wherein the volume ratio of second retentate to second permeate greater than about 10:1.

A process wherein the volume ratio of second retentate to second permeate is greater than about 100:1.

A process of wherein a portion of said ammonia-rich solution is recirculated and mixed with said ammonia-lean solution to reduce the partial pressure of one or more acid gases in said ammonia-lean solution before or while said ammonia-lean solution is employed in ammonia absorption.

A process further comprising absorbing a gas stream comprising H2S with said ammonia-rich solution during or following the formation of said ammonia rich solution to form an H2S-rich, ammonia-rich solution and wherein an H2S is desorbed from said $H_2S$-rich, ammonia-rich solution to said acid gas-lean, ammonia-rich solution before enriching said acid gas-lean, ammonia-rich solution with CO2:

1. An integrated process for separating or recovering basic gases comprising:
    (1) a first cycle comprising:
        absorbing ammonia from an ammonia containing gas stream into an ammonia-lean solution, forming an ammonia-rich solution;
        enriching said ammonia rich solution with one or more acid gases;
        precipitating one or more ammonia-acid gas salts wherein said precipitating occurs before enriching, during enriching, after enriching, or a combination thereof; and separating said precipitate from any remaining liquid; and
(2) a second cycle comprising:
(a) absorbing ammonia from an ammonia containing gas stream into an ammonia-lean, an ammonia-ultra-lean, or ammonia-free solution, to form an ammonia-rich solution;
(b) enriching said ammonia-rich solution with one or more acid gases to form an ammonia-rich, acid gas rich solution; and
(c) concentrating said ammonia-rich, acid gas rich solution using one or more membranes to form a retentate and a permeate wherein said permeate is suitable for use as at least a portion of the ammonia-ultra-lean or ammonia-free solution in step (a) of the second cycle.

2. The process of '1.' which further comprises combining at least a portion of the remaining liquid in the first cycle with at least a portion of the retentate in the second cycle and concentrating the combination using one or more membranes to form a second retentate and a second permeate.

3. The process of '2.' wherein said second retentate is suitable for use as the ammonia-lean solution in the first cycle and wherein said second permeate is suitable for use as an ammonia-ultra-lean or ammonia-free solution in the second cycle.

4. The process of '2.' which further comprises recycling at least a portion of said second retentate to be employed as at least a portion of the ammonia-lean solution in the first cycle and recycling at least a portion of said second permeate to be employed as at least a portion of the ammonia-ultra-lean or ammonia-free solution in the second cycle.

5. The process of '4.' which further comprises mixing said second retentate with at least a portion of said ammonia-rich solution in cycle 1 prior to or while employing said second retentate as said ammonia-lean solution in the first cycle.

6. The process of any of '1 to 5' wherein the volume of permeate is greater than the volume of retentate.

7. A process for separating or recovering basic gases comprising:
(a) absorbing ammonia from an ammonia containing gas stream into an ammonia-lean, an ammonia-ultra-lean, or ammonia-free solution, to form an ammonia-rich solution;
(b) enriching said ammonia-rich solution with one or more acid gases to form an ammonia-rich, acid gas rich solution; and
(c) concentrating said ammonia-rich, acid gas rich solution using one or more membranes to form a retentate and a permeate wherein said permeate is suitable for use as at least a portion of the ammonia-ultra-lean or ammonia-free solution in step (a).

8. The process of '7.' further comprising transferring said retentate to one or more further treatment steps.

9. The process of '7.' wherein said ammonia containing gas stream comprises one or more other gases.

10. The process of '7.' wherein the ammonia containing gas stream further comprises an acid gas.

11. A process for separating or recovering basic gases comprising:
absorbing ammonia from an ammonia containing gas stream into an ammonia-lean solution, forming an ammonia-rich solution;
enriching said ammonia rich solution with one or more acid gases; and
precipitating one or more ammonia-acid gas salts wherein said precipitating occurs before enriching, during enriching, after enriching, or a combination thereof.

12. The process of '11.' wherein a portion of said ammonia-rich solution is recirculated and mixed with said ammonia-lean solution before or while said ammonia-lean solution is employed in absorbing ammonia 13. The process of '11.' wherein a portion of said ammonia-rich solution is recirculated and mixed with said ammonia-lean solution to reduce the partial pressure of one or more acid gases in said ammonia-lean solution before or while said ammonia-lean solution is employed in ammonia absorption.

14. The process of '11.' further comprising absorbing an acid gas with the ammonia to form an acid gas rich, ammonia-rich solution and precipitating at least a portion of ammonia-carbon dioxide by (1) enriching said acid gas rich, ammonia-rich solution with carbon dioxide, (2) cooling said acid gas rich, ammonia-rich solution, (3) concentrating said acid gas rich, ammonia-rich solution with one or more membranes, or (4) a combination thereof.

15. The process of '14.' further comprising separating said one or more ammonia-carbon dioxide precipitates from remaining solution and further comprising desorbing H2S from said remaining solution.

Notes

Note:
More water may be transferred in S-1 to the $CO_2$ capture unit than is absorbed by $NH_3$ Wash #1 and $NH_3$ Wash #2. This net transfer of water from the ammonia recovery unit to the $CO_2$ capture unit is addressed by, for example, the return stream, L-3, which may transfer or return water equivalent to this net transfer of water.

Note:
Solutions described herein may include one or more organic or non-volatile organic or inorganic reagents or a combination thereof, which may have a molecular weight or hydration radius below the molecular weight cutoff of one or more semipermeable membranes. For example, said one or more reagents may be employed to reduce the solubility of one or a more ammonia-acid gas salts or one or more acid gas-rich ammonia-acid gas salts relative to the solubility of said salts in water without said one or more reagents. For example, said one or more reagents may include, but are not limited to, ethylene glycol, propylene glycol, urea, or glycerol. Said one or more reagents may enable a reduction the relative amount of acid gas in acid gas enriching in the one or more acid gas enriching steps required to precipitate one or more ammonia-acid gas salts. Said one or more reagents may enable a lower acid gas loading or lower $CO_2$ loading in solution to facilitate precipitation. Said one or more reagents may enable greater capacity per unit volume of solution for ammonia recovery. Said one or more reagents may enable lower energy consumption membrane-based concentrating (for example: lower energy consumption reverse osmosis) by, for example, enabling a lower concentration or osmotic pressure or both of ammonia-acid gas or ammonia-carbon dioxide to reach the solubility limits of ammonia-acid gas or ammonia-carbon dioxide. Said one or more reagents may enable precipitation or greater precipitation with relatively less temperature change, with less energy requirement, or a combination thereof. Said one or more reagents may enable the precipitation of one or more salts that may require more energy or may be more challenging or may be more energy intensive or may be infeasible or a combination thereof to precipitate from a solution where water is the only solvent.

The concentration or composition of said one or more reagents may be similar in NH$_3$ Wash #1 as in NH$_3$ Wash #2 and/or as in other interconnected processes or steps, if any.

Note:

$CO_2$ is provided as an example acid gas. Other acid gases or acidic reagents instead of or in addition to $CO_2$ may be employed.

Note:

More than two NH$_3$ Wash Cycles may be employed and wash cycles and redundant wash cycles may be employed.

Note:

The present embodiment may exhibit, in some applications, a net water loss with the exiting ammonia or basic gas precipitate. Water may be returned or replenished in the process to make-up for this water loss.

Note:

The present embodiment may exhibit a net water surplus may accumulate, for example, due to the condensation or absorption of water vapor in one or more ammonia-feed gas streams. Said net water surplus may be removed, for example, from one or more permeate streams in the process.

Note:

NH$_3$ is provided as an example basic gas. Other basic gases or basic reagents instead of or in addition to NH$_3$ may be employed.

Note:

Excess water may be also or instead recovered from RO #1 permeate.

Note:

Residual ammonia in the remaining gas or liquid or combination thereof stream formed following ammonia absorption in, for example, NH$_3$ Wash #2, may be further treated using, including, but not limited to, acid wash scrubbing, catalytic oxidation, or a combination thereof.

Note:

The relative amount of ammonia-rich NH$_3$ Wash #1 recirculated to mix with the ammonia-lean solution before or while entering NH$_3$ Wash #1 may be dependent on, for example, the $CO_2$ partial pressure or $CO_2$ equilibrium partial pressure in the ammonia-containing gas or liquid stream entering NH$_3$ Wash #1. The purpose of said recirculating and mixing, may include, but is not limited to, reducing the equilibrium partial pressure of $CO_2$ in said ammonia-lean wash solution to prevent or minimize the volatilization of $CO_2$ into said gas stream.

Note:

For example, may include, but are not limited to, if one or more ammonia containing gas or liquid streams entering an NH$_3$ Wash contain both ammonia and $CO_2$ or a purpose of said process is to selectively absorb ammonia instead of $CO_2$ (or other acid gas or combination of acid gases), or a combination thereof, the one or more embodiments described herein may benefit from relatively higher $CO_2$ loading or a lack of a recirculating stream to reduce $CO_2$ loading. In said example, ammonia may be absorbed, while $CO_2$ is minimally absorbed, not absorbed, or partially desorbed, enabling the selective absorption of ammonia over $CO_2$ or other acid gases ($CO_2$ is provided as an example acid gas). For example, said example may enable the separation of ammonia from an ammonia-acid gas stream with high selectivity for ammonia relative to said acid gases.

Note:

Energy recovery and/or pressure recovery devices may be employed in, for example, membrane based processes and relative devices, such as Reverse Osmosis processes and devices.

Note:

Combined/integrated, batch or continuous systems for precipitate formation and dissolution of ammonia-containing precipitate in, for example, acid gas separation or removal systems. The following example systems, as well as other systems described herein or known in the art, may minimize or eliminate precipitate handling or transfer.

Continuous system with a rotating filter or funnel or combination thereof where the solids are transferred into the mixing vessel with the rich solution with minimal air contact Semi-Batch System where, simultaneously, vessel #1 undergoes cooling precipitation, vessel #2 undergoes liquid-solid separation (filtrations or draining or both)—where solids remain in the vessel, and vessel #3 undergoes mixing of solid precipitate with the solution exiting the absorber. After completing said batch, what was previously vessel #3 becomes vessel #1, and what was previously vessel #1 becomes vessel #2, and what was previously vessel #2 becomes vessel #3. The vessels change operations during or subsequent to the completion of each batch.

Heat pump within process—Heat pump process without an economizer

40° C. absorption—80° C. desorption system

50° C. absorption higher pressure—60-70° C. desorption slightly lower pressure

Dissolving precipitate from RecovAm into acid gas rich solution exiting the absorber before the cross-heat exchanger.

Example Stream Summary

Example Stream Summary Tables for FIG. 2
(Below)

| Row ID | Related Process Element | Gas Blower or Compressor (SC-1) | | |
|---|---|---|---|---|
| A | Stream Description | Input Biogas (Pre-Treated) | Gas Blower or Compressor | Pressurized Acid Gas-Rich Gas Stream |
| B | Stream Number | G-1 | SC-1 | G-2 |
| C | Input, Output, Internal, Unit Op., Input with Conditions Change | Input | Unit Op. | Internal |
| D | Internal Input', 'Internal Output', Input, Output, or N/A | Input | N/A | Internal Output |
| E | Relationship with Other Streams | Input Stream to SC-1 | Pressurizes G-1 to produce G-2 | (G-2) = (G-1) pressurized by SC-1 |

| Row ID | Acid GAs Absorber | | | | | |
|---|---|---|---|---|---|---|
| A | Pressurized Acid Gas-Rich Gas Stream | Acid-Gas Lean Solution Post Cross Exchanger, During Heat Pump | Heat Exchange Fluid for Absorber Side of Heat Pump. Cools absorber while supplying heat to Heat Pump | Heat Exchange Fluid for Absorber Side of Heat Pump. Cools absorber while supplying heat to Heat Pump | Acid-Gas Lean, Ammonia-Rich Methane | Acid Gas Rich Solution Exiting Acid Gas Absorber |
| B | G-2 | L-9 (#2) | HE-2 (Input Heat Exchange Fluid) | HE-2 (Output Heat Exchange Fluid) | G-3 | L-1 |
| C | Internal | Internal | Internal Fluid and Unit Op. | Internal Fluid and Unit Op. | Internal | Internal |
| D | Internal Input | Internal Input | Internal Input | Internal Output | Internal Output | Internal Output |
| E | (G-2) = (G-1) pressurized by SC-1 | L-9 #1 After Initial Cooling by Heat Pump (HE-2). L-9 (#2) enters the absorber. | Heat Exchange Fluid before Heat Exchange with L-9 and absorption liquid during absorption | Heat Exchange Fluid after Heat Exchange with L-9 and absorption liquid during absorption | (G-3) = ([L-9] + [G-2]) − (L-1) | (L-1) = ([L-9] + [G-2]) − (G-3) |

| Row ID | Dividing Liquid Stream to Return Liquid to Ammonia Recovery and Transfer CO$_2$-Rich Solution as Water Return Stream | | |
|---|---|---|---|
| A | Acid Gas Rich Solution Exiting Acid Gas Absorber | Acid Gas Rich Solution from Absorber to Ammonia Return | A Portion CO2 Absorption Solution from CO2 Absorber (CO2-Rich) Transferred to Return Water Transferred from RecovAm to CO2 Capture in S-1 |
| B | L-1 | L-2 | L-3 |
| C | Internal | Internal | Internal |
| D | Internal Input | Internal Output | Internal Output |
| E | (L-1) = ([L-9] + [G-2]) − (G-3) | (L-2) = (L-1) − (L-3) | (L-3) = (L-1) − (L-2) |

| Row ID | Ammonia Return | | | |
|---|---|---|---|---|
| A | NH3—CO2—H2O Solid Ammonia Return Stream Produced by RecovAm Ammonia Recovery | Acid Gas Rich Solution from Absorber to Ammonia Return | Mixing Vessel to Reintroduce NH3—CO2—H2O Solid from Ammonia Recovery (RecovAm) | Acid Gas Rich Solution After Dissolution of Ammonia Return Stream from RecovAm |
| B | S-1 | L-2 | Mix | L-4 |
| C | Internal | Internal | Unit Op. | Internal |
| D | Internal Input | Internal Input | N/A | Internal Output |
| E | (S-1) = (LS-1) − (L-15) Comprises solid separated from LS-1 using F-1. | (L-2) = (L-1) − (L-3) | Mixes S-1 with L-2 to produce L-4 | (L-4) = (L-2) + (S-1) |

| | Cross Head Exchange | | | | | | |
|---|---|---|---|---|---|---|---|
| A | Pump to transfer acid-gas rich solution across heat exchanger and into | Acid Gas Rich Solution After Dissolution of Ammonia Return Stream | Pump to transfer acid-gas lean solution across heat exchanger and into | Acid Gas Lean Solution After Desorber. Pumped to Cross Heat Exchanger | Cross Heat Exchanger heat exchanging relatively 'hot' solution exiting desorber | Preheated 'Acid Gas Rich Solution After Dissolution of Ammonia Return | Acid-Gas Lean Solution Post Cross Exchanger, Pre-Heat Pump |

-continued

| | | | | Cross Head Exchange | | | |
|---|---|---|---|---|---|---|---|
| | the acid gas desorber | from RecovAm' Pumped to Cross Heat Exchanger | the acid gas absorber | | with relatively 'cold' solution exiting absorber | Stream from RecovAm' to Acid Gas Desorber | |
| B | P-1 | L-5 | P-2 | L-8 | RE-1 | L-6 | L-9 (#1) |
| C | Unit Op. | Internal | Unit Op. | Internal | Unit Op. | Internal | Internal |
| D | N/A | Internal Input | N/A | Internal Input | N/A | Internal Output | Internal Output |
| E | Pumps L-4 into HE-1 (L-5) and transfers pre-heated solution (L-6) into desorber | Same composition as L-4. Comprises L-4 after pumping by P-1 | Pumps L-7 into HE-1 (L-8) and transfers pre-cooled solution (L-9) into desorber | Same composition as L-7. Comprises L-7 after pumping by P-2 | Heat exchanges L-5 with L-8 to product pre-heated liquid stream L-6 and L-9 | Same composition as L-4. Pre-Heated from Cross Heat Exchange (HE-1) | L-9 previously cooled by L-5 in Cross Heat Exchanger |

| | | | | Acid Gas Desorber and Reboiler | | | |
|---|---|---|---|---|---|---|---|
| A | Preheated 'Acid Gas Rich Solution After Dissolution of Ammonia Return Stream from RecovAm' to Acid Gas Desorber | Condensated from Desorbed Gas Condenser | Desorbed Acid Gases, Pre-Condenser | Acid Gas Lean Solution exiting Desorption Unit/ Reboiler | Supplier heat to the acid gas desorber. Heat may be supplied by heat pump. | Heat Exchange Fluid for Desorber/ Reboiler Side of Heat Pump. Heats reboiler from heat transferred by heat pump | Heat Exchange Fluid for Desorber/ Reboiler Side of Heat Pump. Heats reboiler from heat transferred by heat pump | Electric Heat Pump Extracts Heat from Heat Generated by Acid Gas Absorber and Transfers Heat to Acid Gas Desorber. |
| B | L-6 | L-10 | G-6 | L-7 | Reboiler | HE-3 (Input Heat Exchange Fluid) | HE-3 (Output Heat Exchange Fluid) | Heat Pump |
| C | Internal | Internal | Internal | Internal | Unit Op. | Internal Fluid and Unit Op. | Internal Fluid and Unit Op. | Unit Op. |
| D | Internal Input | Internal Input | Internal Output | Internal Output | N/A | Internal Input | Internal Output | N/A |
| E | Same composition as L-4. Pre-Heated from Cross Heat Exchange (HE-1) | (L-10) = (G-6) – (G-7); Cooled using HE-4 | (G-6) = [(L-6) + (L-10)] – L-7 | (L-7) = [(L-6) + (L-10)] – (G-6) | Supplies heat to the acid gas desorber. L-7 may exit the reboiler | Heat Exchange Fluid before Heat Exchange with desorber unit (e.g. reboiler) | Heat Exchange Fluid after Heat Exchange with desorber unit (e.g. reboiler) | Heat transferred by heat pump is equal to the heat generated during absorption + heat generated from heat pump electricity consumption |

| Row ID | Acid Gas Desorber - Condenser | | | | | |
|---|---|---|---|---|---|---|
| A | Condensed from Desorbed Gas Condenser | Desorbed Acid Gases, Pre-Condenser | Cooling fluid (such as cooling water) employed to cool condenser | Cooling fluid (such as cooling water) employed to cool condenser | Condenses Condensable Vapors in desorbed gases, increasing the purity of the desorbed acid gases and recovering water and ammonia | Desorbed acid gases after condenser |
| B | L-10 | G-6 | HE-4 (Input Heat Exchange Fluid) | HE-4 (Output Heat Exchange Fluid) | Condenser | G-7 |
| C | Internal | Internal | Internal Fluid and Unit Op. | Internal Fluid and Unit Op. | Unit Op. | Output |
| D | Internal Output | Internal Input | Internal Input | Internal Output | N/A | Output |
| E | (L-10) = (G-4) − (G-5); Cooled using HE-4 | (G-6) = [(L-6) + (L-10)] − L-7 | Heat Exchange Fluid before Heat Exchange with Condenser to Condense Condensable Vapor from G-6 | Heat Exchange Fluid after Heat Exchange with Condenser to Condense Condensable Vapor from G-6 | Condenses condensable vapors in G-6 by cooling G-6 in a heat exchange with HE-4. Produces G-7 and L-10. | (G-7) = (G-6) − (L-10) |

| Row ID | NH$_3$ Wash #1 | | | |
|---|---|---|---|---|
| A | Acid-Gas Lean, Ammonia-Rich Methane | Acid-Gas Lean, Ammonia-Lean Methane | Ammonia-Lean absorption solution with slightly greater ammonia-carbon dioxide ratio than L-20 to minimize CO2 losses | Ammonia-Rich absorption solution with high ammonia-carbon dioxide ratio |
| B | G-3 | G-4 | L-11 | L-12 |
| C | Internal | Internal | Internal | Internal |
| D | Internal Input | Internal Output | Internal Input | Internal Output |
| E | (G-3) = ([L-9] + [G-2]) − (L-1) | (G-4) = ([G-3] + [L-11]) − (L-12) | (L-11) = (L-20) + (L-13) | (L-12) = ([L-11] + [G-3]) − (G-4) |

| Row ID | CO$_2$ Injection Precip. | | | | | |
|---|---|---|---|---|---|---|
| A | Pure CO2, may comprise a portion of G-7, for example, G-7 further purificaiton step | A Portion CO2 Absorption Solution from CO2 Absorber (CO2-Rich) Transferred to Return Water Transferred from RecovAm to CO2 Capture in S-1 | Ammonia-Rich Absorption solution with high ammonia-carbon dioxide ratio | Ammonia-Rich, CO2-Rich slurry produced from CO2 injection precipitation | Input coolant, before heat exchange with CO2 injection precipitation | Output coolant, after heat exchange with CO2 injection precipitation |

-continued

| Row ID | CO₂ Injection Precip. | | | | | |
|---|---|---|---|---|---|---|
| B | G-8 | L-3 | L-14 | LS-1 | HE-5 (Input Heat Exchange Fluid) | HE-5 (Output Heat Exchange Fluid) |
| C | Input | Internal | Internal | Internal | Internal Fluid and Unit Op. | Internal Fluid and Unit Op. |
| D | Input | Internal Input | Internal Input | Internal Output | Internal Input | Internal Output |
| E | Pure CO2, mass of CO2 is the external mass added in CO2 Injection Precipitation | (L-3) = (L-1) − (L-2) | (L-14) = (L-12) − (L-13), same composition as L-12 | (LS-1) = (L-14) + (L-3) + (G-8) | Same composition at HE-5 Output, cooler temperature than HE-5 Output. May be 10 C. cooler than LS-1. | Same composition at HE-5 Input, warmer temperature than HE-5 Output, may be 5 C. cooler than LS-1 |

| Row ID | Liquid Solid Separation | | | | |
|---|---|---|---|---|---|
| A | Liquid Solid Separation Device(s) separating solid-liquid slurry into practically separated liquid and solid streams | Liquid-Solid Slurry produced from CO2 injection precipitation and/or cooling | NH3—CO2—H2O Solid Ammonia Return Stream Produced by RecovAm Ammonia Recovery | Ammonia-Lean, CO2-Rich Liquid Phase separated using Liquid-Solid separation device | Liquid pump to pump L-15 solution to Merge #1. Feed solution is L-15, exiting solution is L-16. |
| B | F-1 | LS-1 | S-1 | L-15 | P-3 |
| C | Unit Op. | Internal | Internal | Internal | Unit Op. |
| D | N/A | Internal Input | Internal Output | Internal Output | N/A |
| E | Separates LS-1 into L-15 and S-1 | (LS-1) = (L-14) + (L-3) + (G-8) | (S-1) = (LS-1) - (L-15) Comprises solid separated from LS-1 using F-1. | (L-15) = (LS-1) - (S-1) Comprises liquid separated from LS-1 using F-1. | Liquid pump to pump L-15 solution to Merge #1. Feed solution is L-15, exiting solution is L-16. |

| Row ID | Merge #1 | | | |
|---|---|---|---|---|
| A | Ammonia-Lean, CO2-Rich Liquid Phase separated using Liquid-Solid separation device | Aqueous Ammonia-Carbon Dioxide Concentrate Solution from RO #1 | Combines CO2 Rich, NH3 Lean solution from Liquid-Solid Separation with Concentrate from RO #1 | Combined CO2 Rich, NH3 Lean Solution from CO2 Injection Precipitation and concentrate from RO #1 (Before P-4) |
| B | L-16 | L-28 | Merge #1 | L-17 |
| C | Internal | Internal | Unit Op. | Internal |
| D | Internal Input | Internal Input | N/A | Internal Output |
| E | (L-15) = (LS-1) - (S-1) Comprises liquid separated from LS-1 using F-1. | (L-28) = ([L-26] - [L-27]) | Merges L-28 with L-16 to produce L-17 | (L-17) = (L-16) + (L-28) |

| Row ID | Reverse Osmosis (RO) #2 | | | | |
|---|---|---|---|---|---|
| A | High' Pressure Pump for Pressurizing RO #2 Feed Solution | Combined CO2 Rich, NH3 Lean Solution from CO2 Injection Precipitation and concentrate from RO #1 (Feed solution to RO #2) | Reverse Osmosis unit to recover water added to NH3 Wash #1 cycle from NH3 Wash #2 cycle from L-28 | Permeate liquid (practically freshwater) from RO #2. | CO2-Rich Concentrate Solution from RO #2 |
| B | P-4 | L-18 | RO #2 | L-19 | L-20 |
| C | Unit Op. | Internal | Unit Op. | Internal | Internal |
| D | N/A | Internal Input | N/A | Internal Output | Internal Output |
| E | Pumps/Pressurizes L-17 (input) to form RO #2 feed solution, L-18 (output) | (L-18) = (L-16) + (L-28) | Transforms feed solution (L-18) into permeate (L-19) and concentrate (L-20). May employ DTRO or HPRO | (L-19) = (L-18) - (L-20) | (L-20) = (L-18) - (L-19) |

| Row ID | Merge #3 | | | | |
|---|---|---|---|---|---|
| A | Ammonia-Rich absorption solution with high ammonia - carbon dioxide ratio recycled to increase the N:C ratio to prevent minimize CO2 losses in NH3 Wash #1 | CO2-Rich Concentrate Solution from RO #2 | Ammonia-Lean absorption solution with slightly greater ammonia - carbon dioxide ratio than L-20 to minimize CO2 losses | Combines RO #2 CO2-Rich Concentrate Solution with Ammonia-Rich Solution from NH3 Wash #1 to Increase Ammonia - Carbon Dioxide Ratio to Minimize CO2 Losses in the NH3 Wash | |
| B | L-13 | L-20 | L-11 | Merge #3 | |
| C | Internal | Internal | Internal | Unit Op. | |
| D | Internal Input | Internal Input | Internal Output | N/A | |
| E | (L-13) = (L-12) - (L-14), same composition as L-12 | (L-20) = (L-18) - (L-19) | (L-11) = (L-20) + (L-13) | Merges L-20 and L-13 to produce L-11 | |

| Row ID | Merge #2 | | | | |
|---|---|---|---|---|---|
| A | Excess Water Output. May be for situations where there is a net water surplus in the NH3 recovery cycle | Practically ammonia-free Liquid from Permeate of RO #2 Transferred to NH3 Wash #2 Cycle. May return water in L-28 to NH3 Wash #2 Cycle | Practically ammonia-free liquid employed as input ammonia-lean water wash liquid in NH3 Wash #2 | Combines permeate liquids from RO #1 and RO #2 to form input wash liquid for NH3 Wash #2 | Permeate liquid from RO #1 transferred to Merge #2 |
| B | L-21 | L-22 | L-23 | Merge #2 | L-27 |
| C | Output | Internal | Internal | Unit Op. | Internal |
| D | Output | Internal Input | Internal Output | N/A | Internal Input |

| Row ID | Merge #2 | | | | |
|---|---|---|---|---|---|
| E | (L-21) = (L-19) - (L-22) | (L-22) = (L-19) - (L-21) | (L-23) = (L-22) + (L-27) | Combines L-22 with L-27 to produce L-23 | (L-27) = (L-26) - (L-28) |

| Row ID | NH$_3$ Wash #2 | | | |
|---|---|---|---|---|
| A | Acid-Gas Lean, Ammonia-Lean Methane | Practically ammonia-free liquid employed as input ammonia-lean water wash liquid in NH3 Wash #2 | Relatively Ammonia-Rich Solution Exiting NH3 Wash #2 | Acid-Gas Lean, Ammonia-Ultra-Lean Methane |
| B | G-4 | L-23 | L-24 | G-5 |
| C | Internal | Internal | Internal | Output |
| D | Internal Input | Internal Input | Internal Output | Output |
| E | (G-4) = ([G-3] + [L-11]) - (L-12) | (L-23) = (L-22) + (L-27) | (L-24) = [(L-23) + (G-4)] - (G-5) | (G-5) = [(G-4) + (L-23)] - (G-5) |

25

| Row ID | CO$_2$ Injection (no precipitation) | | | |
|---|---|---|---|---|
| A | CO2 Input to CO2 Injection (No Precipitation) | Carbonation Vessel employed to enrich 'ammonia-rich' solution from NH3 Wash #2 with CO2 | Relatively Ammonia-Rich Solution Exiting NH3 Wash #2 | CO2 Rich, Ammonia-Rich Solution produced by CO2 Injection Unit in NH3 Wash #2 Cycle |
| B | G-9 | CO2 Inject | L-24 | L-25 |
| C | Input | Unit Op. | Internal | Internal |
| D | Input | N/A | Internal Input | Internal Output |
| E | CO2 may be newly sourced. Alternatively, CO2 may be derived from G-6 or G-7 or may be employed as a purification step for G-6 or G-7 | Absorbs G-9 into L-24 to produce L-25. May undergo cooling (or heating) | (L-24) = [(L-23) + (G-4)] - (G-5) | (L-25) = (L-24) + (G-9) |

| Row ID | Reverse Osmosis (RO) #1 | | | | |
|---|---|---|---|---|---|
| A | Pump employed to pressurize CO2-Rich solution to appropriate hydraulic pressure as a feed solution in RO #1 | CO2 Rich, Ammonia-Rich Solution produced by CO2 Injection Unit in NH3 Wash #2 Cycle | Permeate Solution (Ammonia-Lean or practically Ammonia-Free) from RO #1 in NH3 Wash Cycle #2 | Aqueous Ammonia-Carbon Dioxide Concentrate Solution from RO #1 | Reverse Osmosis membrane based device or devices (one or more units may be employed) for separating CO2-Enriched NH3 Wash Solution into Concentrate and Permeate |
| B | P-5 | L-26 | L-27 | L-28 | RO #1 |
| C | Unit Op. | Internal | Internal | Internal | Unit Op. |
| D | N/A | Internal Input | Internal Output | Internal Output | N/A |

-continued

| Row ID | Reverse Osmosis (RO) #1 | | | |
|---|---|---|---|---|
| E | Pressurizes/Pumps L-25 to produce pressurized stream, L-26 | (L-25) = (L-24) + (G-9) | (L-27) = (L-26) - (L-28) | (L-28) = ([L-26] - [L-27]) | Separates L-26 into permeate (L-27) and concentrate (L-28) |

Additional Notes and Description #1

Example Driving Forces of a 'Pre-Absorption Column'

May Transform Ammonia in Ammoniated Water-Wash Solution from a Non-Ionic, Unrejected Species into an Ionic, Rejected Species:

Aqueous ammonia without the presence of an acid may possess a hydration radius too small to be effectively rejected by currently available reverse osmosis or forward osmosis membranes because the pH is too high, resulting in non-rejectable 'free ammonia' species. By contacting the ammoniated water wash solution with one or more acid gases, the solution may become acid gas-rich and the pH may be lowered, which may result in rejectable ammonium species and may allow the said rejectable ammonia species to be rejected by conventional aqueous semi-permeable membranes, such as reverse osmosis membranes.

Does not Require Chilling:

Ammonia volatilization/slip from the 'Pre-Absorption Column' (a common consequence of higher absorption temperature) may be beneficial. The gases exiting a Pre-Absorber may be fed directly into an absorption column, thus any ammonia vapor in the gas stream exiting a pre-absorber may inhibit ammonia vaporization in the acid gas absorber or may become absorbed in the acid gas absorber. A pre-absorber may reduce or eliminates challenges related to handling hot flue gas and flue gas water vapor.

Absorbs Flue Gas Water Vapor:

Flue gas released from coal fired power plants may be generally saturated with water vapor at a temperature of about 50° C. By contacting the flue gas with a 'Pre-Absorption Column,' a portion of this water vapor may condense in an ammoniated water wash solution and the flue gas may be cooled before entering the one or more acid gas absorbers Recovers Flue Gas Water Vapor as Freshwater:

During the reverse osmosis concentrating of a n acid gas-rich ammoniated water wash solution, an acid gas rich ammoniated concentrate solution and a fresh water permeate solution may be produced. Due to the absorption of water vapor in, for example, a pre-absorber, which may be part of the ammonia recovery technology, there may be excess freshwater in the permeate stream. This excess fresh water may be a useful byproduct from the process.

Additional Details Regarding Step 2:

According to previous studies on aqueous ammonia-carbon dioxide in Forward Osmosis, the $CO_2$: $NH_3$ loading that may be required to achieve a pH of 8.5 may be about 0.67.

Example Driving Forces of Reverse Osmosis:

High Energetic Efficiency of Reverse Osmosis:

Reverse osmosis may approach the theoretical minimum energy requirement for separating aqueous solutions (http://www.nwri-usa.org/documents/Elimelech_000.pdf).

Concentrating to Ammonia-Carbon Dioxide Concentration in $CO_2$ Capture Process, not Gaseous Ammonia:

Prior art ammonia abatement cycles may generate $NH_3(g)$ or $NH_3(g)$ and water vapor gas mixtures. Prior art ammonia abatement cycles may be unable to achieve the theoretical minimum energy requirement due to the Carnot efficiency and limitations in recovering the enthalpy of vaporization during condensation.

Unlike existing ammonia abatement cycles, one or more ammonia abatement cycles described herein may approach the theoretical minimum energy requirement.

No Enthalpy of Vaporization of Water:

A common challenge in prior art ammonia abatement cycles may be that a large portion of their energy input may be consumed in the consequential evaporation of water.

One or more embodiments described herein may not suffer from this issue as they do not employ steam strippers or strippers or combinations thereof.

Membrane based concentrating may be conducted at a higher temperature than, for example, 20° C. or 30° C. to, for example, increase the solubility of ammonia-carbon dioxide, prevent the formation of precipitate or scaling during membrane concentrating, and enable the membrane-based process to reach a relatively higher concentration of aqueous ammonia-carbon dioxide in the concentrate solution. Said concentrate solution, after being removed from contact with the aqueous membrane to prevent scaling, may be cooled to, for example, less than 30° C., or less than 25° C., or less than 20° C., or less than 15° C., or less than 10° C., or less than 5° C., or less than 0° C. Cooling the solution may reduce solubility of the ammonia-carbon dioxide salt and result in the formation of precipitate. The solid precipitate may be filtered or otherwise removed and added to the $CO_2$ capture process directly (for example, added to a $CO_2$-lean solution before it enters the absorption column). Said removal of the ammonia-carbon dioxide from ammonia slip as a solid precipitate in the ammonia abatement cycle may enable integration of the present ammonia abatement cycle with $CO_2$ capture technologies employing higher concentrations of ammonia, such as concentrations of ammonia, such as aqueous ammonia, that may not be possible directly using a membrane-based process or using the higher $CO_2$-loading required for the aqueous ammonia to be rejected by a membrane. One or more Ammonia-Acid gas precipitates, when added to an aqueous solution or water may achieve higher concentrations than the solution from which said precipitate originated, even if said solution may be considered 'concentrated'. Ammonia-Acid gas precipitate may also be used for other valuable applications, including, but not limited to, sale or use as a solid byproduct or conversion into other valuable produced, for example, including, but not limited to, ammonia-carbon dioxide derivatives, such as urea.

Acid Gas Ammonia Precipitation:
  Overview:
    'Recovered ammonia' in an ammonia-rich solution may removed or recovered from solution using, for example, a reaction with one or more acid gases (for example, absorption of $CO_2$), resulting in the formation of a, for example, $CO_2$-rich ammonia-carbon dioxide salt, at least a portion of which may precipitate. The precipitation of the acid gas rich ammonia or ammonium salt may be driven by, including, but not limited to, one or more of the following: lower solubility of ammonium-acid gas salts (e.g. ammonium bicarbonate or ammonium carbonate), lower solubility of salts in the presence of common-ions and salts of greater ionic strength, and the capability of ammonium bicarbonate to precipitate from solution during $CO_2$ absorption. In the case of $CO_2$, the solubility of ammonium-carbon dioxide salts may decrease with higher '$CO_2$-loading.' To, for example, further increase recovery cyclic capacity, kinetics or reduce CAPEX or combinations thereof, higher concentrations of $CO_2$ or pure $CO_2$ may be employed (may, for example, increase $CO_2$ loading and propensity to precipitate).
  Advantages:
    Acid gas precipitation may recover ammonia in a valuable and easily reversible form (for example, including, but not limited to: ammonium carbonate, bicarbonate, carbamate, or combination thereof) from, for example, an ammonia-rich solution, which may, if desired, occur at moderate temperatures and with minimal energy input (for example: cooling and reagent transport or pumping, low OPEX). It also may be relatively simply and low CAPEX.
    In prior art, recovering ammonia in an ammonia abatement cycle into an easily reversible form may require high energy consumption steam stripping from either a water wash solution or the decomposition of ammonium-phosphate, both of which are every energy intensive and expensive (both in OPEX and CAPEX).
    The ammonia-acid gas salt (such as ammonium bicarbonate or ammonium carbonate) may be used directly as a valuable feedstock (for example: as a fertilizer, as a feedstock in Urea production, as a feedstock in other nitrogen compound production, as a hydrogen gas or energy carrier, as an ammonia transport medium).
    Alternatively, the ammonia-acid gas salt may be converted in to concentrated aqueous ammonia (other byproducts may include high purity $CO_2$) with relatively low energy consumption. For example, ammonium bicarbonate or ammonium carbonate or a combination thereof may be dissolved in water (or without dissolving in water) and may be thermally decomposed. The decomposition may be conducted at elevated pressure such that an appreciably higher partial pressure or amount of $CO_2$ is desorbed relative to ammonia. During desorption, the solution may become acid gas or $CO_2$-lean or free, which may result in concentrated aqueous ammonia. This may require less energy than, for example, an ammonia stripping column, because, for example ammonia may not be appreciably vaporized during the production of the concentrated aqueous ammonia (ammonia, especially at low concentrations, has a very high enthalpy of vaporization and necessitates significant water vapor evaporation which stripped from a solution). Additionally, said decomposition may form the valuable byproduct of pure $CO_2$ (or other acid gas) which may be recirculated or reused internally or sold or used in another application.
    Water removal from solution—with ammonium carbonate and ammonium bicarbonate (and other acid gas ammonium salts), 0.5-1 moles of water may be removed during the precipitation of the salt per a mole of ammonia recovered.
  Concentrated Solution Facilitating Precipitation:
    The high concentration of other salts or common ion salts may reduce the solubility of the ammonia or ammonium-acid gas salts. This may enable the ammonia or ammonium-acid gas salts to precipitate at a lower concentration than if these salts were the sole species in an aqueous solution.
    In versions of one or more embodiments employing a pH or solubility swing driven by changing the concentration of an acidic salt (for example: through cooling precipitation, antisolvent precipitation or other method), if the acid salt concentration may be reduced using cooling precipitation, the resulting solution may be at a lower temperature sufficient for cooling precipitation or closer to the temperature for cooling precipitation of an ammonia or ammonium acid gas salt.
  pH Swing Absorption of Basic Gas:
    Ammonia may be absorbed in a solution with lower pH than water-ammonia solution. Said solution may be acidified, for example, by, including, but not limited to, one or more or a combination of the following: the presence of an acidic salt (for example: ammonium nitrate), by the presence of a reversible acidic compound, or by the presence of an acid gas salt. The solution may have a lower ammonia partial pressure or greater absorption kinetics or both compared to a standard water wash solution.
    Note: In some embodiments, the solution may employ one or more reagents that reversibly react with ammonia with or without a pH swing or inert reagents that reduce or increase the solubility or equilibrium partial pressure of ammonia. For example, react that reversibly reacts with ammonia may be a transition metal salt, for example, copper oxide. An example of an antisolvent, may include, for example, a solvent with appreciably lower ammonia solubility than water added to solution.
  More than One pH Swing or Solubility Swing or Equilibrium Partial Pressure Swing Reagent:
    For example, an antisolvent may be added to a solution that appreciably reduces the solubility of ammonia for ammonia stripping. An example of such an antisolvent may be a basic ammonia salt, such as diammonium phosphate (DAM). Increasing the basicity of the solution may appreciably increase the equilibrium ammonia partial pressure and facilitate ammonia stripping. The concentration of the DAM may be reduced by, for example, cooling precipitation before the ammonia absorption step. One or more basic salts, such as DAM, and one or more acidic salts, such as ammonium nitrate, may be employed in the same or separate embodiment.s For example, prior to absorption, the concentration of DAM may be decreased (for example, using cooling precipitation), then the solution may be heated and ammonium nitrate may be dissolved to increase the concentration of ammonium nitrate, increasing acidity. For example, prior to desorption, the concentration of ammonium nitrate may be decreased and the concentration of DAM may be increased.
    Note: pH swing may have one or more or a combination of driving forces. In some embodiments, pH swing may be driven by a change in the concentration of one or more acid salts (for example: ammonium nitrate). In some embodiments, the pH swing may be partially driven by the presence of a dissolved or reacted acid gas (for example, a solution with a high concentration of absorbed carbon dioxide has a lower pH and ammonia vapor pressure than a solution without an acid gas).

Ammonia Stripping from Acid Salt Solution:

Ammonia may be stripped from an ammonia-rich solution containing an acid salt. The solution may be 'lean' in acid salt relative to the solution employed during $NH_3$ absorption. The stripping process may have multiple advantages over a standard stripping process:

Ammonia is stripped from a solution of higher pH than the ammonia rich solution formed during absorption. This is due to a lower acid compound or acid salt concentration in the solution undergoing stripping (i.e. acid salt lean, acid salt or acid compound may be precipitated from the acid compound or acid salt rich solution employed in ammonia absorption before ammonia stripping), resulting in a higher solution pH. Ammonia partial pressure at a temperature and concentration is directly correlated with the pH of a solution, with free ammonia appreciably above a pH of 8.5 and ammonium appreciably below a pH of 8.5. By absorbing at lower pH (including a lower pH in the ammonia-rich solution), a higher ammonia concentration or lower ammonia equilibrium partial pressure may be reached, enabling higher cyclic capacity or higher absorption efficiency or both. By stripping at a higher pH (including higher pH in the ammonia-lean solution), the equilibrium partial pressure curve of ammonia increases, enabling more efficient stripping and lower temperature input (potentially enabling the use of waste heat) and lower energy consumption.

Lower water vapor concentration in stripped ammonia, reducing energy consumption and increasing the purity of the ammonia. The lower the water evaporation rate relative to ammonia vaporization, the lower the energy consumption in a stripper. Water vapor pressure may be suppressed due to the high salt concentration in solution.

Note: The stripper (for example: if it employs the direct contact of steam with solution for heat input) may have a lower water vapor pressure than the equilibrium partial pressure of water. This may prevent the condensation/accumulation or absorption of water vapor into the solution. Alternatively steam or other heat source may be heat exchanged or condensed via a heat exchanger to prevent water addition directly into the solution.

Acid Salt May Inhibit the Absorption of Acid Gases:

Due to the lower pH of the solution and strong ionic concentration, the absorption rate and equilibrium solubility of $H_2S$, $CO_2$, HCN, and other acid gases present in, for example, Coke Oven gas, fertilizer production, or other process gases, may be lower compared to a standard water wash solution. and, in some embodiments, the relative High ionic concentration and relatively high temperature of absorption inhibits $H_2S$ absorption, while the low pH of the solution enables ammonia absorption (greater selectivity for ammonia)

Additionally, the acid salt solution may be at a higher absorption temperature than a standard water wash solution (for example: a standard water wash solution may operate at 20-30° C. during absorption, while an acid salt rich solution may absorb at higher temperatures, for example, 30-80° C., or 30-50° C.). The acid salt solution can have the similar, same, or lower ammonia equilibrium partial pressure and similar, same, or greater ammonia absorption kinetics because of the lower pH of the concentrated acid salt solution. Higher absorption temperature may further reduce the solubility or absorption of acid gases relative to the absorption of ammonia.

By reducing the relative absorption of acid gases compared to ammonia, the process uses less energy, requires less equipment, and has higher selectivity.

Note:

One or more pH swing processes may employ an acid gas stripping or acid gas removal stage if acid gases do manage to absorb into the solution. In this case, for example, the amount of acid gas requiring stripping or removal is significantly less relative to conventional water wash (before an ammonia stripping or recovery stage).

Membrane-Based Process with Gas Streams Containing Acid Gases:

Driving Forces:

Membrane Concentrating:

May Increase the Concentration of Ammonia Species, Enabling a Concentration where Ammonium Bicarbonate or Other Ammonium-Acid Gas Salt May Precipitate Reduces Energy Requirement of Stripping Acid Gases, if Stripping One or More Acid Gases May be Desired:

By concentrating the solution using a reverse osmosis process or forward osmosis process, the concentration of acid gases and partial pressure of acid gases may be increased. Volume of solution undergoing acid gas stripping may also be decreased, decreasing the specific heat involved with heating the solution. A combination of the driving forces described thereof may reduce the energy consumption involved with acid gas stripping.

Note:

Acid gases in coke oven gas comprise mostly $H_2S$. Coke oven byproduct processes may have systems in place to convert the $H_2S$ into sulfur or other byproduct after it has been separated from the coke oven gas.

Precipitate:

Low Energy Method to Form of Highly Concentrated Aqueous Ammonia (Lower Energy Consumption):

Precipitate may be thermally decomposed. $CO_2$ (or other acid gases) may desorb under relatively higher pressure conditions to minimize losses of ammonia in one or more $CO_2$ gas streams. Water may be added as the amount of water releases during decomposition may be insufficient to fully dissolve the ammonia at saturated concentrations (generally, for example, 28-30 wt % $NH_3$). The resulting solution may comprise, for example, >25 wt % $NH_3$(aq).

Said resulting aqueous ammonia solution may contain trace concentrations of acid gases or acid gas species. Said aqueous ammonia solution may be further treated to remove said residual acid gases. For example, calcium hydroxide may be added and resulting calcium byproducts subsequently filtered, removing the residual acid gases as an insoluble or low solubility salt (for example: calcium carbonate, calcium sulfide, calcium sulfate, calcium sulfite). Alternatively, stoichiometric amounts of sodium hydroxide may be added, forming, for example, sodium carbonate, sodium bicarbonate, sodium sulfide, or sodium sulfate. In the case of sodium hydroxide or other alkali hydroxide, the solution may subsequently undergo reverse osmosis membrane concentrating, forming a concentrate comprising sodium-acid gas salt and aqueous ammonia and a permeate comprising aqueous ammonia practically free of acid gas or alkali salt. The permeate solution may be sold as concentrated ammonium hydroxide solution. The concentrate solution may be stripped of ammonia using coke oven gas before the ammonia scrubber or absorber, recycling the ammonia. Alternatively, the concentrate solution may undergo precipitation via the absorption of an acid gas. Alternatively, the concentrate solution may undergo steam stripping to recover ammonia. The concentrate solution may be employed as 'added water' during the thermal decomposition of ammonium bicarbonate, for example, after the concentrate solution has been stripped of ammonia. Sodium carbonate or bicarbonate may be removed from the concentrate solution, using, for example, reverse osmosis concentrating or forward osmosis concentrating or crystallization or cooling precipitation or a combination thereof.

Note: Reverse osmosis may not reject aqueous ammonia without or with relatively low concentrations of acid gases as the pH of a concentrated aqueous ammonia solution without other salts is sufficiently high for the ammonia in solution to be free ammonia, which does not have a sufficient hydration radius to be rejected by a reverse osmosis membrane.

Does not require stripping ammonia and water and subsequently condensing

Minimal or No Hydrogen Sulfide in Precipitate if Desired:

Due to the de-acidification column, $H_2S$ may be largely removed and the solution may be later enriched with $CO_2$ from one or more or a combination of $CO_2$ sources. $NH_4HCO_3(s)$ may be significantly less soluble in water, especially at colder temperatures, compared to, for example, $NH_3$—$H_2S$—$H_2O$ salts.

Ammonium Bicarbonate can be a Valuable Byproduct on its Own

Figure 7A:
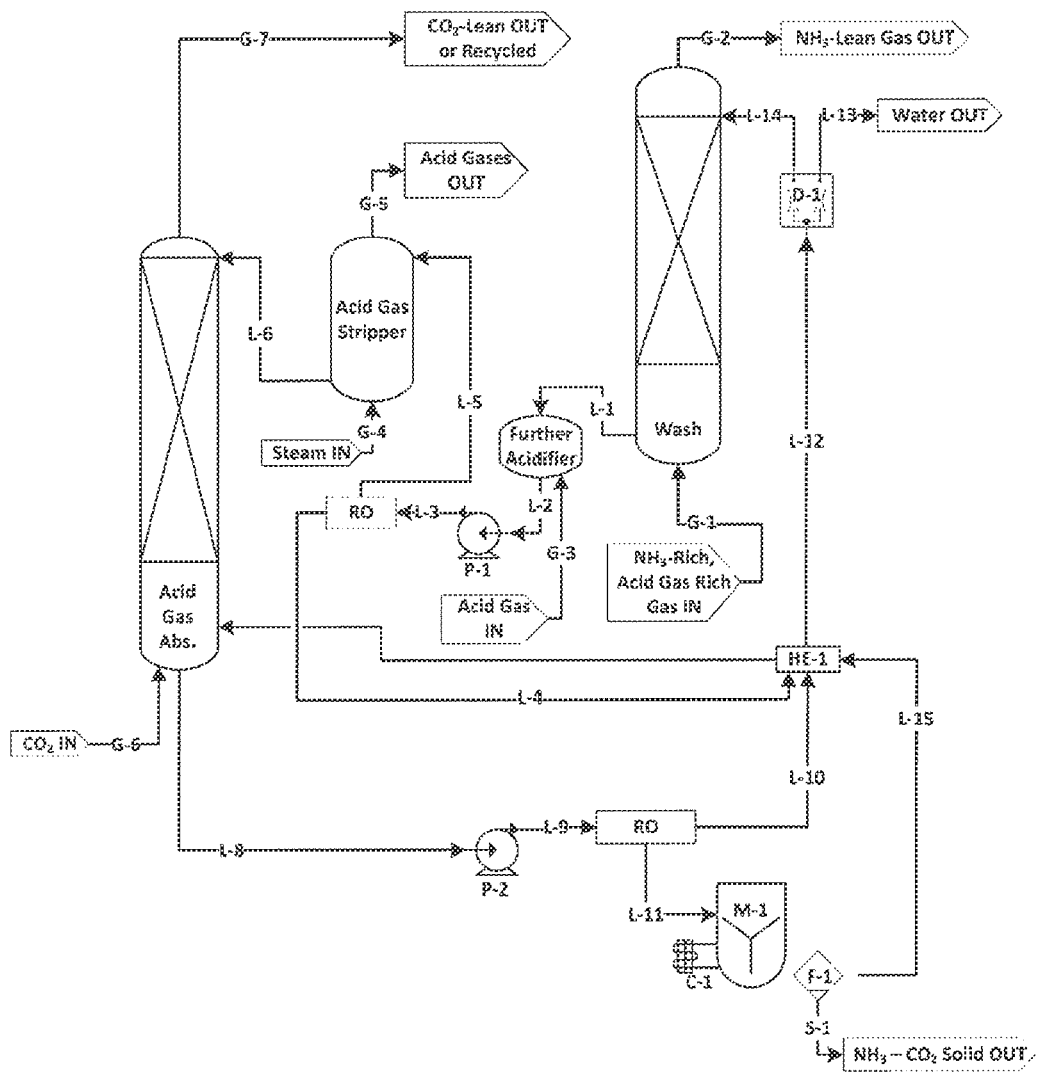
FIG. 7A: The present embodiment pertains to a system for ammonia recovery and acid gas separation employing separation of $H_2S$ and ammonia-recovery with the aid of $CO_2$ enrichment. The present embodiment may employ further acid gas enrichment before $H_2S$ separation.
Figure 7B:
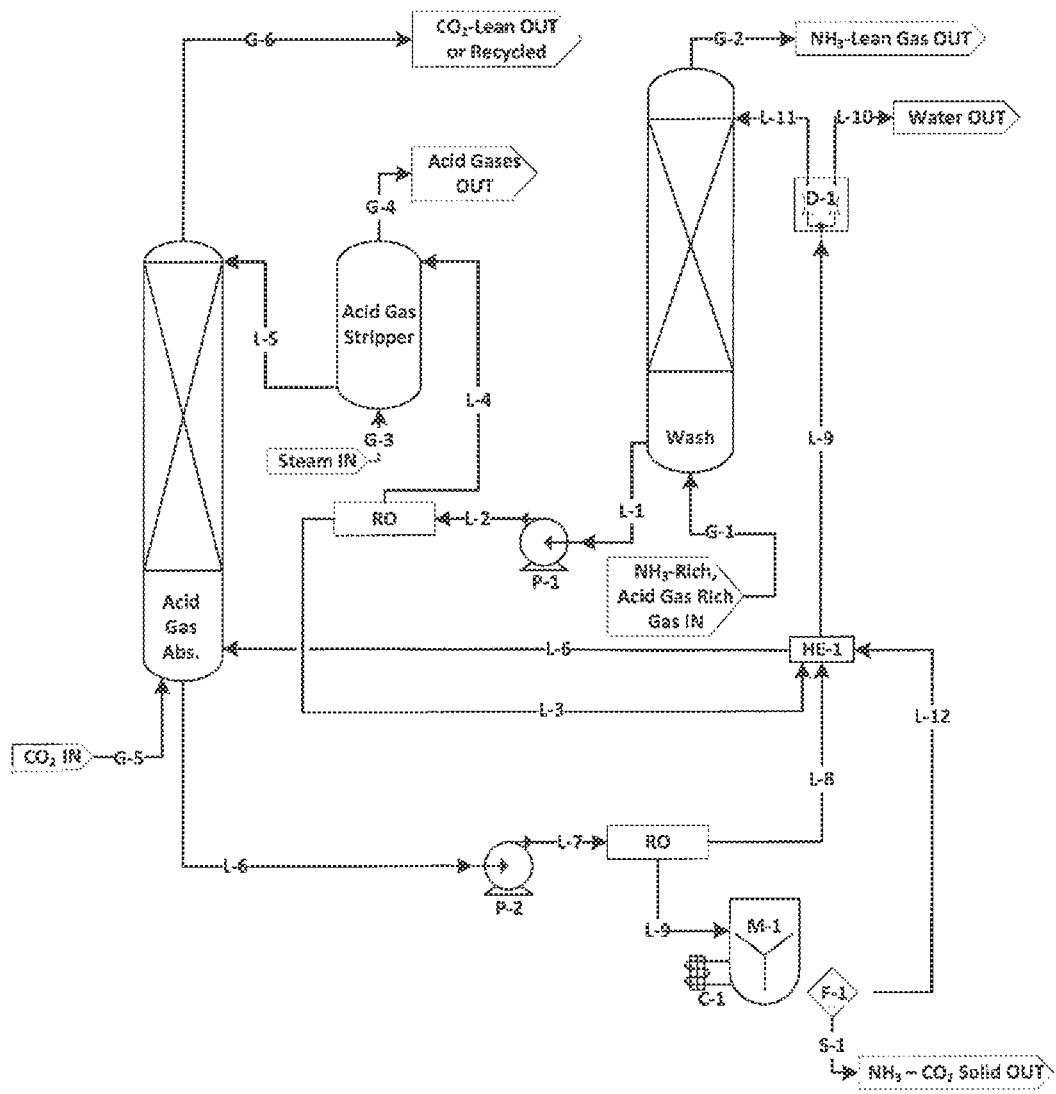
FIG. 7B: The present embodiment pertains to a system for ammonia recovery and acid gas separation employing separation of $H_2S$ and ammonia-recovery with the aid of $CO_2$ enrichment.

Step-by-Step Description for FIG. 7A:

1) Ammonia and Acid Gas Absorption:

$NH_3$ and acid gas containing gas stream (G-1, for example, Coke Oven gas) may be absorbed into a lean or freshwater solution (L-14), which may form an ammonia-rich, acid-gas rich solution (L-1) and ammonia and acid gas lean gas stream (G-2). L-1 may be transferred to step 2.

2) Further Acidification (Depending on pH of Solution after Step 1):

Acid gas in gas-rich gas stream (G-3) (for example: Flue gas or other acid gas or desorbed acid gas from 'step 4') may be absorbed into L-1 to, for example, further reduce the pH and ensure the $NH_3$-species are ionic (for example: $NH_4^+$) and may be, at least in part, rejected by semipermeable membranes. Any residual tar or other contaminants may be removed (for example: using coalescer, decanter, or other method) before 'step 3'. The resulting solution (L-2) may be transferred to 'step 3.'

3) Membrane-Based Concentrating:

L-2 may be pressurized using a pump (P-1), which may form a pressurized feed solution, which may be concentrated using reverse osmosis (L-3). L-3 may be concentrated using reverse osmosis (RO), forward osmosis (FO), one or more other membrane based processes, or a combination thereof. L-3 may be preheated before this step (for example: may be necessary to ensure a higher concentration of ammonia species is reached without precipitation on membrane surface). Due to the potentially relatively high concentration of ammonia required for cooling precipitation of ammonia-carbon dioxide in 'step 7,' the process may first employ RO until the solution reaches a maximum practical osmotic pressure (for example: 80 atm), then, for example, the resulting concentrate solution may be further concentrated (if necessary) using forward osmosis or high pressure reverse osmosis or disc-tube reverse osmosis to the desired concentration. The one or more permeate streams from membrane concentrating may be returned to step 1. Depending on how much (if any) water is removed using FO and whether this removed water is recovered or evaporated, makeup water may be added to the permeate steam before it may be employed as a Lean washdown solution. One or more concentrate solutions may be transferred to 'step 4.'

In FIG. 7A, the solution may be, for example, concentrated using RO. The concentrate solution (L-5) may be, for example, transferred to 'step 4.' The permeate solution may be, for example, transferred to 'step 1.'

4) Deacidification (Likely $H_2S$ Removal if it is Derived from Coke Oven Gas):

The one or more concentrate solutions from 'step 3' (L-5) may be 'deacidified,' wherein, for example, one or more acid gases may be stripped from solution. As shown in FIG. 7A, the acid gases may be steam stripped, although other desorption methods may be employed. One or more of the desorbed acid gases (G-5) may be employed, for example, including, but not limited to, in a Claus process for conversion to sulfur or employed in 'step 2.' The resulting acid gas lean or acid gas free solution comprising aqueous ammonia (L-6) may be transferred to step 5.

5) $CO_2$ Enrichment or Acidification:

$CO_2$ (for example: $CO_2$ in one or more forms, including, but not limited to, gaseous $CO_2$, supercritical $CO_2$, liquid $CO_2$, dry ice, flue gas, biogas, natural gas, desorbed gas, syngas) (G-6) may be absorbed into the solution comprising aqueous ammonia from 'step 4' (L-6), which may form a $CO_2$-Rich solution (L-7) and/or a lower $CO_2$ partial pressure gas stream (G-7) (which may be released into the atmosphere, undergo further treatment, or, in the case of pure $CO_2$ or a recirculating gas stream, it may be recycled internally). The $CO_2$-Rich solution may desirably be at or near the maximum practical $CO_2$—$NH_3$ loading (desirably above 0.5 or 0.67. the higher the $CO_2$ loading, the lower the solubility of the ammonia-carbon dioxide salt). The $CO_2$-Rich solution (L-7) is transferred to 'step 6.' a. Note:

Remaining solution following precipitation in 'step 7' (L-15) may be mixed with the aqueous ammonia solution in step 5 before, during, or following $CO_2$ enrichment or absorption.

6) Further Concentrating with RO or FO:

Said $CO_2$-Rich solution from 'step 5' (L-7) may be further concentrated using one or more membrane based processes, as, for example, the concentration of the solution may have been diluted from the introduction of the remaining solution following precipitation in 'step 7' (L-15). The solution may be pre-heated before or during said concentrating to ensure, for example, a higher concentration of solution may be reached without precipitation on the membrane surface. Depending on the osmotic pressure of the initial and final solution, this step may be conducted with one or more membrane based processes. The concentrate stream (L-11) may be transferred to step 7. In the case RO or high pressure RO (HPRO) or other form of RO may be employed, the permeate solution (L-10) may be transferred to step 1. In the case of Forward Osmosis (FO), the diluted draw solution may undergo, including, but not limited to, one or more or a combination of regeneration methods: evaporation of water, thermally reversible draw solute recovery and permeate return to step 1, osmotically reversible draw solution that may change in osmotic pressure with temperature or other parameter (enabling dewater from solution using RO under different conditions than the solution was employed in when it was a draw solution).

7) Cooling Precipitation Ammonia Recovery:

The concentrated solution from 'step 6' (L-10) may be cooled in a controlled precipitation vessel (M-1, C-1), resulting in the precipitation of ammonium bicarbonate or other ammonia-acid gas salt. The precipitate may be separated from the remaining solution using a solid-liquid separation device (F-1), such as a filter, centrifuge, or other solid-liquid separation device known in the art. The precipitate (S-1) may be transferred to a further step, for example, the precipitate may be thermally decomposed in the presence of water to form pure $CO_2$ (possibly recycled to step 5)

and ammonium hydroxide solution, or the precipitate may be sold directly for use in, for example, urea production, ammonium phosphate production, ammonium nitrate production, or other fertilizer production or derivative compound production process. The remaining solution after precipitate separation (L-15) may be transferred to 'step 5.'

FIG. 7B (Above)

Step-by-Step Description:

Similar process scheme as 7A, except L-1 may be sufficiently acidic for the ammonia-specific solute to be rejected by a semi-permeable membrane (for example: in RO or FO).

Note:

To reduce the saturation concentration or supersaturation concentration of ammonium bicarbonate (or other ammonia-acid gas salt) required to precipitate out of solution, one or more embodiments may employ a permanent or semi-permanent reagent that reduces solubility. Said permanent or semi-permanent reagent or reagents may desirably have a sufficiently small hydration radius to not be rejected (pass through) a standard reverse osmosis or other semipermeable membrane. Examples of compounds may include, but are not limited to, one or more or a combination of the following: ethylene glycol, propylene glycol, urea, propylene carbonate, or glycerol. A semi-permanent reagent may include a reagent which is added to reduce solubility of ammonium bicarbonate (or another ammonia-acid gas salt) and, following precipitation of said salt, is, at least in part, reversibly recovered from solution before membrane concentrating. An example of such a reagent may include, but is not limited to, one or more or a combination of the following: thermally switchable polymers, such as PEGs of various molecular weights, PPGs of various molecular weights, PEGDME, or other polymers or salts.

Note:

Acid gas in coke oven gases generally comprise a portion $H_2S$. This may not be desirable for precipitation as an ammonia salt due to its high toxicity and relatively high solubility of $NH_3$—$H_2S$ salts in water (challenging to reach saturation concentration using cooling precipitation). The acid gas absorption column following the acid gas stripper may be employed to acidify the ammonia-rich, acid gas free or lean solution (L-6) with $CO_2$, which may be a more desirable acid gas for cooling precipitation.

Note:

Alternatively, a solution comprising $NH_3$ and $H_2S$ may be enriched with $CO_2$ (for example: $CO_2$ or $CO_2$ containing gas may be injected). The $CO_2$ may react with ammonia to form one or more ammonia-carbon dioxide salts, which may possess lower solubility in said solution. Said one or more ammonia-carbon dioxide salts may be precipitated from solution, for example, including, but not limited to, using cooling precipitation, common-ion salt precipitation, resident reagent induced precipitation, or a combination thereof. Said precipitate may be separated from remaining liquid. Said remaining liquid may be stripped of one or more acid gases and may be relatively lean in ammonia.

Note:

Due to the potentially high osmotic pressures of the concentrated solution produced for acid gas stripping and for ammonium-acid gas salt precipitation, one or more versions of the process may require a forward osmosis step following reverse osmosis or a forward osmosis step only to further dewater solutions. The forward osmosis process may, for example, involve a thermally regenerable draw solution. Alternatively, the forward osmosis process may, for example, involve a concentrated salt solution (for example: sodium chloride or calcium chloride) that is regenerated through evaporation of water from the diluted draw solution. The new freshwater may be added to the process to regenerate the water wash.

RecovAm™ Ammonia Recovery Using Water
Wash with Membrane Concentrating and
Ammonia-Carbon Dioxide-Water Salt Precipitation Ammonia (other compounds may also be absorbed in embodiments, which may include, for example, Urea) may be absorbed in an ammonia lean or ammonia-free permeate solution (which may comprise water or water mixed with a solute with a lower molecular weight than the molecular weight cutoff of a RO membrane), which may form an 'ammonia-rich' solution. Said ammonia-rich solution may then be acidified using an acid gas (for example: $CO_2$, $H_2S$, or $SO_2$), which may enable the pH of the solution to be sufficiently low for the existence of ionic ammonium species that can be rejected by a semipermeable membrane and may increase the temperature of the solution to ensure higher solubility in the next step. In some embodiments, the acidified ammonia rich solution may contain urea, wherein it may be desirable to cool the solution to precipitate a portion of the urea as a solid to recover a portion of the urea for sale or other use before, for example, preheating. Acidified ammonia solution then may be concentrated using a reverse osmosis, which may forming one or more concentrated, acidified ammonium salt solutions and one or more permeate solutions lean or free of ammonia (note: in embodiments with urea, urea may pass through one or more membranes due to, for example, its low molecular weight and small hydration radius relative to the molecular weight cutoff of one or more membranes and the permeate solution may comprise a solution comprising a portion urea). Said concentrated acidified ammonia solution may be cooled, for example, which may result in the precipitating of a portion of the ammonium-acid gas salt as a solid, which may form a solid-liquid mixture. Said solid-liquid mixture may be separated, at least in part, into solid and liquid phases. Solid ammonium-acid gas salt may comprise 'recovered ammonia' and may undergo further treatment or use or sale (for example, which may include, but is not limited to, one or more or a combination of the following: conversion into aqueous ammonia and impure, pure or otherwise captured acid gas, conversion into anhydrous ammonia and acid gas, conversion into anhydrous ammonia, conversion into one or more chemicals, conversion into aqueous ammonia, conversion into ammonium carbonate [acid gas lean salt or solution] and pure acid gas, sale, application as a fertilizer, conversion into urea, addition of the salt into an acid gas scrubbing process). Said one or more liquid phases may, for example, undergo, including, but not limited to, one or more or a combination of the following: be recirculated, preheated or mixed with the acid gas rich permeate before it enters the reverse osmosis stage. The permeate solution may be transferred to the first step. In some embodiments, the permeate solution may be directly transferred to the first step. In some embodiments, the permeate solution may comprise freshwater or freshwater with minimal impurities, in which case excess freshwater may be removed before recycle to the first step. In some embodiments, the permeate solution may comprise aqueous urea or a portion aqueous urea, in which case it may be desirable to remove the a portion of the concentrated urea solution for sale or application as a fertilizer (this may have the additional benefit of removing excess water). In some embodiments, there may be a net water loss in the system, in which case water or other permeate equivalent may be added to the permeate before recycling to the first step.

Performance Drivers in Urea Production

Ammonia Absorption Efficiency:

Permeate solution from, for example, reverse osmosis (or other membrane), may be 'ammonia-free' or contains minimal ammonia impurity or residual ammonia (other than the nitrogen in the urea that may be in solution). Low or no ammonia concentration in the 'ammonia-lean' solution may drive significant improvement in ammonia absorption efficiency, solution capacity, and absorption rate.

Urea Absorption:

Urea may be absorbed in a urea containing solution, enabling the formation of a solution potentially more concentrated in urea. Urea may be recovered as urea or aqueous urea within the process, enabling recovery of the urea and significantly reducing cost of production, as, for example, there may be, for example, no need decompose or hydrolyze the urea.

Ammonia Acidification:

One or more solutions may be is acidified using carbon dioxide or another acid gas or combination thereof, which may involve the recovery or capture of one or more acid gases (please note some versions of the technology may employ pure acid gas; other versions may employ acid gas emission streams or acid gas streams that require acid gas removal, for example natural gas or biogas or flue gas).

Cooling Precipitation of Urea (Recovery of Urea):

Urea, which may be in a concentrated solution with ammonia, may be precipitated via, for example, cooling precipitation. Said urea precipitate may be in a useful form.

Reverse Osmosis Concentrating and Subsequent Precipitation of Ammonium-Acid Gas Salt:

Ammonia may be recovered from solution in an low energy consumption process step comprising concentrating ammonia-acid gas salt solution using reverse osmosis, followed by cooling precipitation of a portion of the ammonia-acid gas salt. The ammonia-acid gas salt may be considered recovered ammonia and may possess a range of applications, including conversion into urea or other applications described herein or other applications known in the art of ammonia or carbon dioxide or a combination thereof.

Urea Solution Recovery:

The permeate solution may comprise aqueous urea. A portion of the urea solution may be removed to recover a portion of the Urea, for example, may include, but is not limited to, using cooling precipitation or water removal using distillation followed by precipitation or conversion to ammonia-carbon dioxide or a combination thereof. Alternatively, the solution itself may be employed as a liquid urea fertilizer or the solution may be mixed with ammonium nitrate to form Urea-Ammonium Nitrate liquid fertilizer.

Freshwater Recovery:

The permeate solution may comprise freshwater or freshwater with residual impurities. A portion of the freshwater may be removed and used or sold (if there are residual impurities, the freshwater may be treated if necessary for further use).

Figure 8:
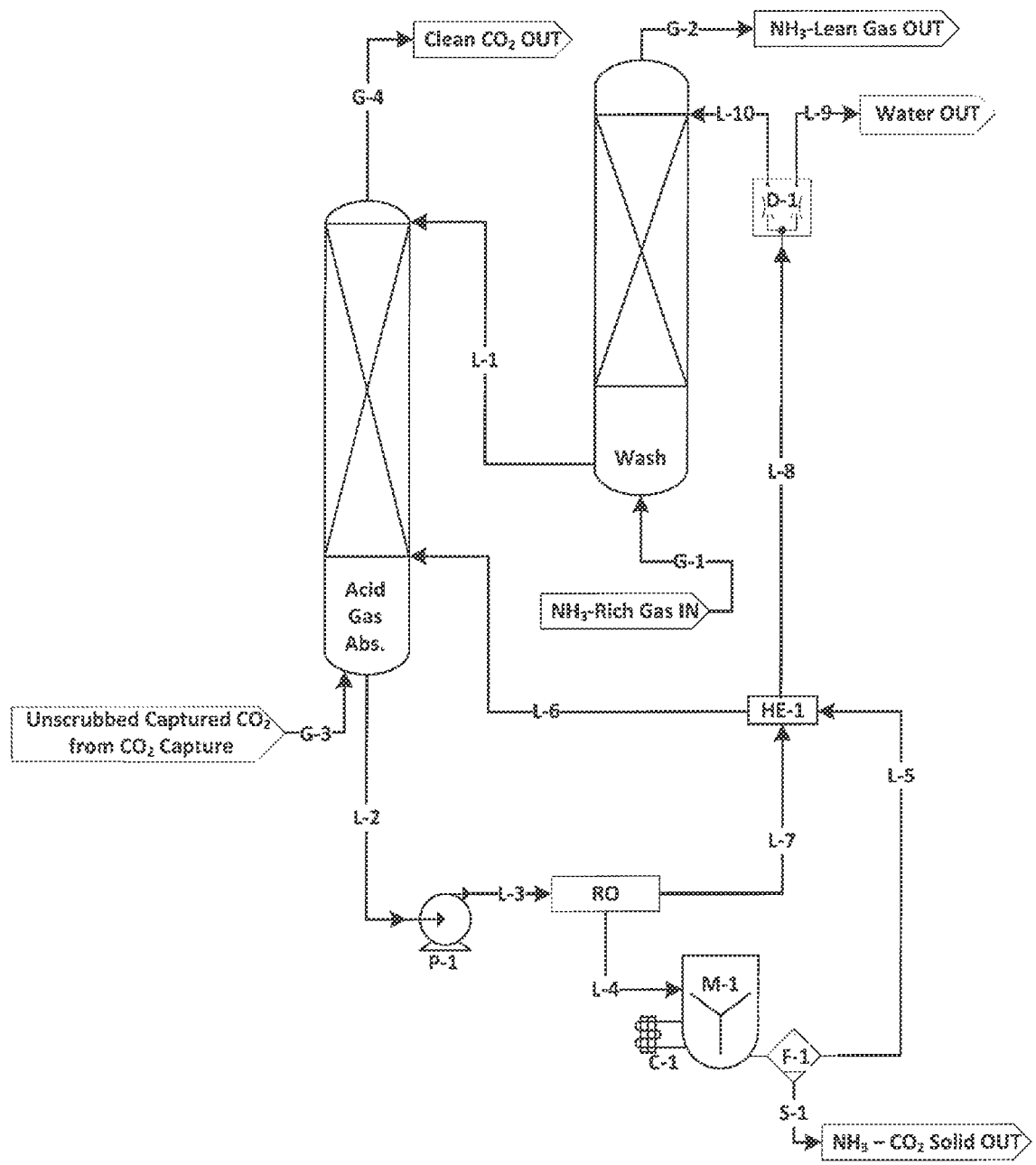
FIG. 8: The present embodiment pertains to a system for ammonia recovery with integrated acid gas capture using absorbed ammonia solution.

FIG. 8: Step-by-Step Description (1) $NH_3$ Absorption:

$NH_3$-Rich gas (G-1) may be fed into a water wash. $NH_3$ may be absorbed in a '$NH_3$-Free' water wash solution (L-10), which may form one or more $NH_3$-Rich water wash solutions (L-1) and one or more '$NH_3$-Lean' remaining gases (G-2).

(2) 'Acid-Gas' Absorption:

Captured/desorbed $CO_2$ (may containing residual $NH_3$ or $H_2O$ or both) (G-3) may be contacted with the $NH_3$-Rich water wash solution (L-1) and/or 'precipitate-free' aqueous ammonia-carbon dioxide solution (L-6). A portion of the $CO_2$ may be absorbed, which may form a '$CO_2$-Rich, $NH_3$-Rich' water wash solution (L-2) and 'Clean $CO_2$' (G-4). L-2 may be at a sufficiently low pH for $NH_4+$ solute rejection during reverse osmosis (for example: a pH<9). Note: The acid gas absorption step may be unnecessary if the '$NH_3$-Rich gas' (G-1) is rich in $CO_2$. The $NH_3$ Absorption step (step 1) may also be simultaneous acid gas absorption step, for example, including, but not limited to, if the gas mixture containing one or more basic gases may also contain one or more acid gases.

(3) Concentrating Solution Using Reverse Osmosis:

The '$CO_2$-rich, ammonia-rich' water wash solution (L-2), which may be relatively 'warm' due to the absorption of at least a portion $CO_2$, water vapor, residual ammonia, other reagent, or combination thereof from G-3, may be pressurized (L-3) using a pump (P-1) and fed, for example, as a feed solution to one or more reverse osmosis units (RO). Said one or more reverse osmosis units may form one or more concentrate solutions (L-4) and one or more permeate solutions (L-7).

(4) Precipitation of $CO_2$-Rich Ammonia Solution from Concentrate Solution:

Said concentrate solution (L-4) may be cooled (C-1, M-1), which may result in the precipitation of $CO_2$-Rich $NH_3$—$CO_2$—$H_2O$(s). Precipitate may be separated from the remaining aqueous solution in one or more solid-liquid separation devices (F-1), forming, for example, at least partially separated solid $NH_3$—$CO_2$—$H_2O$(s) (S-1) and 'precipitate free' aqueous solution (L-5). Said 'precipitate free' aqueous solution (L-5) may be heat exchanged (HE-1) with the permeate solution (L-7) and may be transferred to 'Step 2.' The $NH_3$—$CO_2$—$H_2O$(s) (S-1) may be returned or dissolved in the $CO_2$ capture process solution or employed for another use.

(5) Transfer of Freshwater Permeate to Water Wash:

Said permeate solution (L-7) (which may comprise freshwater) may be precooled by heat exchanging with the 'precipitate free' aqueous solution (L-5), which may form precooled permeate (L-8). A portion of the permeate solution may be removed (L-9) as excess water (for example: from condensing of water vapor in 'Step 1' and 'Step 2'). Remaining freshwater (L-10) may be transferred to one or more water washes.

Inputs & Outputs

| INPUTS | OUTPUTS |
| --- | --- |
| $CO_2$ - Rich Gas or Captured/Desorbed $CO_2$ or Unscrubbed $CO_2$ | Gas stream comprising relatively less $CO_2$ |
| $NH_3$ - Rich Gas (for example: remaining flue gases from acid gas absorption, ammonia-slip gases, tail gas) | $NH_3$ - Lean Gas |
| Electricity (Reverse Osmosis, Chilling, Transferring Reagents) | Solid or solution comprising one or more or a combination of ammonia, carbon dioxide, or water (also described as $NH_3$—$CO_2$-$H_2O(s)$) (Recovered $NH_3$) |
| Cooling Water | Excess Water (from Condensed $H_2O(g)$) |

Figure 9:
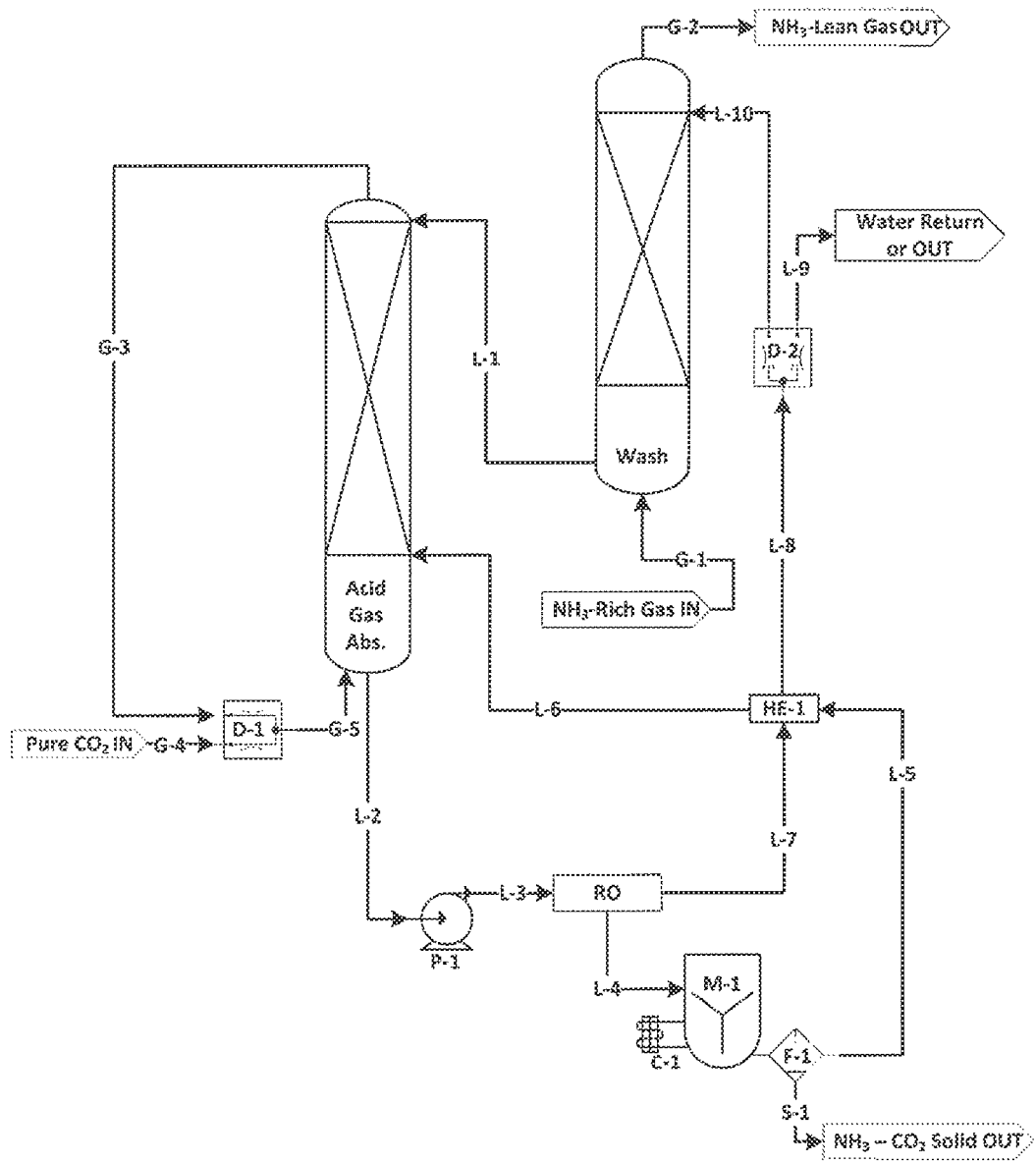
FIG. 9: The present embodiment pertains to a system for ammonia recovery employing $CO_2$ absorber before reverse osmosis and reverse osmosis before precipitation.

Step-by-Step Description for FIG. 9

(1) $NH_3$ Absorption:

$NH_3$-Rich gas (G-1) may be fed into a water wash. $NH_3$ may be absorbed in a '$NH_3$-Free' water wash solution (L-10), which may form a $NH_3$-Rich water wash solution (L-1) and '$NH_3$-Lean' gases (G-2).

(2) 'Acid-Gas' Absorption:

$CO_2$ or other acid gas or a combination thereof (G-5) may be contacted with the $NH_3$-Rich water wash solution (L-1) and/or 'precipitate-free' solution (L-6). A portion of $CO_2$ may absorbed, which may form a '$CO_2$-Rich, $NH_3$-Rich' water wash solution (L-2) and unabsorbed $CO_2$ (G-3). L-2 may be at a sufficiently low pH for reverse osmosis solute rejection (pH<9). G-3 may be recirculated and a makeup stream of $CO_2$ (G-4) may be combined with G-3 in D-1, forming G-5. Note: The $CO_2$ or acid gas absorption step may be unnecessary if the '$NH_3$-Rich gas' (G-1) is rich in $CO_2$.

(3) Concentrating Solution Using Reverse Osmosis:

The '$CO_2$-rich, ammonia-rich' water wash solution (L-2), which may be relatively 'warm' due to the absorption of at least a portion of one or more or a combination of the following: $CO_2$, water vapor, or residual ammonia from G-5, may be pressurized (L-3) using a pump (P-1) into a reverse osmosis unit (RO), which may result in a concentrate solution (L-4) and a permeate solution (L-7).

(4) Precipitation of 'Acid-Gas'-Rich Ammonia Solution from Concentrate Solution:

The concentrate solution (L-4) may be cooled (C-1, M-1), which may result in the precipitation of a salt comprising a portion $NH_3$—$CO_2$—$H_2O(s)$. The precipitate may be separated from the remaining aqueous solution in one or more solid-liquid separation device (F-1), which may form at least a portion of separated solid $NH_3$—$CO_2$—$H_2O(s)$ (S-1) and 'precipitate free' aqueous solution (L-5). Said 'precipitate free' aqueous solution (L-5) may be heat exchanged (HE-1) with the permeate solution (L-7) and transferred to 'Step 2.' Note: 'Precipitate free' aqueous solution may have significant amounts of precipitate removed, however residual precipitate may remain.

(5) Transfer of Permeate to Water Wash:

The permeate solution (L-7) may be precooled by heat exchanging with one or more 'precipitate free' aqueous solutions (L-5), which may form precooled permeate (L-8). A small portion of the permeate solution may be removed (L-9) as, for example, excess water (for example: from the condensing of water vapor in 'Step 1' and 'Step 2'). Alternatively, a small amount of water may be added (if water loses exceed water inputs). The remaining liquid (L-10) may transferred to the water wash as the '$NH_3$-lean' water wash liquid.

Inputs & Outputs

| INPUTS | OUTPUTS |
| --- | --- |
| $CO_2$ | |
| $NH_3$ - Rich Gas (for example: remaining flue gases from acid gas absorption, ammonia-slip gases, tail gas) | $NH_3$ - Lean Gas |
| Electricity (Reverse Osmosis, Chilling, Transferring Reagents) | $NH_3$—$CO_2$-$H_2O(s)$ (Recovered $NH_3$) |
| Cooling Water | Excess Water (from Condensed $H_2O(g)$) |

Figure 10:
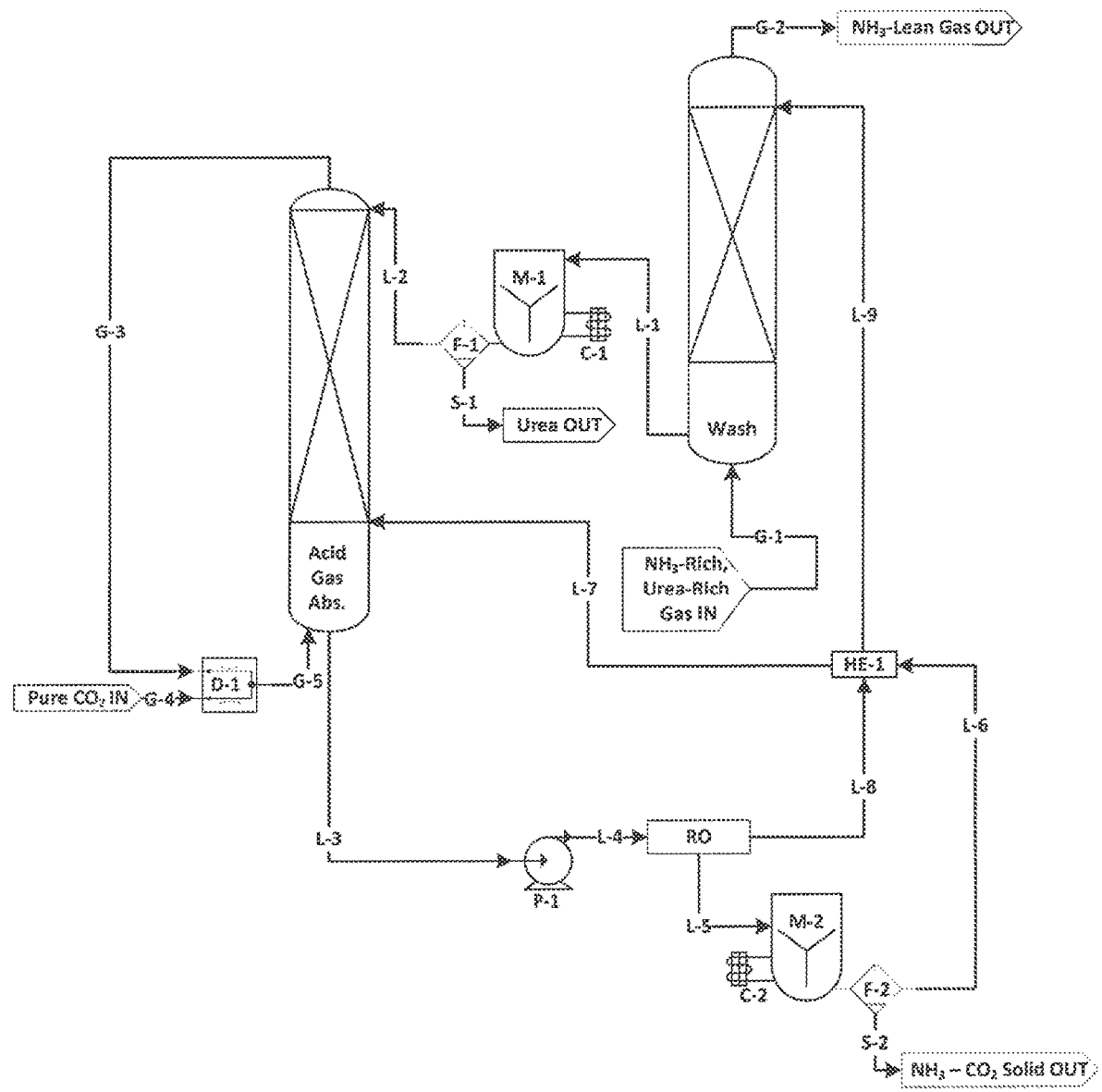
FIG. 10: Ammonia abatement cycle and cooling urea precipitation recovery cycle for ammonia and urea recovery from urea production process.

Step-by-Step Description for FIG. 10

(1) $NH_3$ and Urea Absorption:

$NH_3$-Rich, Urea-Rich gas (G-1) may be fed into a water wash. $NH_3$ and Urea may be absorbed in a '$NH_3$-Free,' Urea-Lean water wash solution (L-9), which may form a '$NH_3$-Rich, Urea-Rich' solution (L-1) and/or '$NH_3$-Lean, Urea-Lean' gases (G-2).

(2) Urea Cooling Precipitation:

The '$NH_3$-Rich, Urea-Rich' solution (L-1) may be cooled (M-1, C-1), which may result in precipitating a portion of urea. The urea precipitate may be separated from the remaining solution in a liquid-solid separation device (F-1), which may form solid urea (S-1) and/or '$NH_3$-Rich, Urea-Lean' solution (L-2).

(3) 'Acid-Gas' Absorption:

$CO_2$ or one or more other acid gases or a combination thereof (G-5) may be contacted with the '$NH_3$-Rich, Urea-Lean' solution (L-2) and/or 'precipitate-free' solution (L-7). A portion of the one or more acid gases may be absorbed, forming a '$CO_2$-Rich, $NH_3$-Rich, Urea-Lean' solution (L-3) and unabsorbed $CO_2$ (G-3). L-2 may be at a sufficiently low pH for the rejection of aqueous ammonia or ammonium (for example: pH<9). G-3 may be recirculated and a makeup stream of $CO_2$ (G-4) may be combined with G-3 in D-1, forming G-5. Note: The acid gas absorption stet may be unnecessary if the '$NH_3$-Rich. Urea-Rich gas (G-1) is rich in $CO_2$.

(4) Concentrating Solution Using Reverse Osmosis:

The '$CO_2$-rich, ammonia-rich, urea-lean' solution (L-3), which may be relatively 'warm' due to the absorption of at least a portion of one or more or a combination of $CO_2$, water vapor, or residual ammonia from G-5, may be pressurized (L-4) using a pump (P-1) into a reverse osmosis unit (RO), which may result in a concentrate solution, for example, concentrated in $CO_2$-rich aqueous ammonia-carbon dioxide (L-5) and a permeate solution comprising, for example, aqueous urea-lean, ammonia-carbon dioxide ultra-lean or free solution (L-7). Urea, due to, for example, its smaller hydration radius, may be substantially not rejected by the reverse osmosis membrane. The concentration of urea in the permeate solution (L-7) may be substantially similar or the same as, for example, the concentration of urea in the concentrate solution (L-5).

(5) Cooling Precipitation of $CO_2$-Rich Ammonia-Carbon Dioxide Concentrate Solution:

The concentrate solution (L-5) may be cooled (C-2, M-2), which may result in the precipitation of one or more salts comprising a portion $NH_3$—$CO_2$—$H_2O(s)$. The precipitate may be separated from the aqueous solution in a solid-liquid separation device (F-2), which may result in form at least a portion separated solid $NH_3$—$CO_2$—$H_2O(s)$ (S-1) and/or 'precipitate free' aqueous solution (L-6). The 'precipitate free' aqueous solution (L-6) may be heat exchanged (HE-1) with the permeate solution (L-8) and/or transferred to 'Step 2' as L-7.

(6) Transfer of Permeate to Water Wash:

The permeate solution (L-8) (which may, for examplem comprise aqueous urea or aqueous urea with minor constituents of ammonia, carbon dioxide, or other residuals) may be precooled by heat exchanging with one or more 'precipitate free' aqueous solutions (L-6), which may result in the formation of precooled permeate (L-9). Solution may be removed, water may be removed (or separated), or water may be added before L-9 enters the wash, or a combination thereof.

Inputs & Outputs

| INPUTS | OUTPUTS |
|---|---|
| $CO_2$ | |
| $NH_3$ - Rich, Urea-Rich Gas (for example: gas mixture produced during the production of Urea | $NH_3$ - Lean, Urea-Lean Gas |
| Electricity (Reverse Osmosis, Chilling, Transferring Reagents) | $NH_3$—$CO_2$-$H_2O(s)$ (Recovered $NH_3$) Urea(s) (Recovered Urea) |
| Cooling Water | Excess Water (from Condensed $H_2O(g)$) |

Figure 11:
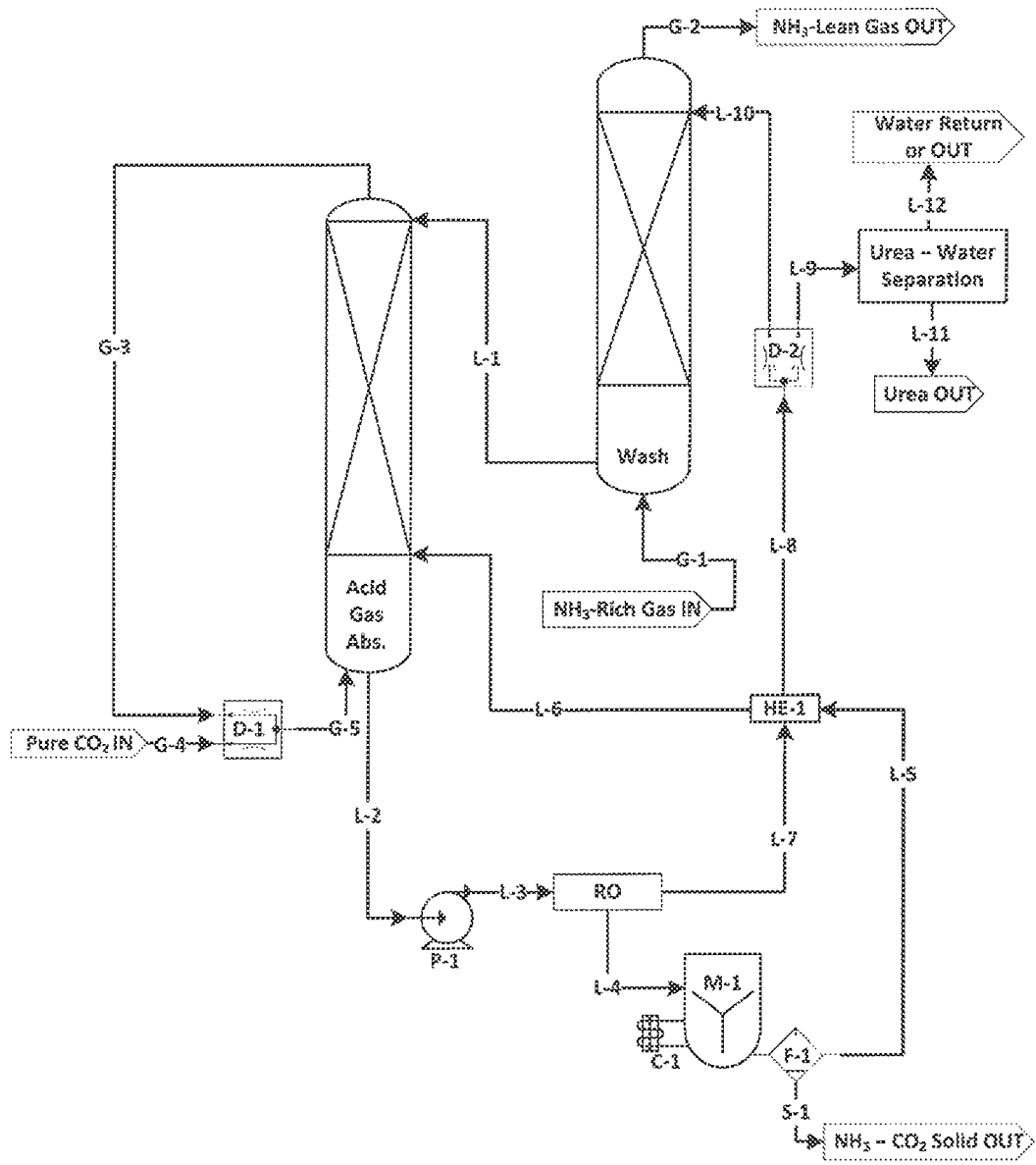
FIG. 11: Ammonia abatement cycle and urea recovery cycle for ammonia and urea recovery with water-urea separation.

Step-by-Step Description for FIG. 11

(1) $NH_3$ Absorption:

$NH_3$-Rich, Urea-Rich gas (G-1) may be fed into a water wash. $NH_3$ and Urea may be absorbed in a '$NH_3$-Free,' Urea-Lean water wash solution (L-10), which may form a '$NH_3$-Rich, Urea-Rich' solution (L-1) and '$NH_3$-Lean, Urea-Lean' gases (G-2). Note: Additional chilling may be employed during $NH_3$ Absorption.

(2) 'Acid-Gas' Absorption:

$CO_2$ or one or more other acid gases or a combination thereof (G-5) is contacted with the '$NH_3$-Rich, Urea-Rich' solution (L-1) and 'precipitate-free' solution (L-6). A portion of the $CO_2$ may be absorbed, forming a '$CO_2$-Rich, $NH_3$-Rich, Urea-Rich' solution (L-2) and/or unabsorbed $CO_2$ (G-3). L-2 may be at a sufficiently low pH for the rejection of aqueous ammonia or ammonium (for example: pH<9). G-3 may be recirculated and a makeup stream of $CO_2$ (G-4) may be combined with G-3 in D-1, which may result in the formation of G-5. Note: The acid gas absorption step may be unnecessary if the '$NH_3$-Rich. Urea-Rich gas' (G-1) is rich in $CO_2$.

(3) Concentrating Solution Using Reverse Osmosis:

The '$CO_2$-rich, ammonia-rich, urea-rich' solution (L-2), which may be relatively 'warm' due to the absorption of at least a portion of one or more or a combination of $CO_2$, water vapor, or residual ammonia from G-5, may be pressurized (L-3) using a pump (P-1) into one or more reverse osmosis units (RO), which may produce a concentrate solution concentrated in, for example, $CO_2$-rich aqueous ammonia-carbon dioxide (L-4) and a permeate solution comprising, for example, aqueous urea-rich, ammonia-carbon dioxide lean or free solution (L-7). Urea, due to, for example, its smaller hydration radius, may be substantially not rejected by the reverse osmosis membrane.

(4) Cooling Precipitation of $CO_2$-Rich Ammonia-Carbon Dioxide Concentrate Solution:

The concentrate solution (L-4) may be cooled (C-1, M-1), which may result in the precipitation of one or more salts, which may comprise a portion of $NH_3$—$CO_2$—$H_2O(s)$. The precipitate may be separated from the remaining aqueous solution in a solid-liquid separation device (F-1), which may form separated solid $NH_3$—$CO_2$—$H_2O(s)$ (S-1) and 'precipitate free' aqueous solution (L-5). The 'precipitate free' aqueous solution (L-5) may be heat exchanged (HE-1) with the permeate solution (L-7) and transferred to 'Step 2.'

(5) Separation of a Portion Urea from Permeate Solution:

Version A (Sell Urea Solution Directly):

A portion of L-7, before pre-cooling, may be diverted (D-2). The solution may be concentrated in urea and may be sold as a urea fertilizer.

Version B (Using Water Distillation):

A portion of L-7, before pre-cooling, may be diverted (D-2). Said diverted solution may be heated and water may be distilled. The solution may be continuously separated into Urea(s) (L-11 or S-2) and water (L-12).

Version C (Using Water Distillation and Urea Precipitation):

A portion of L-7, before pre-cooling, may be diverted (D-2). The solution may be heated and a portion of the water may be distilled (L-12). Aqueous urea may concentrates. The solution may be cooled to precipitate a portion of the urea (L-11 or S-2). The remaining 'urea-lean' solution following precipitate separation may be returned to L-10.

(6) Transfer of Permeate to Water Wash:

The permeate solution (L-7) may be precooled by heat exchanging with the 'precipitate free' aqueous solution (L-5), which may form precooled permeate (L-8 or L-10). The solution may be transferred to the Wash.

Inputs & Outputs

| INPUTS | OUTPUTS |
|---|---|
| $CO_2$ | |
| $NH_3$ - Rich, Urea-Rich Gas (for example: gas mixture produced during the production of Urea | $NH_3$ - Lean, Urea-Lean Gas |
| Electricity (Reverse Osmosis, Chilling, Transferring Reagents) | $NH_3$—$CO_2$-$H_2O(s)$ (Recovered $NH_3$) Urea(s) (Recovered Urea) |
| Heat | Urea(s) |
| | Water |
| Cooling Water | Excess Water (from Condensed $H_2O(g)$) |

Note: Additional chilling may be employed during absorption. The solution may be preheated before reverse osmosis concentrating.

| Example Brief Figure Key | |
|---|---|
| ID | Description |
| G | Gas |
| L | Liquid |
| S | Solid |
| C | Cooling |
| F | Solid-Liquid Separator (such as a filter or centrifuge) |
| M | Jacketed Mixing or Separation Vessel |
| RO | Reverse Osmosis Unit (may also comprise one or more membrane based process instead or in addition to reverse osmosis) |
| HE | Cross-Flow Heat Exchanger |
| D | Flow Divider |
| P | High Pressure Liquid Pump |
| Wash | Water Wash for Removing $NH_3$ from $NH_3$-slip |

Other description: For Urea industry, one or more present embodiments may be employed.

Pure $CO_2$ may be injected into the solution to achieve a sufficiently low pH for RO membrane concentrating. Ammonium bicarbonate may be concentrated, while urea (due to its small hydration radius) may pass through the membrane. Ammonia-carbon dioxide solid may precipitate, which may be returned to the urea production process. Urea may pass through the RO membrane and may be part of the permeate solution (urea may not be rejected because of its small hydration radius). The permeate solution may be employed as the water wash solution. Urea may continue to accumulated in the water wash solution. Eventually, urea may be recovered/removed from the solution using, for example, including, but not limited to, one or more or a combination of the following: a portion of the urea-water distilled and precipitated (made possible due to the higher concentration of urea in the solution) or the conversion of urea to ammonia and carbon dioxide, for example, using hydrolysis of urea (more effective because of the ultra-low concentration of ammonia in the solution and significantly higher concentration of urea) or mixing urea-water with ammonium nitrate to form at least a portion of Urea-Ammonium Nitrate (UAN) solution.

Note:

The acidified solution may be preheated by other means of heating, such as other means of heating known in the art, including, but not limited to, waste heat, heat pump, electricity, steam.

Reverse Osmosis

No steam or high-temperature energy input

Ultra-low energy consumption $NH_3$-Lean wash solution is practically 'ammonia-free' (permeate is freshwater or urea-water solution)

Complete ammonia recovery without dilution

Low CAPEX and OPEX

Solid Precipitate

Increases $CO_2$-Rich loading

Precipitate may be added to essentially any ammonia-based ammonia $CO_2$ capture or acid gas removal system solution while increasing $NH_3$ and $CO_2$ concentration No external heat input required No steam stripping for ammonia recovery May purify desorbed $CO_2$ before compression or other use, reducing the required treatment of $CO_2$.

Note:

The ammonia may be within an acid gas stream (such as flue gas or other acid gas containing stream). The ammonia-rich solution that forms may be sufficiently acidified for a membrane based process due to the presence of the acid gas within the ammonia-laden stream.

Note:

It may be desirable to have the ammonia acidification and ammonia absorption occur simultaneously in the same column. This may involve mixing acid gas into the column at the same time as the ammonia laden gas stream. This may increase the absorption rate, absorption efficiency, and absorption capacity of the absorption step. For example, the acidity of the acid gases and the salts acid gases may form when reacted with ammonia may enhanced solubility and reduce the equilibrium vapor pressure of ammonia.

Overview of Contents:

Ammonia Recovery $CO_2$ Acidification, Membrane Concentrating, and Ammonia-Carbon Dioxide-Water Salt Precipitation for Low Energy Ammonia Recovery (Note: $CO_2$ may be provided as an example acid gas. Other acid gases, for example, including, but not limited to, $H_2S$, $SO_2$, $NO_2$, $CO_2$ or a combination thereof, may be employed.)

Purifies desorbed $CO_2$ before compression or other use, reducing the required treatment of $CO_2$.

The $CO_2$ rich solution may be concentrated using reverse osmosis or forward osmosis. When the solution becomes concentrated to near the solubility limits of the ammonia-carbon dioxide solution, it may be heated using waste heat to the available waste heat temperature. It may be then further concentrated with Reverse Osmosis or Forward Osmosis to near the solubility limit of the ammonia-carbon dioxide solution.

Concentrating may be conducted in two (or more) stages. The first stage may involve concentrating the solution to near the solubility limits of ammonia-carbon dioxide at the temperature of the solution (for example: 2M-3M). Then the remaining concentrate may be heated to the available waste heat temperature (for example: 30-40 C) and concentrated in a second RO or osmotically assisted RO or FO stage to the solubility limits at the waste heat temperature (for example: 3-6M). Concentration solution may be subsequently cooled to, for example, induce precipitation.

This stage may employ forward osmosis, nanofiltration, or other membrane process.

Forward Osmosis Process: The PPG may be removed from the permeate solution by adding a small amount of ammonia-carbon dioxide solution (e.g. the concentrate from step) and/or heating the solution.

The Forward Osmosis process may require the use of a different salt (e.g. small concentrations of ammonium nitrate). The ammonium nitrate may be present throughout the absorption/precipitation stages of the technology at dilute concentrations relative to ammonia. Fortunately, dilute concentrations of ammonium nitrate may be all that is necessary to recover the PPG.

Alternatively, ammonium sulfate may be added to the dilute PPG-Rich solution-'clouding-out' the PPG. This may require significantly less salt than if ammonium nitrate were added. The dilute ammonium sulfate solution remaining after 'clouding-out' PPG may be concentrated using, for example, a reverse osmosis membrane. The concentrated ammonium sulfate may be recycled (added back to the diluted PPG-Rich solution) and the permeate may be transferred.

Alternatively, PPG may be used as a draw solution by, for example, reducing the cloud-point temperature using glycerol or another additive that reduces cloud-point temperature and is not rejected by standard reverse osmosis membranes.

Figure 12:
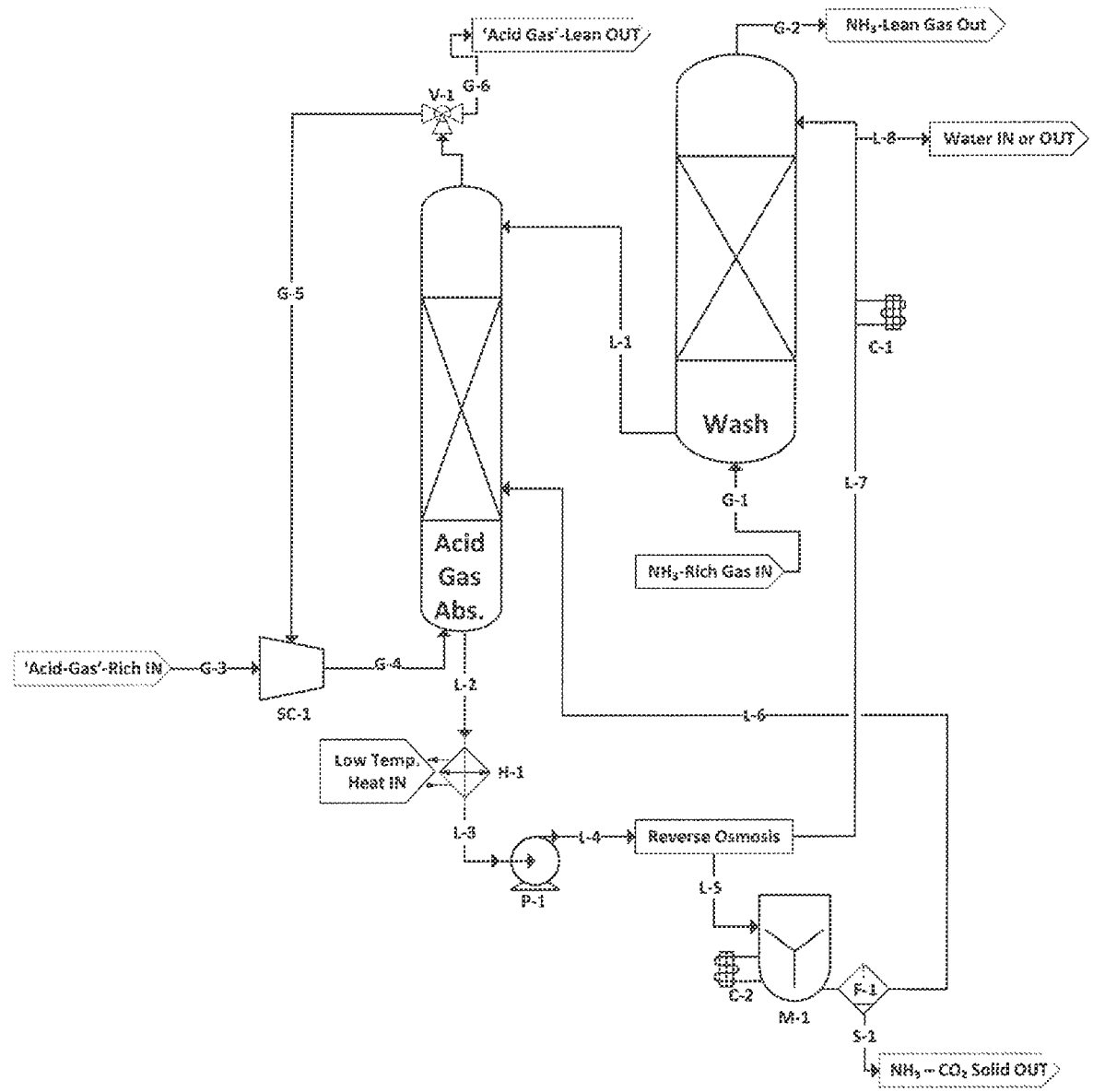
FIG. 12: Example ammonia abatement cycle employing an acid gas absorber, membrane concentrator, and cooling precipitation to recover ammonia as an acid gas salt.
Figure 13:
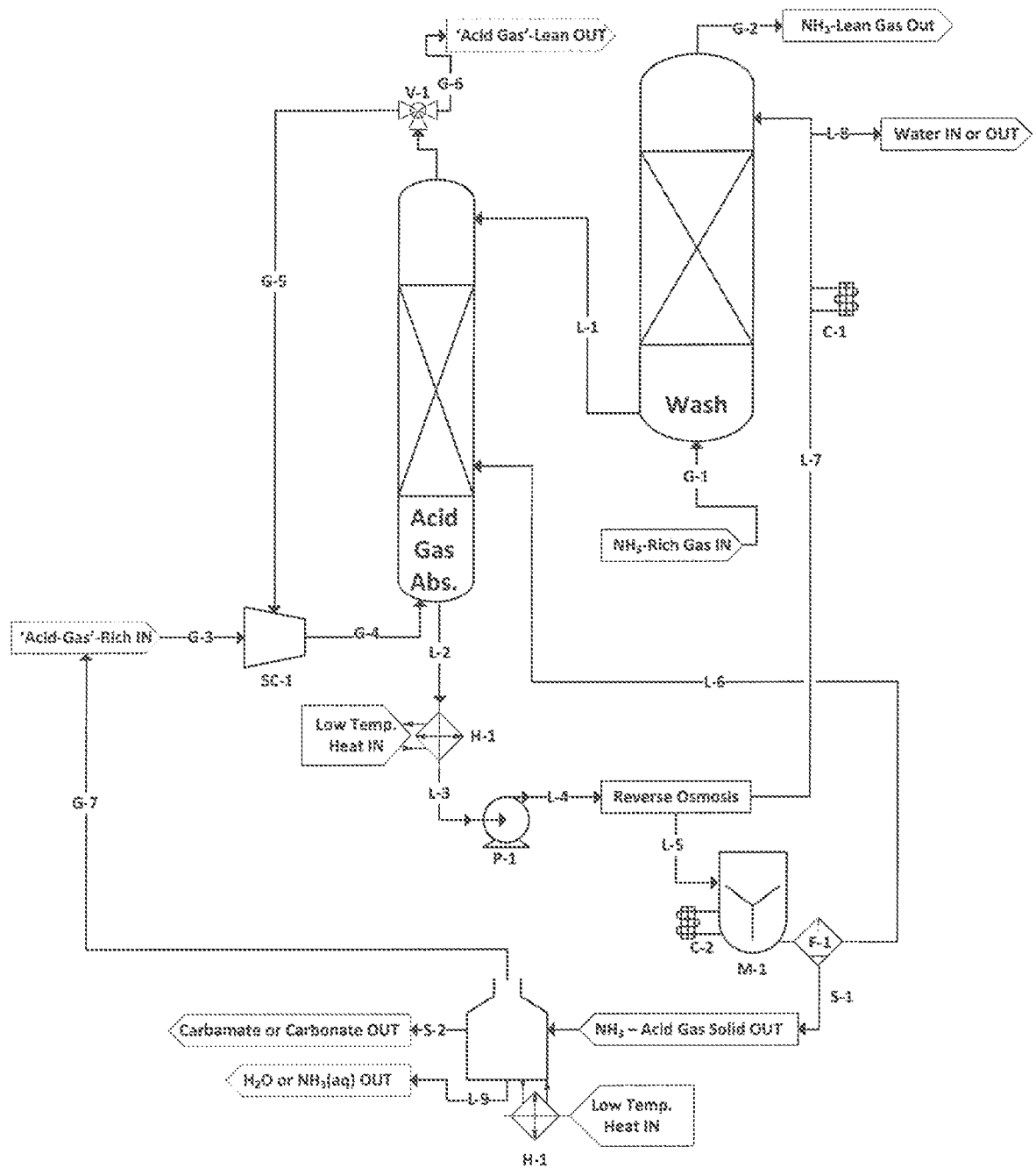
FIG. 13: Similar to FIG. 12. The present figure converts one or more precipitates into at least a portion ammonium carbonate or ammonium carbamate or urea, which may be useful as an intermediate to the production of urea or nitrogen chemicals or other useful chemicals, and/or at least a portion $CO_2$, $NH_3$, or water or combination thereof, which may be recycled or used for another application.
Figure 14:
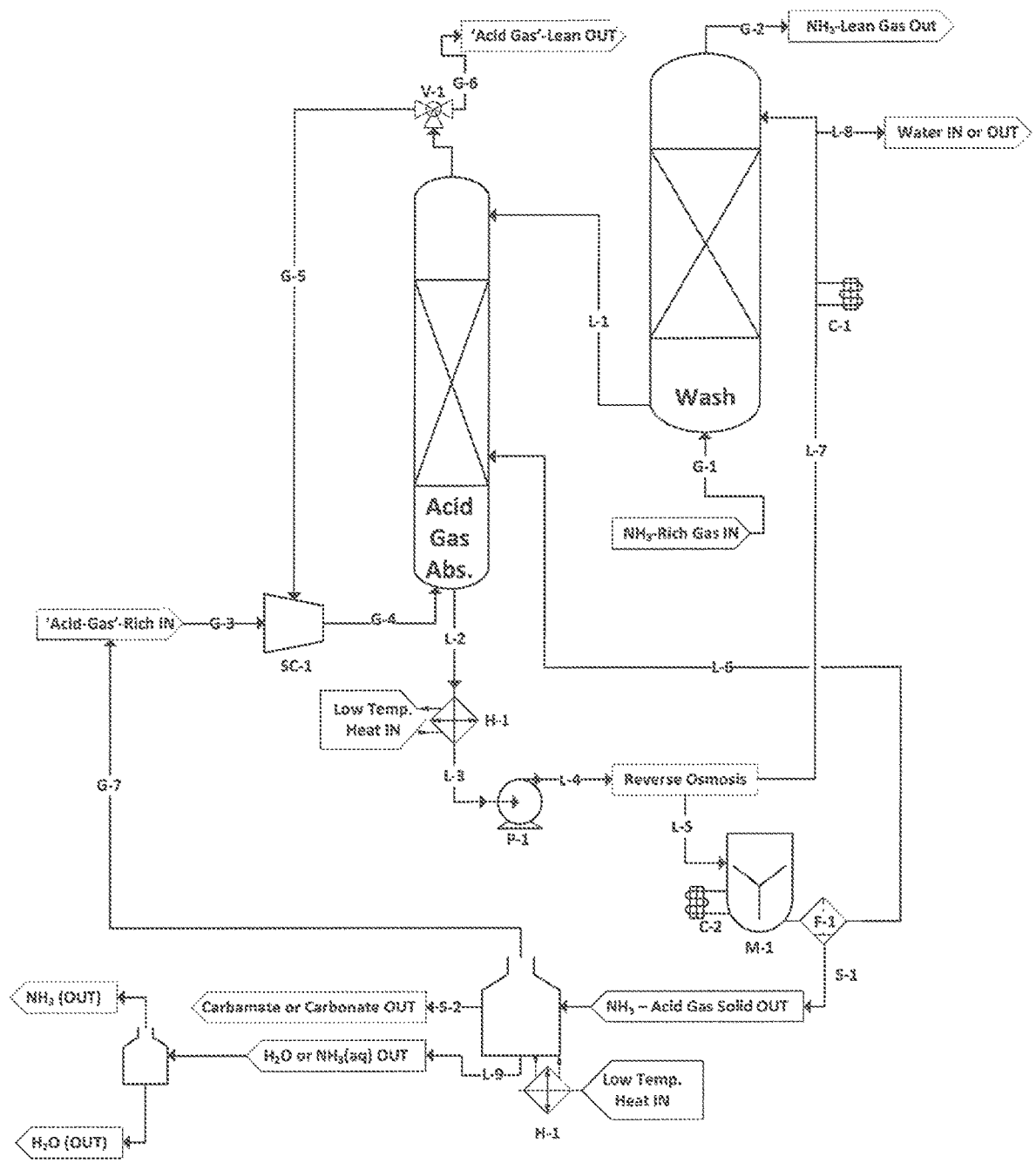
FIG. 14: Similar to FIG. 12. The present figure converts the precipitate into at least a portion ammonia, carbon dioxide, water, combination thereof.
Figure 15:
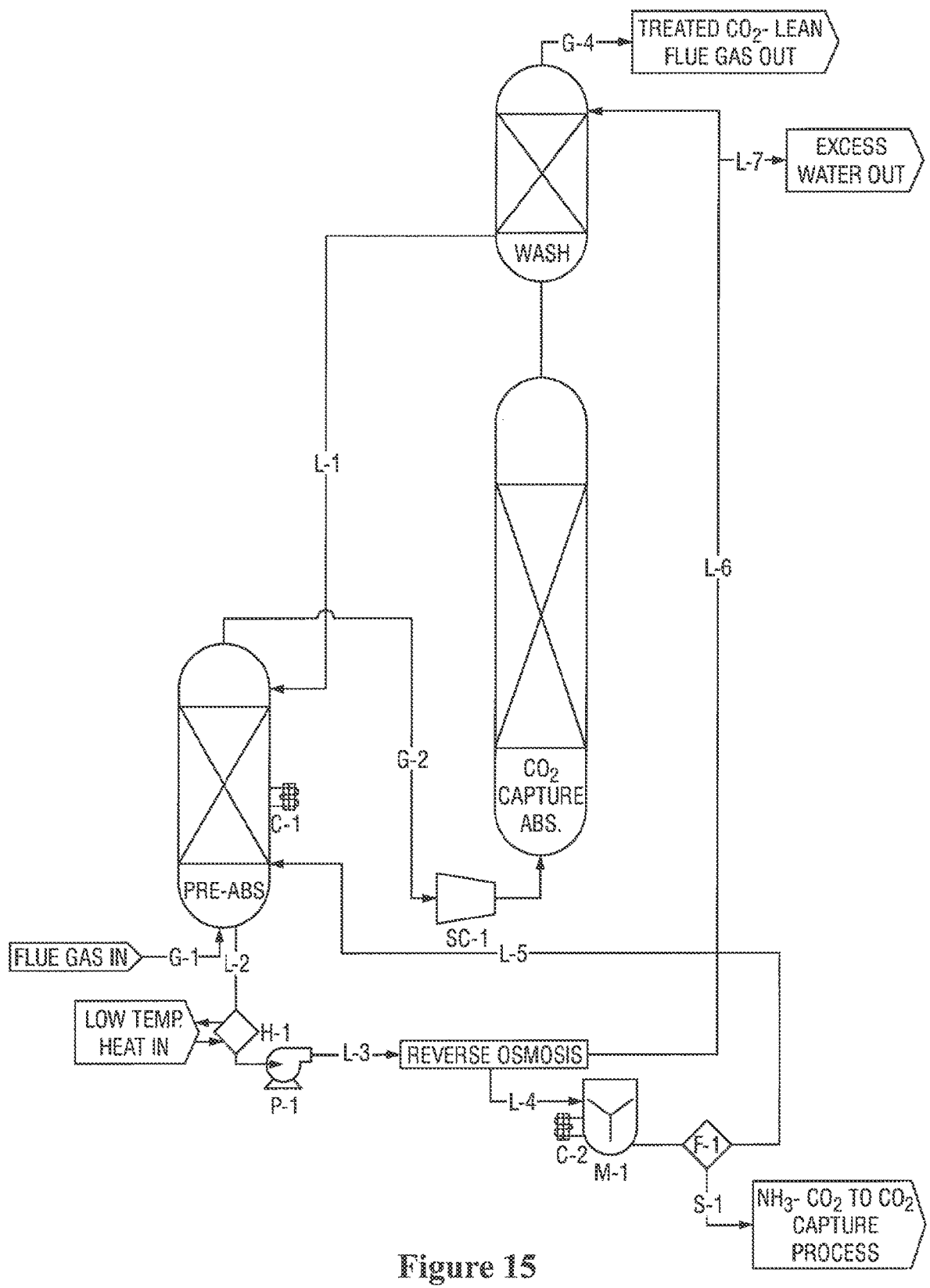
FIG. 15: Ammonia abatement cycle employing a flue gas (or other emissions or acid gas) absorber, membrane concentrator, and cooling precipitation to recover ammonia as an acid gas salt.
Figure 16:
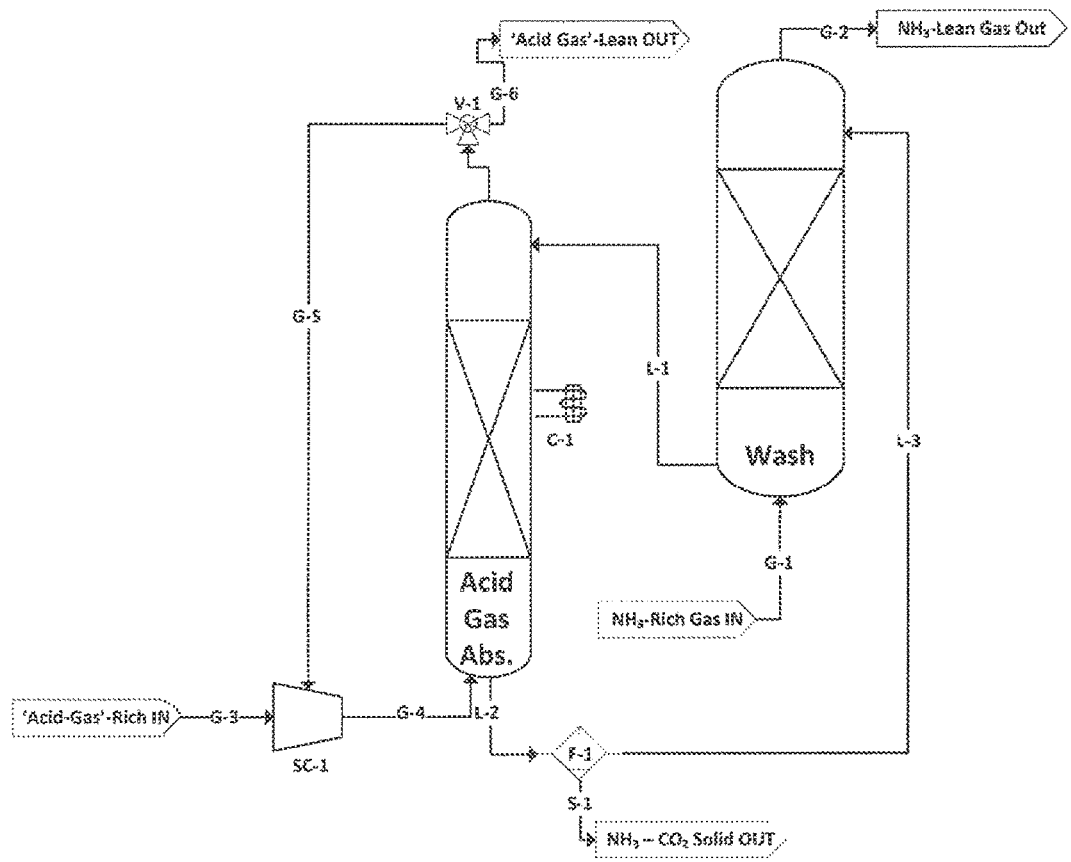
FIG. 16: Ammonia abatement cycle employing a solution comprising at least a portion organic solvent or inert salt to absorb ammonia and precipitate at least a portion of the ammonia as an ammonia-acid gas salt by contacting the solution with an acid gas (acid-gas driven precipitation. The example acid gas provided is $CO_2$, although other acid gases or combinations of acid gases may be employed.
Figure 17:
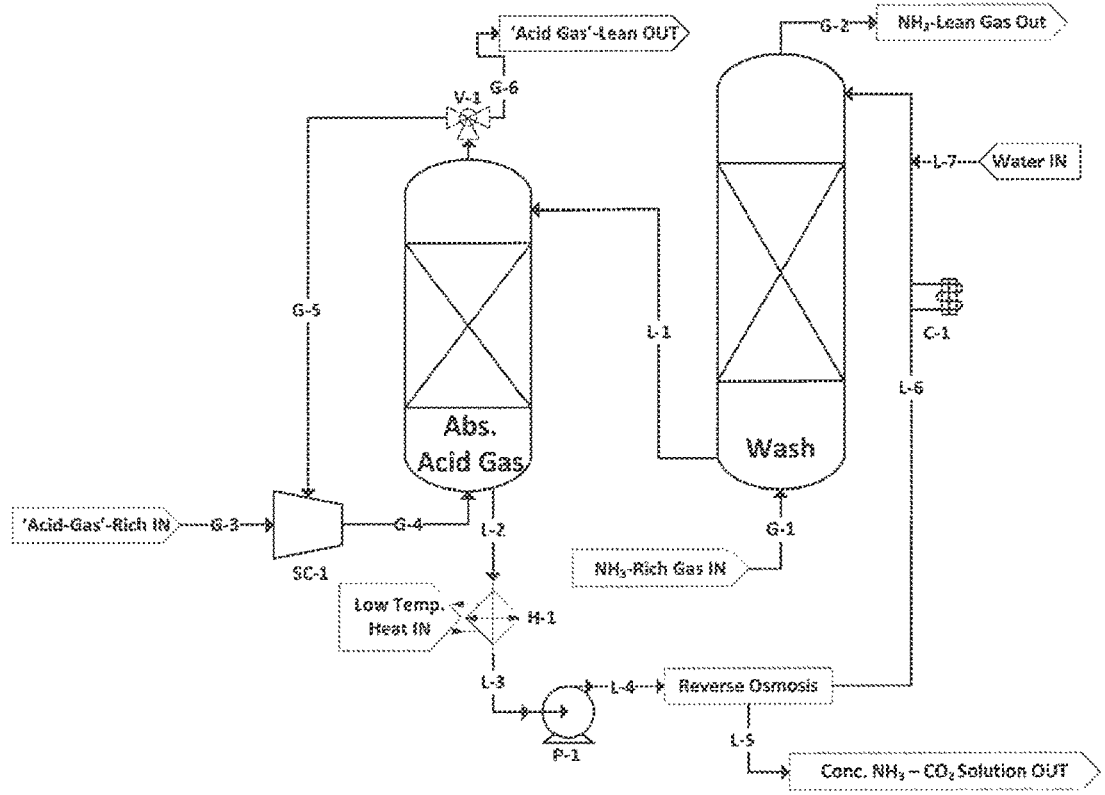
FIG. 17: Ammonia abatement cycle employing an acid gas absorber and membrane concentrator. The concentrated solution produced by the membrane concentrator may be used, sold, or transferred to another use. If the ammonia abatement cycle is part of an emissions abatement cycle for another process employing aqueous ammonia (for example: $CO_2$ capture technology, sterilization process) the concentrated solution may be employed in or added to said originating process.
Figure 18:
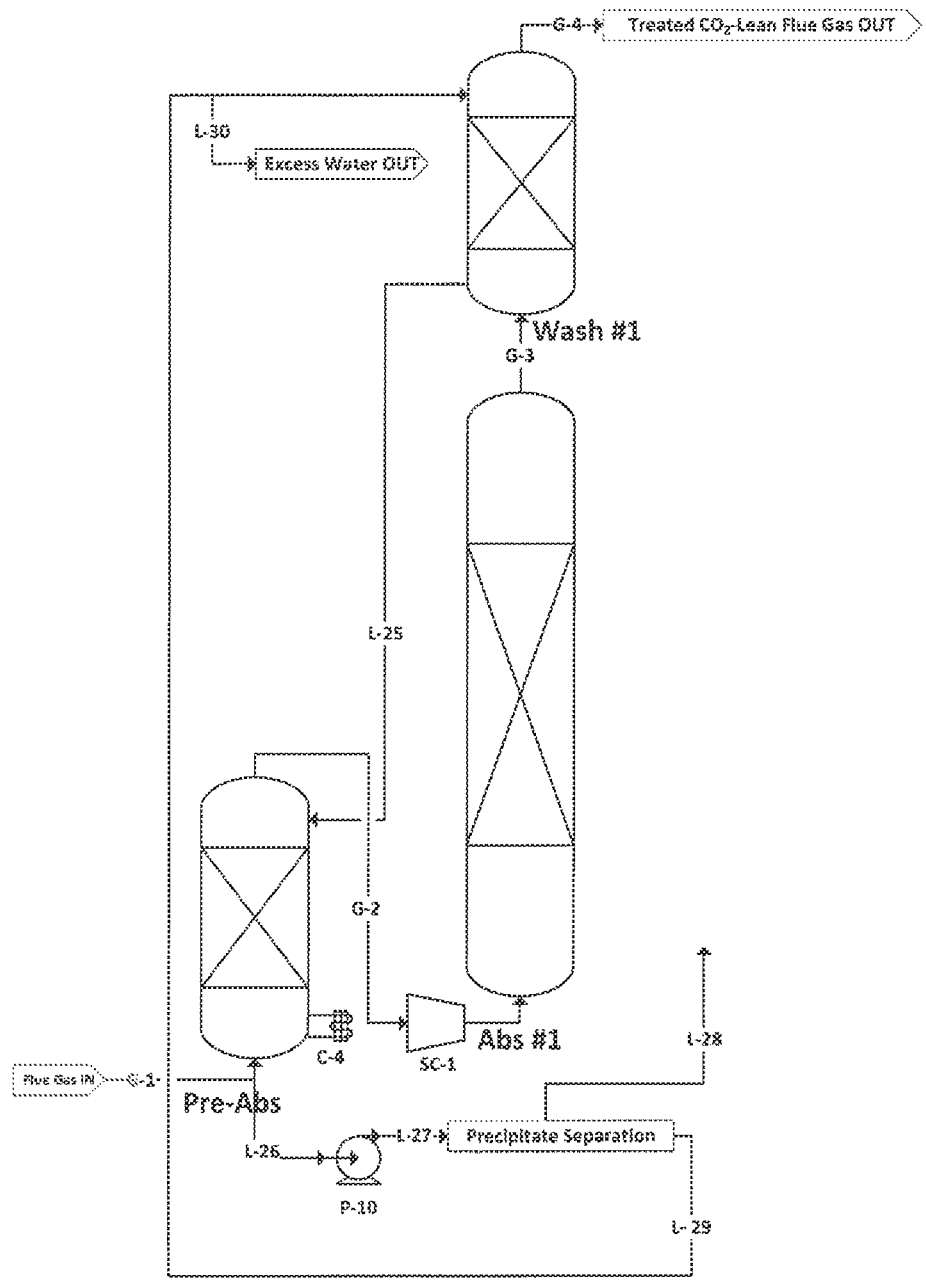
FIG. 18: Ammonia abatement cycle with pre-absorber and acid-gas driven precipitation.

Example Step by Step Description (FIG. 12):

(1) Ammonia Absorption:

'Ammonia-rich gas' (G-1) may be fed into a water wash. Ammonia may be absorbed in an ammonia-lean water wash solution (L-7), which may form an ammonia-rich water wash solution (L-1) and/or an 'ammonia-lean gas' (G-2).

(2) 'Acid-Gas' Absorption:

Acid gas (G-4) ($CO_2$ is provided as an example), may be fed into an absorption column. $CO_2$ may be absorbed into the ammonia-rich water wash solution (L-1), forming an '$CO_2$-rich, ammonia-rich' water wash solution (L-2) and/or a '$CO_2$-lean gas' (G-5 or G-6, depending on the source and concentration of $CO_2$). The remaining ammonia-carbon dioxide solution (L-6) from step 5 may be contacted with the acid gas and/or mixed with the $CO_2$-rich, ammonia-rich water wash solution before step 3.

(3) Heating Using Low Temperature Waste Heat:

'$CO_2$-rich, ammonia-rich' water wash solution (L-2) may be heated using low temperature waste heat, which may form a higher temperature solution (L-3) (for example: 35° C.). Step 3 may occur simultaneously to step 4.

(4) Concentrating Solution Using Reverse Osmosis:

The heated '$CO_2$-rich, ammonia-rich' water wash solution (L-3) may be pressurized using a pump (P-1). The pressurized solution (L-4) may be fed into a reverse osmosis membrane. The concentrate solution (L-5) may be at a concentration above the saturation point of the ammonia-carbon dioxide at 20° C. (e.g. >3M). The permeate solution (L-7) may be cooled using ambient cooling (C-1) and/or transferred to step 1.

(5) Precipitation of Concentrate Solution Using Ambient Cooling:

The concentrate solution (L-5) may be cooled using ambient cooling (C-2) in mixer (M-1). Ammonia-carbon dioxide salt may precipitate. The ammonia-carbon dioxide precipitate may be separated from the remaining liquid in one or more solid liquid separation devices (F-1), which may form ammonia-carbon dioxide precipitate (S-1) and/or remaining ammonia-carbon dioxide solution (L-6). The remaining ammonia-carbon dioxide solution (L-6) may be contacted with the acid gas and/or mixed with the $CO_2$-rich, ammonia-rich water wash solution before step 3.

Thermally Switchable Solvent as Draw Solute:

Most thermally switchable solvents cannot be employed in seawater desalination because of the residual draw solute present after the draw solute is 'recovered.' However, one or more ammonia abatement cycles herein may function with residual draw solute in the draw and/or feed solutions.

Cooling Water Concentrating:

One or more embodiments herein may regenerate the draw solution employed in the forward osmosis component of the ammonia abatement cycle by using the diluted draw solution as cooling water, concentrating the diluted draw solution, for example, using evaporation. The present version of the technology may provide cooling/cooling water, while creating a concentrated draw solute for the Forward Osmosis in the ammonia abatement cycle. To minimize modification to a power plant or corrosion, the draw solute may be an inert, high osmotic pressure compound, such as PEG 200 or non-corrosive salt.

Absorb ammonia from ammonia-slip using an aqueous common ion salt solution (e.g. KHCO3, ammonium nitrate, ammonium sulfate, ammonium acetate). Acidic salts may encourage ammonia absorption, basic salts may encourage ammonia-carbon dioxide salt precipitation After ammonia is absorbed, absorb carbon dioxide into the solution. An ammonia-carbon dioxide precipitate will form due to the common ion effect. The precipitate may be filtered and added back to the original process (non-thermal ammonia abatement cycle)

Alternatively, the ammonia can be absorbed in a water-PG or water-glycerol or water-ethylene Glycol, or water PEG 200, or water-PEG 400 solution (or other solution with a non-volatile highly soluble, inexpensive organic). CO2 may be absorbed in the solution (even possibly higher concentration or pure CO2) to, for example, precipitate the ammonia-carbon dioxide salt. The salt may be then filtered and the remaining solution may be ammonia lean.

$NH_3$ containing gases and/or sources for $CO_2$ may comprise include, but are not limited to, one or more or a combination of the following: coke ovens, fertilizer production, metal production, metal refining, ammonia, explosive production, urea production, the production of one or more ammonia derivatives, combustion flue gas, pure gas, Power Plant (Natural gas, coal, oil, petcoke, biofuel, municipal waste), Cement Production, Waste Water Treatment, Landfill gas, Air, Metal production/refining (such as Iron, Steel, Aluminum, etc.), Glass production, Oil refineries, HVAC, Transportation vehicles (ships, boats, cars, buses, trains, trucks, airplanes), Natural Gas, Biogas, Alcohol fermentation, Volcanic Activity, Decomposing leaves/biomass, Septic tank, Respiration, Manufacturing facilities, Fertilizer production, Air, or Geothermal processes where $CO_2(g)$ releases from a well or wells Heat sources may include, but are not limited to, one or more or a combination of the following: eat sources may include, but are not limited to, waste heat, power plant waste heat, steam, heat, pump or compressor waste heat, industrial process waste heat, steel waste heat, metal refining and production waste heat, paper mill waste heat, cement production waste heat, calcination waste heat, factory waste heat, petroleum refining waste heat, solar heat, solar pond, air conditioner waste heat, combustion heat, geothermal heat, ocean or water body thermal heat, stored heat, and $CO_2(g)$ absorption solution heat.

Acid gases may include, but are not limited to, one or more or a combination of the following: Acid gas concentrations include, but are not limited to, equal to or greater than one or more or a combination of the following: 1 PPM, or 10 PPM, or 100 PPM, or 1000 PPM, or 10,000 PPM, or 2%, or 3%, or 4%, or 5%, or 6%, or 7%, or 8%, or 9%, or 10%, or 11%, or 120/6, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32;%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 616, or 62%, or 63%, or 64%, or 65%, or 66%, or 67%, or 68%, or 69%, or 70%, or 71%, or 720%, or 73%, or 74%, or 75%, or 76%, or 77%, or 78%, or 79%, or 80%, or 81%, or 82%, or 83%, or 84%, or 85%, or 86, or 87%, or 88%, or 89% or 90%, or 91%, or 92%, or 93%, or 94%, or 95%, or 96%, or 97%, or 98%, or 99%, or 99.9%

CO2 Concentrations include, but are not limited to, equal to or greater than one or more or a combination of the following: 1 PPM, or 10 PPM, or 100 PPM, or 1000 PPM, or 10,000 PPM, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 385, or 39%, or 40%, or 41%, or 42%, or 43%, or 44%, or 45%, or 46%, or 47%, or 48%, or 49%, or 50, or 51%, or 52%, or 53,%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, 77%, or 78%, or 79%, or 80%, or 81%, or 82%, or 83%, or 84%, or 85%, or 86, or 87%, or 88%, or 89% or 90%, or 91%, or 92%, or 93%, or 94%, or 95%, or 96%, or 97%, or 98%, or 99%, or 99.9%

In some embodiments, it may be desirable for the ammonia abatement cycle to employ higher concentrations of $CO_2$ in the acid gas absorber (such as >10%, or >15%, or >20%, or >30%, or potentially nearly pure or pure $CO_2$). Higher $CO_2$ concentrations may enable higher $CO_2$ loading (better membrane rejection and precipitation) and faster reaction kinetics (lower capital cost, less gas pumping energy).

Common ion acidic salts may include, but are not limited to, one or more or a combination of the following: ammonium nitrate, ammonium sulfate, ammonium chloride, one or more or ammonia-phosphoric acid salts, ammonium phosphate, monoammonium phosphate, diammonium phosphate, triammonium phosphate, ammonium hydrogen phosphate, ammonium sulfite, ammonium bisulfite, ammonium thiosulfate, ammonium chlorate, ammonium perulfate, ammonium metabisulfate, metal-ammonia complexes, copper-ammonia complexes, iron-ammonia complexes, zinc-ammonia complexes, aluminum-ammonia complexes, cobalt-ammonia complexes, lead-ammonia complexes, ammonium fluoride, ammonium chloride Conditions, Temperatures, Concentrations, Compositions and Other Parameters The solubility of one or more gases may be less than, equal to, or greater than including, but not limited to, one or more of the following: 0.00001 g per kg solvent, 0.01 g per kg solvent, 0.1 g per kg solvent, 0.5 g per kg solvent, 1 g per kg solvent, 1.5 g per kg of solvent, 2 g per kg of solvent, 3 g per kg of solvent, 4 g per kg of solvent, 5 g per kg of solvent, 6 g per kg of solvent, 7 g per kg of solvent, 8 g per kg of solvent, 9 g per kg of solvent, 10 g per kg of solvent, 11 g per kg of solvent, 12 g per kg of solvent, 13 g per kg of solvent, 14 g per kg of solvent, 15 g per kg of solvent, 16 g per kg of solvent, 17 g per kg of solvent, 18 g per kg of solvent, 19 g per kg of solvent, 20 g per kg of solvent, 21 g per kg of solvent, 22 g per kg of solvent, 23 g per kg of solvent, 24 g per kg of solvent, 25 g per kg of solvent, 26 g per kg of solvent, 27 g per kg of solvent, 28 g per kg of solvent, 29 g per kg of solvent, 30 g per kg of solvent, 40 g per kg of solvent, 50 g per kg of solvent, 60 g per kg of solvent, 70 g per kg of solvent, 80 g per kg of solvent, 90 g per kg of solvent, 100 g per kg of solvent, 110 g per kg of solvent, 150 g per kg of solvent, 200 g per kg of solvent, 300 g per kg of solvent, 400 g per kg of solvent, 500 g per kg of solvent, 750 g per kg of solvent, 1000 g per kg of solvent, 1500 g per kg of solvent, 2000 g per kg of solvent Methane losses may be equal to, greater than, or less than one or more or a combination of the following: 0.00001%, 0.0001%, 0.001%, 0.01%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.5%, 4.0%, 4.5%, 5%, 10%

Applications for the embodiments described herein, may include, but are not limited to, one or more or a combination of the following: ammonia separation, ammonia recovery, acid gas removal, hydrocarbon-hydrocarbon separation, hydrocarbon-inert gas separation, acid gas processing, natural gas processing, gas processing, syngas purification, syngas acid gas removal, $CO_2$ removal from steam methane reforming gases, $CO_2$ removal from steam biomass reforming gases biogas upgrading, $CO_2$ removal from hydrocarbon reforming gases, biogas upgrading, gas treatment, $CO_2$ capture, post-combustion capture, pre-combustion capture, landfill gas, flue gas, air separation, gas concentrating, gas removal, aerosol removal, aerosol separation, enhanced oil recovery with or without supercritical fluids, enhanced oil recovery gas processing, enhanced oil recovery gas processing for $CO_2$ reinjection, separation of Fischer-Tropsch gases or liquids.

Reagents, compounds, ionic compounds, solvents, or reagents may include, but are not limited to, one or more or a combination of the following: H−, H+, D−, D+, H2−, H2+, H3+, He−, He+, He, H+, He2+, Li−, Li+, Na−, Na+, K−, K+, Cu−, Cu+, LiH−, LiH+, NaH−, NaH+, KH+, Be−, Be+, Mg−, Mg+, Ca−, Ca+, Zn−, Zn+, BeH−, BeH+, MgH−, MgH+, CaH+, ZnH+, BeH2+, B−, B+, Al−, Al+, Sc+, Ga−, Ga+, BH−, BH+, AlH−, AlH+, ScH+, GaH+, BH2−, BH2+, AlH2−, o2AlH2+, BH3−, BH3+, AlH3−, AlH3+, BH4−, AlH4−, C−, C+, Si−, Si+, Ti−, Ti+, Ge−, Ge+, CH−, CH+, SiH−, SiH+, GeH+, CH2−, CH2+, SiH2−, SiH2+, GeH2−, CH3−, CH3+, SiH3−, SiH3+, GeH3+, CH4−, CH4+, SiH4+, N−, N+, P−, P+, V+, As−, As+, NH−, NH+, PH−, PH+, AsH+, NH2−, NH2+, PH2−, PH2+, AsH2+, NH3−, NH3+, PH3+, AsH3+, NH4+, PH4+, O−, O+, S−, S+, Se−, Se+, OH−, OH+, HS−, HS+, CrH+, HSe−, HSe+, H2O−, H2O+, H2S−, H2S+, H2Se+, H3+, H3S+, H3Se+, F−, F+, Cl−, Cl+, Br−, Br+, I−, I+, HF−, HF+, HCl−, HCl+, HBr−, HBr+, H2F+, H2Cl+, H2Br+, Ne−, Ne+, Ar−, Ar+, Kr+, NeH+, ArH+, KrH+, XeH+, Li2−, Li2+, NaLi−, NaLi+, Na2−, Na2+, NaK+, Be2−, Be2+, Mg2−, Mg2+, B2−, B2+, Al2−, Al2+, BC−, BC+, C2−, C2+, SiC−, SiC+, Si2−, Si2+, C2H−, C2H+, C2H2+, H2CC−, HCCH−, C2H3−, C2H3+, C2H4−, C2H4+, C2H5−, C2H5+, C2H6+, C2H7+, LiN+, BeN−, BeN+, BN−, AlN−, AlN+, BN+, CN−, CN+, CP−, CP+, SiN−, SiN+, SiP−, SiP+, N2−, N2+, PN−, PN+, P2−, P2+, HCN−, HCN+, NNH+, HPO+, CNH2+, H2CN+, HCNH+, N2H2+, CH2NH2+, N2H4+, CH3NH2+, N2H5+, CH3NH3+, CH3PH3+, LiO−, LiO+, LiS+, NaO−, NaO+, KO+, BeO−, BeO+, MgO−, MgO+, MgS−, MgS+, BeS−, BeS+, BO−, AlO−, AlO+, BS−, BS+, AlS−, AlS+, BO+, CO−, CO+, CS−, CS+, SiO−, SiO+, SiS−, SiS+, CSe−, CSe+, GeO+, NO−, NO+, NS−, NS+, PO−, PO+, PS−, PS+, O2−, O2+, SO−, SO+, S2−, S2+, SeO−, SeO+, SeS−, SeS+, Se2−, Se2+, COH+, HCO−, HCO+, HCS−, HCS+, HNO−, HNO+, NOH+, HNS−, HO2−, HO2+, KOH2+, H2CO−, H2CO+, H2CS−, H2CS+, H2O2+, H2S2+, CH2OH+, CH3O−, CH3O+, H2CSH+, H3O2+, CH3OH−, CH3OH+, CH3SH+, CH3OH2+, CH3SH2+, H5O2+, LiCl−, LiCl+, NaF−, NaF+, NaCl−, NaCl+, LiBr−, LiBr+, NaBr−, NaBr+, LiF−, LiF+, BeF−, BeF+, MgF−, MgF+, MgCl−, MgCl+, ZnF−, ZnF+, BeCl−, BeCl+, BF−, BF+, AlF−, AlF+, BCl−, BCl+, AlCl−, AlCl+, GaF+, GaCl+, CF−, CF+, CCl−, CCl+, SiF−, SiF+, SiCl−, SiCl+, GeF+, NF−, NF+, NCl−, NCl+, PF−, PF+, PCl−, PCl+, FO−, FO+, ClO−, ClO+, SF−, SF+, SCl−, SCl+, BrO−, F2−, F2+, ClF, ClF+, Cl2−, Cl2+, BrF−, BrF+, BrCl−, BrCl+, Br2−, Br2+, I2+, HOBr+, F2H+, FHF−, Cl2H+, CH3ClH+, LiNe+, Ne2+, Ar2+, Li3+, C3+, C3H3−, C3H3+, C3H3+, C3H5+, C3H7+, C3H7+, C3H7+, N3−, N3+, CH3CN−, CH3CN+, HNCNH2+, NCNH3+, C2H5NH+, C2H6N+, (CH3)2NH2+, CH3CH2NH3+, Li2O+, CNO−, NCO−, SCN−, BO2−, BO2+, N2O−, N2O+, CO2−, CO2+, OCS+, CS2−, CS2+, NO2−, NO2+, PO2−, PO2+, O3−, O3+, SO2−, SO2+, S3−, S3+, SeO2+, HCO2−, HNNO+, NNOH+, HOCO+, HNO2+, O3H+, SO2H+, CH2CO+, H2COO+, CH3CO−, CH3CO+, CH3OO−, CH3OO+, H2CONH2+, C2H4OH+, C2H4OH+, CH3CHOH+, FCO+, CF2−, CF2+, SiF2+, CCl2−, CCl2+, ClOO+, OClO−, OClO+, NF2+, SF2−, SF2+, F3−, Cl3−, HCCF+, HFCO+, CH2CHF+, C4+, C4H2+, C2N2+, HCCCN+, C3H3N+, CH3NHN2+, CH6N3+, (CH3)3NH+, C3H7NH3+, CO3−−, NO3−, NO3+, SO3−, SO3+, HCO3−, C2H2O2+, H2NO3+, CH3COO−, H3CO3+, NH2CONH2+, NH2COOH2+, NH3COOH+, CH5N2O+, H2NCOHNH2+, CH3COCH3−, CH3COHCH3+, C2Cl2+, BF3−, BF3+, ClO3−, CF3−, CF3+, SiF3+, CCl3−, CCl3+, SiCl3+, NF3−, NF3+, NF3H+, AsF3H+, CH2ClCH2OH2+, C5H5−, C3H3N2−, C4H4N−, C4H6N+, C4H6N+, C4H6N+, NC4H12+, C3O2+, PO4−−−, SO4−, HSO4−, C4H4O+, C4H10O+, ClO4−, BF4−, CCl4+, C2HF3+, C6H5−, C6H6+, C6H7+, C5H6N+, C2O4−−, CF3CN+, C2F4+, SiF5−, SF5+, C7H7+, CF3COO−, PF6−, C6N4−, H, H, D, D, H2, H2, H3, He, He, He, H, He2, Li, Li, Na, Na, K, K, Cu, Cu, LiH, Li, NaH, NaH, KH, Be, Be, Mg, Mg, Ca, Ca, Zn, Zn, BeH, BeH, MgH, MgH, CaH, ZnH, BeH2, B, B, Al, Al, Sc, Ga, Ga, BH, BH, AlH, AlH, ScH, GaH, BH2, BH2, AlH2, o2AlH2, BH3, BH3, AlH3, AlH3, BH4, AlH4, C, C, Si, Si, Ti, Ti, Ge, Ge, CH, CH, SiH, SiH, GeH, CH2, CH2, SiH2, SiH2, GeH2, CH3, CH3, SiH3, SiH3, GeH3, CH4, CH4, SiH4, N, N, P, P, V, As, As, NH, NH, PH, PH, AsH, NH2, NH2, PH2, PH2, AsH2+, NH3, NH3, PH3, AsH3, NH4, PH4, O, O, S, S, Se, Se, OH, OH, HS, HS, CrH, HSe, HSe, H2O, H2O, H2S, H2S, H2Se, H3O, H3S, H3Se, F, F, Cl, Cl, Br, Br, I, I, HF, HF, HCl, HCl, HBr, HBr, H2F, H2Cl, H2Br, Ne, Ne, Ar, Ar, Kr, NeH, ArH, KrH, XeH, Li2, Li2, NaLi, NaLi, Na2, Na2, NaK, Be2, Be2, Mg2, Mg2, B2, B2, Al2, Al2, BC, BC, C2, C2, SiC, SiC, Si2, Si2, C2H, C2H, C2H2, H2CC, HCCH, C2H3, C2H3, C2H4, C2H4, C2H5, C2H5, C2H6, C2H7, LiN, BeN, BeN, BN, AlN, AlN, BN, CN, CN, CP, CP, SiN, SiN, SiP, SiP, N2, N2, PN, PN, P2, P2, HC, HCN, NNH, HPO, CNH2, H2CN, HCNH, N2H2, CH2NH2, N2H4, CH3NH2, N2H5, CH3NH3, CH3PH3, LiO, LiO, LiS, NaO, NaO, KO, BeO, BeO, MgO, MgO, MgS, MgS, BeS, BeS, BO, AlO, AlO, BS, BS, AlS, AlS, BO, CO, CO, CS, CS, SiO, SiO, SiS, SiS, CSe, CSe, GeO, NO, NO, NS, NS, PO, PO, PS, PS, O2, O2, SO, SO, S2, S2, SeO, SeO, SeS, SeS, Se2, Se2, COH, HCO, HCO, HCS, HCS, HNO, HNO, NOH, HNS, HO2, HO2, KOH2, H2CO, H2CO, H2CS, H2CS, H2O2, H2S2, CH2OH, CH3O, CH3O, H2CSH, H3O2, CH3OH, CH3OH, CH3SH, CH3OH2, CH3SH2, H5O2, LiCl, LiCl, NaF, NaF, NaCl, NaCl, LiBr, LiBr, NaBr, NaBr, LiF, LiF, BeF, BeF, MgF, MgF, MgCl, MgCl, ZnF, ZnF, BeCl, BeCl, BF, BF, AlF, AlF, BCl, BCl, AlCl, AlCl, GaF, GaCl, CF, CF, CCl, CCl, SiF, SiF, SiCl, SiCl, GeF, NF, NF, NCl, NCl, PF, P, PCl, PC, FO, FO, ClO, ClO, SF, SF, SCl, SCl, BrO, F2, F2, ClF, ClF, Cl2, Cl2, BrF, BrF, BrCl, BrCl, Br2, Br2, I2, HOBr, F2H, FHF−, Cl2H, CH3ClH, LiNe, Ne2, Ar2, Li3, C3, C3H3, C3H3, C3H3, C3H5, C3H7, C3H7, C3H7, N3, N3, CH3CN, CH3CN, HNCNH2, NCNH3, C2H5NH, C2H6N, (CH3) 2NH2, CH3CH2NH3, Li2O, CNO, NCO, SCN, BO2, BO2, N2O, N2O, CO2, CO2, OCS, CS2, CS2, NO2, NO2, PO2, PO2, O3, O3, SO2, SO2, S3, S3, SeO2, HCO2, HNNO, NNOH, HOCO, HNO2, O3H, SO2H, CH2CO, H2COO, CH3CO, CH3CO, CH3OO, CH3OO, H2CONH2, C2H4OH, C2H4OH, CH3CHOH, FCO, CF2, CF2, SiF2, CCl2, CCl2, ClOO, OClO, OClO, NF2, SF2, SF2, F3, Cl3, HCCF, HFCO, CH2CHF, C4, C4H2, C2N2, HCCCN, C3H3N, CH3NHN2, CH6N3, (CH3)3NH, C3H7NH3, CO3, NO3, NO3, SO3, SO3, HCO3, C2H2O2, H2NO3, CH3COO, H3CO3, NH2CONH2, NH2COOH2, NH3COOH, CH5N2O, H2NCOHNH2, CH3COCH3, CH3COHCH3, C2Cl2, BF3, BF3, ClO3, CF3, CF3, SiF3, CCl3, CCl3, SiCl3, NF3, NF3, NF3H, AsF3H, CH2ClCH2OH2, C5H5, C3H3N2, C4H4N, C4H6N, C4H6N, C4H6N, NC4H12, C3O2, PO4, SO4, HSO4, C4H4O, C4H10O, ClO4, BF4, CCl4, C2HF3, C6H5, C6H6, C6H7, C5H6N, C2O4, CF3CN, C2F4, SiF5, SF5, C7H7, CF3COO, PF6, C6N4, ionic liquids Operating temperatures may include, but are not limited to, greater than or less than one or more or a combination of the following: −100° C., or −90° C., or −80° C., or −70° C., or −60° C., or −50° C., or −40° C., or −30° C., or −20° C., or −10° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 30° C., 40° C., 50° C., 60° C., 70° C., 80° C., 90° C., 100° C., 110° C., 120° C., 130° C., 140° C., 150° C., 140° C., 150° C., 200° C., 500° C., 1000° C., 2000° C., 3000° C., 10000° C., 100000° C.

Absorption unit operations may include, but are not limited to, one or more or a combination of the following: absorption column, column, contactor, gas-liquid contactor, liquid-liquid contactor, liquid solid contactor, membrane contactor, transmembrane chemisorption, gas membrane contactor, packed column, membrane column, plated column, multistage column, solid handling column, liquid handling column, multiphase column, rotating absorption unit, kinetic motion absorption unit, stripping column, mixing vessel, continuously stirred reactor, pressurization vessel, depressurization vessel, multistage vessel, batch setup, mixing of two or more phases, formation of more phases from less phases, formation of less phases from relatively more phases, heating vessel, cooling vessel, membrane absorption, membrane selective absorption, centrifugal contactor Desorption unit operations may include, but are not limited to, one or more or a combination of the following: column, contactor, gas-liquid contactor, membrane column, membrane contactor, gas membrane contactor, packed column, plated column, multistage column, multistage vessel, batch setup, liquid-liquid contactor, liquid solid contactor, solid handling column, liquid handling column, multiphase column, rotating desorption unit, kinetic motion desorption unit, stripping column, mixing vessel, continuously stirred reactor, reboiler, depressurization vessel, pressurization vessel, flash vessel, flash unit, multistage flash unit, mixing of two or more phases, formation of more phases from less phases, formation of less phases from relatively more phases, heating vessel, cooling vessel, carrier gas stripping, steam stripping, air stripping, recirculating gas stripping, stripping using one or more gases being desorbed, ammonia stripping, membrane stripping, membrane distillation, membrane selective absorption, acid gas stripping Acid Gases, include, but are not limited to, one or more or a combination of the following applications: acid gas removal, hydrocarbon-hydrocarbon separation, hydrocarbon-inert gas separation, acid gas processing, natural gas processing, gas processing, gas plants for purification and/or re-injection of $CO_2$, $H_2S$, or other acid gases into oil field, syngas purification, syngas acid gas removal, $CO_2$ removal from steam methane reforming gases, $CO_2$ removal from steam biomass reforming gases biogas upgrading, $CO_2$ removal from hydrocarbon reforming gases, biogas upgrading, gas treatment, $CO_2$ capture, post-combustion capture, pre-combustion capture, landfill gas, flue gas, Hydrocarbons, may include, but are not limited to, one or more or a combination of the following: compound containing carbon, compound containing hydrogen, compound containing oxygen, compound containing nitrogen, compound containing sulfur, saturated hydrocarbon, unsaturated hydrocarbon, cyclic hydrocarbon, cyclo hydrocarbon, aromatic hydrocarbon, alkane, alkene, alkyne, cycloalkane, alkadiene, polymers, halogenated hydrocarbons, hydrocarbons with one or more functional groups, one or more hydrocarbons in crude oil, one or more different hydrocarbons in crude oil, one or more hydrocarbons in naphtha, one or more hydrocarbons in gasoline, one or more hydrocarbons in diesel, one or more hydrocarbons in heavy oil, one or more hydrocarbons in natural gas, natural gas liquids, one or more hydrocarbons in kerosene, organic solvents, light hydrocarbons, heavy hydrocarbons, water insoluble hydrocarbons, partially water soluble hydrocarbons, water soluble hydrocarbons, low toxicity hydrocarbons, medium toxicity hydrocarbons, high toxicity hydrocarbons, methane, Ethane, Ethene (ethylene), Ethyne (acetylene), Propane, Propene (propylene), Propyne (methylacetylene), Cyclopropane, Propadiene, Butane, Butene (butylene), Butyne, Cyclobutane, Butadiene, Pentane, Pentene, Pentyne, Cyclopentane, Pentadiene, (piperylene), Hexane, Hexene, Hexyne, Cyclohexane, Hexadiene, Heptane, Heptene, Heptyne, Cycloheptane, Heptadiene, Octane, Octene, Octyne, Cyclooctane, Octadiene, hydrocarbon solution, hydrocarbon containing mixture Superior properties for absorption or desorption may include, but are not limited to, one or more or a combination of the following: higher equilibrium partial pressure of one or more gases or different gases, lower equilibrium partial pressure of one or more gases or different gases, faster kinetics, greater desorption of a desired gas relative to a less desired gas, greater absorption of a desired gas relative to a less desired gas, low viscosity, low volatility of other solvent constituents, low relative volatility of other solvent constituents, no degradation, no corrosion, minimal degradation, minimal corrosion, compatibility with gas impurities, minimal impurities in desorbed gases, higher temperature absorber, low energy consumption ammonia recovery Salts may include, but are not limited to, one or more or a combination of the following: ionic compounds, ionic liquids, anions, cations, complex salts, complex ions, compounds with properties similar to salts, salts with properties dissimilar to salts, alkali, alkaline-earth, transition metal, metal, semiconductor, metalloids, ammonia, ammonium, amine, basic compound, halogenated compound, sulfate, nitrate, carbonate, hydrogen carbonate, carbamate, nitrite, sulfite, carbon compound, sulfur compound, electrolyte, nitrogen compound, phosphorous compound, phosphorous containing anion, halogen containing anion Gas, Liquid, aqueous, solid, dissolved, one or more ionic species or forms, one or more liquid phase species, biphasic mixture, multiphasic mixture, multiphasic mixture comprising liquids, solid mixture, supercritical, hydrate, triple-point, or combination thereof.

Carbon Dioxide (gas), Carbon Dioxide (liquid), Carbon Dioxide (aqueous), Carbon Dioxide (solid), Carbon Dioxide (dissolved), Carbon Dioxide (one or more ionic species), Carbon Dioxide (one or more liquid phase species), Carbon Dioxide (solid mixture), Carbon Dioxide (supercritical), Carbon Dioxide (Hydrate), Carbon Dioxide (triple point), Acidic Reagent (gas), Acidic Reagent (liquid), Acid Reagent (aqueous), Acidic Reagent Gas (Hydrate) Acidic Reagent (solid), Acidic Reagent (dissolved), Acidic Reagent (one or more ionic species), Acidic Reagent (one or more liquid phase species), Acidic Reagent (solid mixture), Acid Reagent (supercritical), Acidic Reagent (triple point), Basic Compound (gas), Basic Compound (liquid), Basic Compound (solid), Basic Compound (dissolved), Basic Compound (one or more ionic species), Basic Compound (one or more liquid phase specific), Basic Compound (solid mixture), Basic Compound (supercritical), Basic Compound (hydrate), Basic Compound (triple point), Hydrocarbon (gas), Hydrocarbon (liquid), Hydrocarbon (aqueous), Hydrocarbon (dissolved), Hydrocarbon (non-aqueous), Hydrocarbon (one or more ionic species), Hydrocarbon (one or more liquid phase species), Hydrocarbon (solid), Hydrocarbon (solid mixture), Hydrocarbon (supercritical), Hydrocarbon (Hydrate), Hydrocarbon (triple point).

Viscosity is greater than, equal to, or less than 100,000 cP, or 10,000 cP, or 1,000 cP, or 500 cP, or 100 cP, or 50 cP, or 40 cP, or 30 cP, or 20 cP, or 10 cP, or 9 cP, or 8 cP, or 7 cP, or 6 cP, or 5 cP, or 4 cP, or 3 cP, or 2 cP, or 1 cP or 0.5 cP, or combination thereof Cooling Inputs or Sources include, but are not limited to, one or more or a combination of the following: thermocline water body, thermocline liquid body, water body, cold liquid body, evaporative cooling, heat pump cooling, air cooling, heat exchange with enthalpy source, cyrogenic cooling, LNG gasification, pressure reduction, cold surface, radiative cooling, endothothermic phase change Heating Inputs or Sources include, but are not limited to, one or more or a combination of the following: Waste Heat, Ambient Temperature Changes, Diurnal Temperature Variation, Thermocline liquid body, thermocline solid body, thermocline gaseous body, Thermocline of a water body, halocline, heat pump, solar thermal, solar thermal pond, light, electricity, steam, combustion, compression, pressure increase, geothermal, radiative heat, condensation, exothermic dissolution, exothermic precipitation, exothermic formation of more liquid phases, exothermic formation of less liquid phases, exothermic phase change, or other heat sources described herein.

Temperatures: temperatures of operation are greater than, less than, or equal to or a combination thereof include, but are not limited to, one or more or a combination of the following: −100° C., or −90° C., or −80° C., or −70° C., or −60° C., or −50° C., or −40° C., or −30° C., or −20° C., or −10° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 30° C., 40° C., 50° C., 60° C., 70° C., 80° C., 90° C., 100° C., 110° C., 120° C., 130° C., 140° C., 150° C., 140° C., 150° C., 200° C., 500° C., 1000° C., 2000° C., 3000° C., 10000° C., 100000° C.

Mass percentages of one or more components comprise greater than or less than or equal to one or more or a combination of the following: 0.0000001%, 0.001%, 0.01%, 0.1%, 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

Relative mass distribution of one or more phases may include, but is not limited to, greater than or less than or equal to one or more or a combination of the following: 0.0000001%, 0.001%, 0.01%, 0.1%, 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

A 'substantial' or large or a synonym thereof concentration of one or more components (For Example: reagents or reagents or solvents or antisolvents) may include, but is not limited to, mass percentages of one or more components comprising greater than or equal to one or more or a combination of the following: 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

pH may be greater than or equal to or less than one or more or a combination of the following: 1, or 2, or 3, or 4, or 5, or 6, or 7, or 8, or 9, or 10, or 11, or 12, or 13, or 14

Separation Devices may include, but are not limited to, one or more or a combination of the following: decanter, separatory funnel, coalescer, centrifuge, filter, switchable solvent, cyclone, semi-permeable membrane, nanofiltration, organic solvent nanofiltration, reverse osmosis, ultrafiltration, microfiltration, hot nanofiltration, hot ultrafiltration, distillation, membrane distillation, flash distillation, multi-effect distillation, mechanical vapor compression distillation, or hybrid systems
  (a) (a) Membrane-Based Separation comprising one or a combination of the following: Nanofiltration, Organic Solvent Nanofiltration, Reverse Osmosis, Forward Osmosis, Ultrafiltration, Microfiltration
  (b) (b) Evaporation or Distillation may comprise, including, but not limited to, one or a combination of the following: Batch distillation, Continuous distillation, Simple distillation, Fractional distillation, Steam distillation, Azeotropic distillation, Multi-effect distillation, Multi-stage flash distillation, Flash distillation, Mechanical vapor compression distillation, Membrane distillation, Vacuum distillation, Short path distillation, Zone distillation, Air sensitive distillation, Thermally switchable, CO2-switchable, Switchable solvents responsive to other changes to system conditions.

Reagents may comprise including, but not limited to, one or more or a combination of the following: water, organic solvent, siloxanes, ionic liquids, water soluble polymer, soluble polymer, glycol, polyethylene glycol, polypropylene glycol, ethers, glycol ethers, glycol ether esters, triglyme, polyethylene glycols of multiple geometries, including, branched polyethylene glycols, star polyethylene glycols, comb polyethylene glycols, methoxypolyethylene glycol, polyvinyl alcohol, polyvinylpyrrolidone, polyacrylic Acid, diol polymers, 1,2 propanediol, 1,2 ethanediol, 1,3 propanediol, cellulose ethers, methylcellulose, cellosize, carboxymethylcellulose, hydroxyethylcellulose, sugar alcohol, sugars, alcohols, ketones, aldehydes, esters, organosilicon compounds, halogenated solvents, non-volatile solvents, a reagent with a vapor pressure less than 0.01 atm at 20° C., soluble reagents with a molecular weight greater than 80 daltons, volatile organic solvents, soluble reagents with a molecular weight less than 600 daltons, soluble reagents with a molecular weight less than 200 daltons, dimethoxymethane, acetone, acetaldehyde, methanol, dimethyl ether, THF, ethanol, isopropanol, propanal, methyl formate, propylene carbonate, azeotropes, alcohols, ketones, aldehydes, esters, organosilicon compounds, halogenated solvents, a reagent with a vapor pressure greater than than 0.01 atm at 20° C., Reagents may include, but are not limited to, water, ammonia, ammonium, amine, azine, amino ethyl ethanol amine, 2-amino-2-methylpropan-1-ol (AMP), MDEA, MEA, primary amine, secondary amine, tertiary amine, low molecular weight primary or secondary amine, metal-ammine complex, metal-ammonia complex, metal-ammonium complex, sterically hindered amine, imines, azines, piperazine, alkali metal, lithium, sodium, potassium, rubidium, caesium, alkaline earth metal, calcium, magnesium, ionic liquid, thermally switchable compounds, $CO_2$ switchable compounds, enzymes, metal-organic frameworks, quaternary ammonium, quaternary ammonium cations, quaternary ammonium cations embedded in polymer, or a combination thereof.

One or more impurities may be removed using an ion exchange, ion exchange membrane, electrodialysis, or removal or replacement of the absorbent and/or $CO_2$ containing solution.

Convenient sources from which to capture $CO_2$ for the $CO_2$ containing solution include sources selected from the group consisting of flue gas; combustion emissions; manufacturing emissions; refining emissions or a combination thereof. Such sources may include, for example, from combustion of one or more hydrocarbons; emissions from the combustion of natural gas, coal, oil, petcoke, gasoline, diesel, biofuel, or municipal waste; emissions from waste water treatment gases, or landfill gases, from air, from metal production/refining, from the production of Iron, Steel, Aluminum or Zinc, from cement production, from quicklime production, from Glass production, oil and gas refineries, steam reforming, hydrogen production, HVAC, refrigeration, transportation vehicles (ships, boats, cars, buses, trains, trucks, airplanes), natural gas, biogas, alcohol fermentation, volcanic activity, decomposing leaves/biomass, septic tank, respiration, manufacturing facilities, fertilizer production, geothermal wells, and combinations thereof.

The amounts of gas to be captured or concentrated or removed from one or more sources will vary. It may be desired to capture at least about any of the following percentages (%) from the total $CO_2$ in the source: 40, or 50, or 60, or 70, or 80, or 90, or substantially 100. The one or more gases may be captured from any convenient source using any convenient manner. If desired, the input gas stream or streams may be treated, e.g., scrubbed, before being subjected to the one or more absorption solutions and/or forming a gas-rich, such as $CO_2$-rich, solution. Such treating methods may be particularly advantageous if the source has impurities that may deleteriously affect subsequent processing steps. Such impurities include, but are not limited to, NOx, SOx, oils, particulate matter, heavy metals, and heavy compounds, etc. Conventional treating methods may be employed for this purpose.

The amounts of $CO_2$ to be desorbed will vary. Typically, it is desired to desorb at least about any of the following percentages (%) from the total $CO_2$ in the source: 40, or 50, or 60, or 70, or 80, or 90, or substantially 100%.

By "at least partially recovered" it is meant from at least about 50%, or at least about 60%, or at least about 70%, or at least about 80%, or at least about 90%, or at least about 95%, or at least about 99% up to 100% of the soluble solvent is recovered for re-use in the process or something else.

For example, the separation mechanism used may include one or more or a combination of the following: membrane, reverse osmosis, hot reverse osmosis, nanofiltration, organic solvent nanofiltration, hot nanofiltration, ultrafiltration, hot ultrafiltration, microfiltration, filtration, distillation, membrane distillation, multi-effect distillation, mechanical vapor compression distillation, binary distillation, azeotrope distillation, hybrid separation devices, flash distillation, multi-stage flash distillation, extractive distillation, switchable solvent, LCST phase change, UCST phase change, 'salting-out,' or centrifuge, or combinations thereof.

Useful membranes may include, for example, any membrane capable of at least partially rejecting one or more said reagents, Such membranes may comprise a membrane selected from the group consisting of Reverse Osmosis, Nanofiltration, Organic Solvent Nanofiltration, Ultrafiltration, Microfiltration, osmotically assisted reverse osmosis, osmotically assisted nanofiltration, disc-tube reverse osmosis, and Filtration membranes. In some embodiments the membrane may have a molecular weight cutoff of greater than about 80 daltons. That is, the membrane allows passage of a substantial or majority amount of components with a molecular weight or hydration radius of less than about 80 daltons while rejecting a substantial or majority amount of components with a molecular weight or hydrations radius of greater than about 80 daltons up to about 600 daltons. In the art, another definition of molecular weight cut-off may refer to the lowest molecular weight solute (in daltons) in which 90% of the solute is retained by the membrane, or the molecular weight of the molecule that is 90% retained by the membrane. Membranes with a molecular weight cutoff of less than 1,000 daltons, or less than 10,000 daltons, or less than 50,000 daltons, or less than 100,000 daltons, or less than 200,000 daltons, or less than 500,000 daltons, or less than 1,000,000 daltons may also be useful depending upon the circumstances and components employed.

The membrane may be comprised of any useful material and such useful material may vary depending upon the components to be separated, their molecular weight, viscosity, and/or other properties. Useful membranes may include, for example, membranes comprised of a material selected from a thin film composite; a polyamide; a cellulose acetate; a ceramic membrane; other materials and combinations thereof.

One or more reagents may comprise, for example, one or more or a combination of the following: volatile organic solvents, soluble reagents with a molecular weight less than 600 daltons, soluble reagents with a molecular weight less than 200 daltons, dimethoxymethane, acetone, acetaldehyde, methanol, dimethyl ether, THF, ethanol, isopropanol, propanal, methyl formate, azeotropes, alcohols, ketones, aldehydes, esters, organosilicon compounds, halogenated solvents, a reagent with a vapor pressure greater than than 0.01 atm at 20° C., or a mixture thereof.

The integrated process wherein $CO_2$ volatilizes may occur in the presence of a low $CO_2$ partial pressure gas, in the presence of air, with the application of heat, or a combination thereof.

In some embodiments the soluble reagent may comprise a thermally switchable reagent, a $CO_2$ switchable reagent, or a non-ionic carbon containing compound. A switchable reagent is one which substantially separates from other materials depending upon, for example, a property or other ingredients of a combined composition. That is, a thermally switchable reagent may form one or more separate liquid phases or precipitate from a given solution or a combination thereof when subjected to temperatures above or below a certain threshold, e.g., cloud point.

The concentration of the soluble reagent(s) and any acid gas absorbent (which may comprise, for example, aqueous basic gas) employed in the integrated process may vary depending upon the reagent, other reagents, and desired results.

The concentration of the soluble reagent(s) and any $CO_2$ absorbent employed in the integrated process may vary depending upon the reagent, other reagents, and desired results. Typically, each may have a concentration of from about 1M to about 18M. That is, the concentration of each may be independent or dependent of the other and be, for example, greater or less than 1M, or less than 2M, or less than 3M, or less than 4M, or less than 5M, or less than 6M or less than 10M up to as high as 18M.

The absorption column may absorb less than or equal to any of the following: 5%, or 10% or 20%, or 30%, or 40%, or 50%, or 60%, or 70%, or 80% or 90%, or 99%, or 99.9%, or 100% of one or more gases from the one or more gas streams.

The absorption stage may include any absorption setup known in the art and may be composed of one or more absorption columns or vessels or other devices. The absorption column may include, but is not limited to, continuous absorption, continuous stirred absorption, batch column, packed column, plate column, hybrid absorption processes and other absorption processes known in the art. The absorption column or absorption solution may be chilled, wherein cooling may be conducted via any means including, but not limited to, ambient source, water bodies, cooling tower, industrial evaporative chiller and other chilling or cooling processes known in the art. It may be desirable for the $CO_2$ concentration in the $CO_2$ lean solution to be less than the $CO_2$ concentration in the $CO_2$ rich solution. A $CO_2(g)$ containing gas stream, including but not limited to flue gas, synthesis gas, steam-reforming gas, methane reforming gas, hydrogen production gases, air, concentrated, membrane concentrated gas stream, membrane concentrated flue gas, upstaged air (as would be created from the moisture swing $CO_2$ upstaging processes described by Klaus Lackner http://pubs.acs.org/doi/abs/10.1021/es201180v, incorporated herein by reference), biogas, landfill gas, or anaerobic digester gas. The $CO_2$ containing gas stream may be treated, used as an enthalpy, heat or cold source, or otherwise used prior to the absorption stage.

The remaining gas stream, if any, after at least a portion of $CO_2(g)$ or other gas is absorbed, or 'inert gases' may undergo further treatment or utilization, including but not limited to, thermal or other exchange with incoming $CO_2$ lean solution, water wash to remove trace gases, such as ammonia or organic solvent, removal process for trace gases, additional $CO_2$ scrubbing method, including, but not limited to, amines, solid sorbent, SELEXOL, UCARSOL, membrane or strong base, acid wash, separation, purification, or use of constituents, such as hydrogen, carbon monoxide, nitrogen, oxygen and/or argon.

Reagents may include, but are not limited to, one or more or a combination of the following; water, ammonia, ammonium amine, primary amine, secondary amine, tertiary amine, methylamine (MEA), methylethanolamine, aminoethylethanolamine, azine, imine, strong base, hydroxide, sodium hydroxide, potassium hydroxide, sodium oxide, potassium oxide, organic solvent, commercial $CO_2$ capture absorbents, quaternary ammonium compound, Selexol, Rectisol, KS-1, UCARSOL, metal-organic framework, solid adsorbent, high surface area compounds, activated carbon, zeolites, carbon nanotubes, graphene, graphene oxide, amine, amino ethyl ethanol amine, 2-Amino-2-methylpropan-1-ol (AMP), MDEA, MEA, primary amine, secondary amine, or tertiary amine, low molecular weight primary or secondary amine, metal-ammine complex, metal-ammonia complex, metal-ammonium complex, sterically hindered amine, imines, azines, piperazine, amine functionalized polymers, alkali metal, lithium, sodium, potassium, rubidium, caesium, alkaline earth metal, calcium, magnesium, cations, ionic liquid, $CO_2$ switchable solvents, $CO_2$ switchable surfactants carbonate, polymer containing amine functional groups, polar containing $CO_2$ reactive functional groups, enzymes, metal-organic frameworks, glycolamine, diglycolamine, quaternary ammonia or quaternary ammonium cations, or quaternary ammonium cations embedded in polymer, piperazine, diethanolamine, diglycolamine, diisopropanolamine, or mixtures thereof.

Multiple factors may be adjusted to achieve desired results, which may include, but are not limited to, residence time, added reagent type or types, soluble reagent concentration in the mixed desorption solution, concentration of the soluble reagent in the added reagent solution, temperature, application of heating or cooling, $CO_2$ loading in the $CO_2$ rich solution, pressure, or $CO_2$ loading in the in the added reagent solution.

Concentration of one or more reagents may include, but is not limited to, less than one or more or a combination of the following: 0.001%, or 0.1%, or 0.5%, or 1%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%, or 10.5%, or 11%, or 11.5%, or 12%, or 12.5%, or 13%, or 13.5%, or 14%, or 14.5%, or 15%, or 20%, or 30%, or 40%, or 50%, or 60%, or 70%, or 80%, or 90%, or 100%.

Carbon Dioxide or Acid Gas Sources: Any process or resource producing or containing carbon dioxide. Examples of $CO_2$ sources include, but are not limited to, the following: Power Plant (Natural gas, coal, oil, petcoke, biofuel, municipal waste), Waste Water Treatment, Landfill gas, Air, Metal production/refining (such as Iron, Steel, Aluminum, etc.), Glass production, Oil refineries, HVAC, Transportation vehicles (ships, boats, cars, buses, trains, trucks, airplanes), Natural Gas, Biogas, Alcohol fermentation, Volcanic Activity, Decomposing leaves/biomass, Septic tank, Respiration, Manufacturing facilities, Fertilizer production, or Geothermal processes where $CO_2(g)$ releases from a well or wells.

One or more embodiments may be aqueous or non-aqueous. Solutions may include, for example, polar organic solvents, including, but not limited to, ethylene carbonate, propylene carbonate, ethylene glycol, propylene glycol, DMSO, water and acetonitrile or inorganic solvents, such as liquid ammonia or liquid amines and mixtures thereof.

$NH_3$ or basic gas or acid gas or $CO_2$ or a combination thereof concentration in solution may be as a low as 0.000001 M or as great as pure absorbent. In molarity terms, the concentration of the $CO_2$ absorbent may be as low as 0.00001M or less than any of the following: 0.01 M, or 0.05M, or 0.1M, or 0.3M, or 0.5M, or 0.8 M, or 1M, or 1.3M, or 1.5M, or 1.8M, or 2M, or 2.3M, or 2.5M, or 2.8M, or 3M, or 3.3M, or 3.5M, or 3.8M, or 4M, or 5M, or 6M, or 7M, or 8M, or 9M, or 10M, or 12M, or 15M, or 18M, or even pure reagent.

The mixing apparatuses and methods may include, but are not limited to, batch mixers, continuous stirred-tank reactors, CSTRs, distillation column, packed column, electrospray, spray column, countercurrent spray column, and/or other apparatuses and/or methods. The apparatus may be heated using waste heat or other heat source for, including, but not limited to, promoting gas desorption, promoting gas desorption, reducing viscosity and/or increasing the rate of solvent mixing.

The one or more gases, such as $CO_2$, may pressurize, by any means, including but not limited to, closing and opening a release valve to allow the system to pressurize, utilizing a smaller gas release valve, temperature change, or using external compression. In the case where an acid gas is desorbed at a pressure greater than atmospheric pressure, less energy may be required for compression of this acid gas, if compression is desired. The exiting gas stream may contain predominantly acid gas if desired. At least a portion of this desorbed one or more acid gases may be used for, including, but not limited to, one or more or a combination of the following: recycled internally within the process, enhanced oil recovery, methanol production, syngas production, fuel production, urea production, fertilizer production, carbonate, bicarbonate production, carbamate production, beverage production, greenhouse, agricultural applications, welding gas, turbine working fluid, laser gas, food production, inert gas, cement production, $CO_2$ conversion processes, claus process, sulfuric acid production, nitric acid production, acid production, and other existing and future applications. This gas stream may be further treated by, including, but not limited to, water wash down, aqueous wash down, non-aqueous wash down, changes in pressure, changes in temperature, compression, vacuum, and an additional carbon capture process. Additives may be added to this gas stream prior, during or after treatment or in the absence of treatment. These additives include, but are not limited to, ammonia, electricity, light, hydrogen, amine, oxygen, methane, methanol, carbon monoxide, hydrogen sulfide, haloalkanes, chlormethane, dimethylether, hydrogen cyanide, sulfur, acid or acid gas, hydroxide, oxide, carbonate, carbamate, and bicarbonate.

Reagents or streams may include, but is not limited to, one or more or a combination of the following: organic solvents, concentrated soluble reagent solutions, water soluble polymers, combinations of soluble reagents, solvent mixtures, emulsions, pure reagent, pure solvent, aqueous solvent, surfactant containing solvents, zwitterions, solids, soluble solids, gases, liquid-solid mixtures, soluble gases, aerosols, suspended solids, solid-gas mixtures, super critical fluids, and fluid mixtures.

Application of Heating or Cooling: Heating or cooling may be incorporated throughout the integrated process.

vol/vol % concentration of one or more reagents may be as low as 0.0001% to as great as 99.99999%. Vol/vol % concentrations of one or more reagents may be practically greater than any of the following: 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

Mass % solubility of one or more reagents may be practically greater than any of the following: insoluble, 0.001%, 0.01%, 0.1%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 99.9%, or 100%, or completely miscible.

The gas concentration range may be as low as 0.000001% to as great as 99.99999%. The purity or concentration of the gas may be, for example, as low as any of the following: 0.000001%, or 0.0001%, or 0.001%, or 0.01%, 0.1% or greater than 0.1%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 99.9%, or less than or equal to 100%.

Liquid $CO_2$, Supercritical $CO_2$, or Solid $CO_2$

The gas partial pressure range may be as low as 0.000001 atm to as great as 100,000 atm. The partial pressure of one or more gases may be as low as, including, but not limited to, any of the following: 0.00001 atm, or 0.01 atm, or greater than or less than 0.05 atm, or 0.1 atm, or 0.2 atm, or 0.3 atm, or 0.4 atm, or 0.5 atm or 0.6 atm, or 0.7 atm, or 0.8 atm, or 0.9 atm, or 1 atm, or 1.1 atm, or 1.2 atm, or 1.3 atm, or 1.4 atm, or 1.5 atm, or 1.6 atm, or 1.7 atm, or 1.8 atm, or 1.9 atm, or 2 atm, or 2.1 atm, or 2.2 atm, or 2.3 atm, or 2.4 atm, or 2.5 atm, or 2.6 atm, or 2.7 atm, or 2.8 atm, or 2.9 atm, or 3 atm, or 3.5 atm, or 4 atm, or 4.5 atm, or 5 atm, or 5.5 atm, or 6 atm, or 6.5 atm, or 7 atm, or 7.5 atm, or 8 atm, or 8.5 atm, or 9 atm, or 9.5 atm, or 10 atm, or 12 atm, or 15 atm, or 18 atm, or 20 atm, or 22 atm, or 25 atm, or 28 atm, or 30 atm, or 40 atm, or 50 atm, or 60 atm, or 75 atm, or 100 atm, or 150 atm, or 200 atm, or 500 atm, or 1,000 atm, or 10,000 atm, or 100,000 atm, or less than 1,000,000 atm.

The purity or concentration of the desorbed gas or gases or final gas or gases produced may be dependent on the application. The setup may contain other gases than said desorbed gas or gases. The other gas or gases present in with this desorbed gas or gases may be dependent on the application. For example, if the $CO_2$ will be mixed with hydrogen (such as at about a 2:1 or 3:1 ratio) to produce $CO_2$ derived chemicals, hydrogen may be added as a headspace gas during $CO_2$ desorption. This example may reduce $CO_2$ capture energy requirements, including, but not limited to, due to the requirement of a lower partial pressure of $CO_2(g)$ desorbed and lower final solvent concentration required.

System conditions may include, but are not limited to, one or more or a combination of the following: temperature, pressure, light, sound, vibration, radiation, electromagnetic radiation, magnetism, acid gas concentration, basic gas concentration, dissolved gas concentration, presence one or more other reagents, lack of presence of one or more reagents, change in reagent concentration, the presence of one or more stimulants, the lack of presence or reduced presence of one or more stimulants Separation devices and mechanisms include, but are not limited to, one or more or a combination of the following: coalescer, switchable solvent, cyclone, semi-permeable membrane, nanofiltration, organic solvent nanofiltration, reverse osmosis, ultrafiltration, microfiltration, hot nanofiltration, hot ultrafiltration, distillation, membrane distillation, flash distillation, multi-effect distillation, mechanical vapor compression distillation, hybrid systems, thermally switchable solvent, centrifuge, or filter or combinations thereof.

The power source of one or more pumps may include, but is not limited to, one or more or a combination of the following: electricity, pressure exchanger, turbocharger, hydraulic pressure, heat, pressure retarded osmosis, or forward osmosis.

Following the membrane or filter based separation, energy may be recovered by both or either the permeate (the absorption solution) and the concentrate (the soluble reagent containing solution). These energy recovery devices are known in the art and include, but are not limited to, pressure exchangers and turbochargers.

Heat sources may include, but are not limited to, waste heat, power plant waste heat, steam, heat, pump or compressor waste heat, industrial process waste heat, steel waste heat, metal refining and production waste heat, paper mill waste heat, cement production waste heat, calcination waste heat, factory waste heat, petroleum refining waste heat, solar heat, solar pond, air conditioner waste heat, combustion heat, geothermal heat, ocean or water body thermal heat, stored heat, and $CO_2(g)$ absorption solution heat. Temperatures of heating or cooling for any of the embodiments disclosed may include, but are not limited to, less than any of the following: −20° C., or −10° C., or 0° C., or 10° C., or 20° C., or 25° C., or 30° C., or 35° C., or 40° C., or 41.5° C., or 41.5° C., or 41.5° C.-60° C., or 45° C., or 50° C., or 55° C., or 60° C., or 60-100° C., or 110° C., or 150° C.

One or more embodiments may be constructed and transported in smaller scale modules or as a unit, such as in shipping containers and transported and used in other locations.

Applications may include capturing carbon dioxide in remote locations, in applications including, but not limited to, oil and gas production, cement production, mining and air $CO_2$ capture. One or more embodiments may also be constructed as stationary unit or units One or more embodiments may employ a membrane with a molecular weight cut-off, including but not limited to, less than any of the following: 250 da, or 200 da, or 150 da, or 125 da, or 100 da, or 95 da, or 90 da, or 85 da, or 80 da, or 75 da Multicomponent separation devices or multistage separation devices may be employed. Said device or devices may include, but are not limited to, one or more or a combination of the following: binary distillation, azeotrope distillation, membrane distillation, mechanical vapor compression, hybrid systems, flash distillation, multistage flash distillation, multieffect distillation, extractive distillation, switchable solvent, reverse osmosis, nanofiltration, organic solvent nanofiltration, ultrafiltration, and microfiltration. For example, such a hybrid system may involve at least partially recovering the soluble reagent using nanofiltration and then further concentrating the soluble reagent using membrane distillation. Another example of such a hybrid system may be a process wherein a switchable solvent 'switches' out of solution due to the presence of a stimulant, such as a change in temperature, then nanofiltration is employed to further concentrate the switchable solvent or remove remaining switchable solvent in other solution. The switchable solvent or other reagent dissolved in solution may be further recovered or concentrated or even removed from the one or more layers or separate solutions that are formed.

Applied Pressure or Osmotic Pressure of Solution: The osmotic pressure range of the resulting water soluble reagent solution may be as low as 0.001 atm to as great as 1,000,000 atm. The osmotic pressure may be as low as less than any of the following: 0.001 atm, or 0.01 atm, or greater than or less than 0.05 atm, or 0.1 atm, or 0.2 atm, or 0.3 atm, or 0.4 atm, or 0.5 atm or 0.6 atm, or 0.7 atm, or 0.8 atm, or 0.9 atm, or 1 atm, or 1.1 atm, or 1.2 atm, or 1.3 atm, or 1.4 atm, or 1.5 atm, or 1.6 atm, or 1.7 atm, or 1.8 atm, or 1.9 atm, or 2 atm, or 2.1 atm, or 2.2 atm, or 2.3 atm, or 2.4 atm, or 2.5 atm, or 2.6 atm, or 2.7 atm, or 2.8 atm, or 2.9 atm, or 3 atm, or 3.5 atm, or 4 atm, or 4.5 atm, or 5 atm, or 5.5 atm, or 6 atm, or 6.5 atm, or 7 atm, or 7.5 atm, or 8 atm, or 8.5 atm, or 9 atm, or 9.5 atm, or 10 atm, or 12 atm, or 15 atm, or 18 atm, or 20 atm, or 22 atm, or 25 atm, or 28 atm, or 30 atm, or 35 atm, or 40 atm, or 45 atm, or 50 atm, or 55 atm, or 60 atm, or 65 atm, or 70 atm, or 75 atm, or 80 atm, or 85 atm, or 90 atm, or 95 atm, or 100 atm, or 150 atm, or 200 atm, or 500 atm, or 1,000 atm, or 10,000 atm, or 100,000 atm, or less than 1,000,000 atm, or pure solvent.

Using waste heat or chilling to accelerate or foster gas desorption and other hybrid waste heat and membrane recovery process combinations Solid precipitation and/or dissolution may occur throughout the process, including, but not limited to, due to changes in concentrations, concentrations, dissolved gas concentrations, pressures, temperature, other system conditions, or combinations thereof.

Mechanism used to separate one or more solutions may include, but are not limited to, one or more or a combination of the following: binary distillation, azeotrope distillation, mechanical vapor compression, membrane distillation, hybrid systems, flash distillation, multistage flash distillation, multieffect distillation, extractive distillation, switchable solvent, reverse osmosis, nanofiltration, organic solvent nanofiltration, ultrafiltration, and microfiltration One or more separation techniques employed in one or more embodiments may include but not limited to, one or more or a combination of the following: filtration, centrifuge, decanting, distillation, magnetism, and/or membrane based process, such as reverse osmosis, osmotically assisted reverse osmosis, disc tube reverse osmosis (DTRO), high pressure reverse osmosis, forward osmosis, electrodialysis, nanofiltration, organic solvent nanofiltration ultrafiltration, membrane distillation, integrated electric-field nanofiltration, hot nanofiltration, or hot ultrafiltration One or mor reagents may comprise one or more or a combination of the following: a soluble reagent, a water soluble reagent, an organic solvent, an organic reagent, a soluble organic reagent, a water soluble organic solvent, a soluble polymer, a water soluble organic reagent, a reagent containing carbon, a reagent containing carbon and hydrogen, a reagent containing carbon, hydrogen and oxygen, or a reagent containing hydrogen and nitrogen, a non-ionic reagent, a non-reactive reagent, a non-ionic water soluble reagent, non-reactive water soluble reagent, inert soluble reagent, inert water soluble reagent, or inert reagent.

Examples of waste heat sources include, but are not limited to, the following: Power Plant (Natural gas, coal, oil, petcoke, biofuel, municipal waste), Condensing water, Flue Gas, Steam, Oil refineries, Metal production/refining (Iron, Steel, Aluminum, etc.), Glass production, Manufacturing facilities, Fertilizer production, Transportation vehicles (ships, boats, cars, buses, trains, trucks, airplanes), Waste Water Treatment, Solar thermal, Solar pond, Solar photovoltaic, Geothermal (Deep Well), Biofuel powered vehicles, Biofuel/Biomass/Municipal Waste Power Plants, Desulfurization, Alcohol production, hydrogen sulfide treatment, acid (e.g. sulfuric) production, Renewable fertilizer production, Ocean Thermal, Space heating, Grey water, Diurnal temperature variation, Geothermal (Shallow well/loop), or respiration.

Heat or Cooling May be Applied at any Point of One or More Embodiments

Heat exchangers and recovery devices may be employed where advantageous.

nitrogen, oxygen, hydrogen, argon, methane, carbon monoxide, volatile hydrocarbons, such as ethane, butane, propane.

Mixing devices, include, but are not limited to, on or more or a combination of the following:
  a. ○ CSTR, Batch, Semibatch, or flash devices
  b. ○ Turbine
  c. ■ Rushton Turbine
  d. ■ Smith Turbine
  e. ■ Helical Turbine
  f. ■ Bakker Turbine
  g. ○ Low shear mixer, High shear mixer, Dynamic mixer, Inline mixer, Static mixer, Turbulent flow mixer, No mixer, Close-clearance mixer, High shear disperser, Static mixers, Liquid whistles, Mix-Itometer, Impeller mixer, Liquid-Liquid mixing, Liquid-Solid mixing, Liquid-Gas mixing, Liquid-Gas-Solid mixing, Multiphase mixing, Radial Flow, Axial Flow, Flat or curved blade geometry Embodiments may be heated or cooled. Heat sources may include, but are not limited to, waste heat, power plant waste heat, steam, heat, pump or compressor waste heat, industrial process waste heat, steel waste heat, metal refining and production waste heat, paper mill waste heat, factory waste heat, petroleum refining waste heat, solar heat, solar pond, air conditioner waste heat, combustion heat, geothermal heat, ocean or water body thermal heat, stored heat, and $CO_2(g)$ absorption solution heat.

Streams may comprise, including, but not limited to, one or more or a combination of the following phases throughout the integrated process: liquid, solid, liquid-solid slurry, liquid-solid mixture, gas, two-phase solution, three-phase solution, two-layer solution, or supercritical Streams or reagents may comprise one or more or a combination of the following: Aqueous solution, Water soluble polymer, Soluble polymer, Glycol Polyethylene Glycol, Polypropylene Glycol Ethers, Glycol Ethers, Glycol ether esters, Triglyme. Polyethylene Glycols of multiple geometries, Methoxypolyethylene Glycol, Polyvinyl Alcohol Polyvinylpyrrolidone, Polyacrylic Acid, Diol polymers, 1,2 propanediol, 1,2 ethanediol, 1,3 propanediol, Cellulose Ethers, Methylcellulose, Cellosize, Carboxymethylcellulose, Hydroxyethylcellulose, Sugar Alcohol, Sugars, Alcohols Ketones, Aldehydes, Esters, Organosilicon compounds, Halogenated solvents Additional Notes and Description #2

Background:

With the $CO_2$ partial pressure the specifications for gas processing, based on VLE modelling in the absorber and desorber, an aqueous ammonia acid gas separation unit with ammonia recovery described herein may operate with a temperature difference between the absorber and desorber of ~20° C., while also achieving greater than 250 PSIG $CO_2$ partial pressure in the acid gas desorber with 99.9% purity $CO_2$ (not taking into account the $H_2S$) exiting the process. Due to the ~20° C. temperature difference between the absorber and desorber, a heat pump, such as an electrical heat pump, may transfer heat generated by the absorber to power the desorber. An electric industrial heat pump may supply heat at a ~20° C. temperature difference with a practical coefficient of performance greater than 6. The lower complexity proprietary process may be the most economically applicable and the simplest to scale up for $CO_2$ enhanced oil recovery gas processing.

Overview:

The process may employ aqueous ammonia as an absorbent. There are four major process units: elevated temperature acid gas absorber, ammonia recovery technology, acid gas desorber, and heat pump between absorber and reboiler/desorber.

Key Advantages:

High Temperature in Absorber Prevents or Minimizes Condensation of Hydrocarbons from $CO_2$ EOR Gas Processing Gas Stream:

Background:

Under the conditions of most $CO_2$ EOR recycle feed gases, hydrocarbons may have due points as high as 80° C., or as high as 85° C., or as high as 90° C. or as high as 95° C. if most or almost all or all or combination thereof of the $CO_2$ is absorbed or removed from the gas stream. In prior art, $CO_2$ EOR gas processing generally requires three or more gas separation units to separate $CO_2$ from hydrocarbons and other impurities. In a prior art absorption column, the temperature of absorption is relatively low (for example: 20° C. for aqueous ammonia to 60° C. for aqueous amines). As a result, multiple stages are required, as hydrocarbons will problematically condense in the absorber if one or two gas separation units are employed because of the relatively low temperature of prior art absorbers.

Solution Described Herein:

The absorption column of one or more embodiments described herein may operate at temperatures above the due point of hydrocarbons in $CO_2$ EOR gas streams (for example: >90° C.). The process can absorb $CO_2$ under these conditions with >95% absorption efficiency and may undergo no degradation.

Small Temperature Difference Between Absorber and Desorber:

In the present version of the technology, the temperature difference between the absorber and reboiler is ~20° C. with >95% absorption efficiency and ~250 PSIG desorption $CO_2$ partial pressure. With such a small temperature difference, the desorption stage of the technology may be powered by heat extracted from the absorber using a heat pump.

High $CO_2$ Loading:

Unlike amines, aqueous ammonia-carbon dioxide can exist in solution as a 'bicarbonate' species. Based on vapor liquid equilibrium modelling, due to the high partial pressure of $CO_2$ in the feed gas stream, higher $CO_2$ loading/bicarbonate species solutions may form in both the lean and rich solutions with an 85-90° C. absorber temperature.

'Fast' Absorption Kinetics while Operating at a High $CO_2$ Loading:

Generally, post-combustion ammonia-based $CO_2$ capture technologies are unable to exploit bicarbonate formation because of low absorption kinetics and solid formation at lower temperatures. Due to the 'ultra-high' temperature of the absorber, the high partial pressure of $CO_2$ in the feed gas stream, and low energy consumption of ammonia recovery technology, the technology disclosed herein can absorb $CO_2$ at a higher $CO_2$ loading with 'fast' absorption kinetics, without the formation of solids (see 'gas-solid-liquid equilibrium data'). According to a study on the kinetics of absorption of $CO_2$ in aqueous ammonia, the kinetics of $CO_2$ absorption in 10 wt % aqueous ammonia at 30° C. is about equivalent to the rate of absorption of $CO_2$ in 30 wt % MEA at 40° C. at the same $CO_2$ loading. See Darde, et al—"*CO2 capture using aqueous ammonia: kinetic study and process simulation*", Energy Procedia Volume 4, 2011, Pages 1443-1450 incorporated herein by reference. Based on the exponential increase in absorption kinetics in aqueous ammonia with increasing temperature, the absorption of $CO_2$ at 85-90° C. will likely exhibit 'fast' absorption kinetics. There is no literature data on $CO_2$ absorption kinetics in aqueous ammonia above 30° C. As a result, one of our first steps will involve conducting high temperature absorption rate testing and compare with trends in literature.

High Purity, Relatively High Pressure Desorbed $CO_2$:

In the present version of the technology, the gas stream exiting the condenser comprises 99.8 mole % purity $CO_2$, with the remaining 0.2% comprising mostly water vapor.

Low CAPEX:

Simple Configuration:

The configuration of the acid gas separation technology may be similar to a conventional $CO_2$ capture technology, except for the heat pump between the absorber and desorber/reboiler.

Low Cost, Well-Known Reagents:

Aqueous ammonia is an ultra-low cost reagent. The compatibility of aqueous ammonia with various materials is well known.

No Degradation of Solvent:

Ammonia does not degrade in the presence of $CO_2$ or $H_2S$. Volatilized ammonia is recovered using ammonia recovery technology, which returns/recycles the ammonia to the acid gas separation process.

Ultra-Low Energy Consumption Ammonia Recovery:

Ammonia recovery technology recovers ammonia from ammonia-laden gas streams without the use of a steam stripper. Ammonia recovery technology uses 95-98% less energy to recover ammonia from ammonia laden gas streams compared to a steam stripper ammonia abatement cycle.

Low Enthalpy of Desorption:

Due to operating in the carbonate-bicarbonate speciation $CO_2$ loading range ('high $CO_2$ loading'), the heat of reaction may be as low as 0.615 MJ per kg $CO_2$ captured. Realistically, the enthalpy of desorption may be 0.8-1 MJ per kg $CO_2$ captured. This compares to greater than 3 MJ per kg $CO_2$ for amine systems or the chilled ammonia process.

Absorber top temperature can exceed the due point of hydrocarbons the impure $CO_2$ requiring reprocessing from $CO_2$ EOR, enabling separation of >95% of $CO_2$ in one process step.

Enthalpy of desorption of 0.8-1.2 MJ/kg $CO_2$ (vs. 3.7 MJ/kg for MEA)

~20° C. temperature difference between the absorber and the desorber (MEA acid gas removal generally requires 80° C.+ temperature swing)

Enables the process to be powered by a heat pump between the absorber and desorber. The heat pump may have a coefficient of performance of >6, enabling energy consumption less than $\frac{1}{6}^{th}$ the enthalpy of desorption (e.g. 0.15-0.2 MJ total energy consumption)

Enables very little energy in specific heat capacity (heating and/or cooling liquid between absorber and desorber)

Preliminary Modelling of Process with Heat Pump:

| Example Absorber Stream Compositions | |
| --- | --- |
| Summary | >95% absorption efficiency |
| | 92° C. absorber top temperature |
| | 87° C. absorber bottom temperature |
| Composition (Feed Gas) | $CO_2$: 0.9017 |
| | $N_2$: 0.0983 (representing both hydrocarbons and inert gases found in $CO_2$ EOR recycle feed streams) |
| | $H_2O$: 0.0015 |
| Temperature (Feed Gas) | 70° F. (21.11° C.) |
| Pressure (Feed Gas) | 17.1115 bar |
| Composition (Remaining Gases after Absorber, Before Ammonia Recovery Technology) | $CO_2$: 0.037 |
| | $N_2$: 0.0983 |
| | $H_2O$: 0.0062 |
| | $NH_3$: 0.0021 |
| Temperature (Remaining Gases after Absorber, Before Ammonia Recovery Technology) | 92° C. |
| Pressure (Remaining Gases after Absorber, Before Ammonia Recovery Technology) | 17 bar |
| Composition ($CO_2$-Lean Solution) | $NH_3$: 5.00 |
| | $CO_2$: 3.00 |
| | $H_2O$: 48.8 |
| Temperature ($CO_2$-Lean Solution) | 92° C. |
| Pressure ($CO_2$-Lean Solution) | 17 bar |
| Composition ($CO_2$-Rich Solution) | $NH_3$: 5.00 |
| | $CO_2$: 3.87 |
| | $H_2O$: 48.8 |
| Temperature ($CO_2$-Rich Solution) | 87° C. |
| Pressure ($CO_2$-Rich Solution) | 17.1115 bar |

Please Note:

The temperature of the absorber may remain relatively constant due to heat removal/extraction from the absorber using a heat pump. Heat recovery may involve internal absorber cooling, which may involve, for example, absorber packing or trays with channels or tubing for heat exchange/transfer fluid.

Please Note:

$H_2S$ is not included in the modelling. Based on literature data, $H_2S$ bonds with ammonia to form ammonium hydrosulfide or ammonium sulfide, both of which are easily reversible. Hydrocarbons are treated as inerts, which are modelled as '$N_2$' in the modelling software.

| Example Desorber Stream Compositions | |
| --- | --- |
| Summary | 99.9 mole % desorbed $CO_2$ purity |
| | 92° C. desorber top temperature |
| | 116° C. desorber bottom temperature |
| Composition (Desorbed $CO_2$ After Condenser, before Ammonia Recovery Technology) | 99.9 mole % $CO_2$ |
| | $CO_2$: ~0.87 |
| | $NH_3$: 0.0003 |
| | $H_2O$: 0.0016 |
| Temperature (Desorbed $CO_2$ After Condenser) | 20° C. |
| Pressure (Desorbed $CO_2$ After Condenser) | 17 bar |
| Composition ($CO_2$-Rich Solution) | $NH_3$: 5.00 |
| | $CO_2$: 3.87 |
| | $H_2O$: 48.8 |
| Temperature ($CO_2$-Rich Solution) | 92° C. |
| Pressure ($CO_2$-Rich Solution) | 17 bar |
| Composition ($CO_2$-Lean Solution) | $NH_3$: 5.00 |
| | $CO_2$: 3.00 |
| | $H_2O$: 48.8 |
| Temperature ($CO_2$-Lean Solution) | 116° C. |
| Pressure ($CO_2$-Lean Solution) | 17.2 bar |

Example Ammonia Recovery Technology Ammonia Recovery:

The present Ammonia Recovery Technology, may enable ultra-low energy consumption ammonia recovery from ammonia slip gases within aqueous ammonia $CO_2$ capture or acid gas removal technologies. Unlike steam stripper ammonia recovery processes, Ammonia Recovery Technology does not require high temperature heat input or the energy intensive enthalpy of vaporization of ammonia. Unlike acid scrubbing, Ammonia Recovery Technology returns ammonia to the $CO_2$ capture process in the same form employed within the $CO_2$ capture process, ammonia-carbon dioxide salt, and does not require consumable reagents.

By significantly reducing the energy consumption and cost associated with recovering ammonia from ammonia slip, Ammonia Recovery Technology enables an aqueous ammonia $CO_2$ capture process to operate with a significantly higher temperature absorber (for example: 40-55° C. absorber) compared to conventional aqueous ammonia $CO_2$ capture technologies (for example: 5-20° C. absorber). According to a study on the kinetics of absorption of $CO_2$ in aqueous ammonia, the kinetics of absorption of $CO_2$ in 10 wt % aqueous ammonia at 30° C. is about equivalent to the rate of absorption of $CO_2$ in MEA. See Darde, et al—"*CO2 capture using aqueous ammonia: kinetic study and process simulation*", Energy Procedia Volume 4, 2011, Pages 1443-1450 incorporated herein by reference. At 40-55° C., an example absorber operating temperature for one or more embodiments, the kinetics of $CO_2$ absorption in the aqueous ammonia solution employed in may be 1.5-3 times the kinetics of $CO_2$ absorption in MEA. The significantly faster absorption kinetics enable a smaller, lower CAPEX absorption column and smaller temperature difference between the absorption and desorption units. Additionally, if desired, the faster kinetics enable operation with higher $CO_2$ loading, allowing for further reductions in thermal energy consumption.

Ammonia Recovery Technology includes a $CO_2$ injection step, where $CO_2$ is injected into the ammonia-rich wash solution, resulting in the precipitation of ammonia-carbon dioxide (comprising mostly ammonium bicarbonate). The solid ammonia-carbon dioxide precipitate is separated from the aqueous ammonia lean solution, and transferred to the $CO_2$ capture process, returning ammonia from ammonia slip losses. The aqueous ammonia-lean solution is recirculated to the wash, where it is employed as the input ammonia-lean solution employed to absorb ammonia in the wash.

Ammonia Recovery Technology operates on the following unique operating principles, which enable its ultra-low operating cost and capital cost:

$CO_2$ Injection into Ammonia-Rich Water Wash Solution:

Enables Precipitation of Ammonia-Carbon Dioxide Species:

An aqueous ammonia-carbon dioxide solution rich in ammonia relative to carbon dioxide (for example: a $CO_2$ loading less than 0.67) exhibits very high water solubility. For example, ammonium carbonate ($CO_2$ loading of 0.5) has a water solubility of 100 g $(NH_4)_2CO_3$ per 100 mL of water at 20° C. On the other hand, ammonium bicarbonate ($CO_2$ loading of 1) has a water solubility of 21.6 g per 100 mL of water at 20° C. In the Ammonia Recovery Technology cycle, the aqueous ammonia concentration in the aqueous ammonia-rich wash solution may be ~5M $NH_3$(aq) derived species. By injecting biogas into the ammonia-rich wash solution, the solution becomes enriched with $CO_2$ and super saturated with ammonium bicarbonate, which precipitates from solution. The remaining solution after precipitation contains ~2.9M $NH_3$(aq) derived species, and is employed as the ammonia-lean wash solution in the ammonia absorber. The precipitated ammonium bicarbonate is transferred to the $CO_2$ capture technology as the ammonia return stream. As a result, Ammonia Recovery Technology captures $CO_2$ from biogas while also recovering the ammonia from ammonia slip.

Functions as Additional $CO_2$ Capture Capacity:

The $CO_2$ absorbed in the ammonia-rich wash solution is ultimately 'captured,' as it is returned to the $CO_2$ capture process along with the ammonia return stream.

Availability of $CO_2$ Sources On-Site:

The $CO_2$ source for the $CO_2$ injection into the ammonia-rich water wash solution may be $CO_2$ from biogas, natural gas, or emissions gas or pure $CO_2$ produced by the $CO_2$ capture process.

Significant Solubility Change of Ammonia-Carbon Dioxide with $CO_2$ Loading and Temperature:

Ammonia is Recovered without Requiring Heat Input of the Enthalpy of Vaporization:

Ammonia Recovery Technology returns ammonia to a $CO_2$ technology as ammonia-carbon dioxide solid. The energy for recovering this ammonia is the enthalpy of precipitation of the ammonia-carbon dioxide solid, which can be entirely supplied by ambient cooling sources, such as cooling water. In Ammonia Recovery Technology, recovering ammonia does not have a thermal parasitic load.

Competing ammonia abatement cycles recover ammonia and return it to an ammonia-based $CO_2$ capture technology using steam stripping. The energetic cost of steam stripping comprises the enthalpy of vaporization of water+the enthalpy of vaporization of aqueous ammonia, both of which require significant high temperature, high value heat input.

Significant Ammonia Recovery Cyclic Capacity Per Kg of Solution:

The precipitation process enables significant ammonia cyclic capacity and relatively fast ammonia recovery rates. About 2.1 moles of ammonia is recovered per kg of wash solution in Ammonia Recovery Technology operating with a 20° C. $CO_2$ injection precipitation stage and 20° C. ammonia wash input ammonia-lean solution temperature.

Returning Ammonia to the $CO_2$ Capture Cycle as Solid Ammonium-Carbon Dioxide Salt:

The Working Fluid in the $CO_2$ Capture Cycle is Aqueous Ammonia-Carbon Dioxide, the Same General Salt Composition as the Ammonia Recovery Technology Ammonia Return Stream:

Ammonia is returned to the $CO_2$ capture process as an ammonia-carbon dioxide salt, the same general salt composition as the salt in the $CO_2$ capture system's solution. The ammonia return stream composition as ammonia-carbon dioxide salt also has the added benefit of providing additional captured $CO_2$ with the returned ammonia, increasing the $CO_2$ capture rate per a unit of solution in the $CO_2$ capture system.

Example $CO_2$ Capture System:

Energy Consumption and CAPEX Reductions in FIG. 1 are Driven by the Following:

Ultra-Low OPEX and CAPEX Ammonia-Slip Recovery:

Ammonia Recovery Technology enables ultra-low energy consumption ammonia slip recovery and replaces the stream stripper ammonia abatement cycles currently employed in aqueous ammonia $CO_2$ capture.

OPEX:

Instead of steam stripping, Ammonia Recovery Technology leverages the use presence of $CO_2$ in the $CO_2$ capture solution to enable effective ammonia recovery from ammonia slip without requiring the formation of pure gaseous ammonia. Ammonia Recovery Technology returns ammonia to the $CO_2$ capture process as an ammonia-carbon dioxide-water solid precipitate, rather than as gaseous ammonia.

Competing ammonia $CO_2$ capture technologies expend about 35-50% of their thermal energy consumption on recovering ammonia from ammonia slip using a steam stripper. See FIGS. 4 and 5 on Page 1491—C. H. Rhee et al. Energy Procedia 4 (2011) 1486-1493 incorporated herein by reference.

CAPEX:

Ammonia Recovery Technology does not require a high CAPEX steam stripping unit. Ammonia Recovery Technology also reduces CAPEX within the $CO_2$ capture process, including through enabling a higher temperature, faster kinetics, smaller aqueous ammonia $CO_2$ absorber.

Higher Temperature Absorption Column Enabled by Ammonia Recovery Technology:

Unlike other aqueous ammonia $CO_2$ capture technologies, FIG. 1 employs a $CO_2$ absorber which operates at a relatively elevated temperature (For example: 40-55° C.), enabled by a version of Ammonia Recovery Technology.

Lower CAPEX:

According to a study on the kinetics of absorption of $CO_2$ in aqueous ammonia, the kinetics of absorption of $CO_2$ in 10 wt % aqueous ammonia at 30° C. is about equivalent to the rate of absorption of $CO_2$ in MEA. See Darde, et al—"*CO2 capture using aqueous ammonia: kinetic study and process simulation*", Energy Procedia, Volume 4, 2011, Pages 1443-1450 incorporated herein by reference. At 40-55° C., an example absorber operating temperature, the kinetics of $CO_2$ absorption in 10 wt % aqueous ammonia are 1.5-3 times the kinetics of $CO_2$ absorption in MEA. Greater absorption kinetics relative to MEA enables the absorption column to be significantly smaller and lower CAPEX than an MEA absorption column.

Lower OPEX:

The $CO_2$ capture process can operate a relatively higher $CO_2$ loading due to faster absorption kinetics, further reducing reboiler duty or energy consumption.

Lower Enthalpy of Desorption of $CO_2$ from Aqueous Ammonia-Carbon Dioxide Solutions Compared to Amine $CO_2$ Capture Solutions:

The $CO_2$ regeneration energy consumption of an aqueous ammonia $CO_2$ capture solution is about 70% less than an MEA $CO_2$ capture technology. See Table on Page 1488—C. H. Rhee et al. Energy Procedia 4 (2011) 1486-1493 incorporated herein by reference. Current ammonia $CO_2$ capture technologies cannot make effective use of this lower regeneration energy consumption because of the high energy consumption involved with ammonia slip recovery using a steam stripper. Competing ammonia $CO_2$ capture technologies expend about 35-50% of their thermal energy consumption on recovering ammonia from ammonia slip using a steam stripper. See FIGS. 4 and 5 on Page 1491—C. H. Rhee et al. Energy Procedia 4 (2011) 1486-1493 incorporated herein by reference.

What is claimed is:

1. A process for separating or recovering basic gases comprising:
   (a) absorbing ammonia from an ammonia containing gas stream into an ammonia-lean, an ammonia-ultra-lean, or ammonia free solution, to form an ammonia-rich solution;
   (b) enriching said ammonia-rich solution with one or more acid gases to form an ammonia-rich, acid gas rich solution; and
   (c) concentrating said ammonia-rich, acid gas rich solution using one or more membranes to form a first retentate and a permeate wherein said permeate is suitable for use as at
   least a portion of the ammonia-ultra-lean or ammonia-free solution in step (a); and
   d) adding said first retentate to a larger volume of ammonia-acid gas solution to form a first combined solution; and
   e) further concentrating said first combined solution using a membrane to form a second retentate and a second permeate wherein the second permeate comprises an amount of water that is the same or greater than an amount of water in the first retentate.

2. The process of claim 1 further comprising:
   using at least a portion of said second permeate as at least a portion of the ammonia-ultra-lean or ammonia-free solution in step a).

3. The process of claim 1 further comprising:
   precipitating an ammonia-acid gas salt from said second retentate e).

4. The process of claim 3 further comprising:
   removing at least a portion of said precipitate to form a solution.

5. The process of claim 4 further comprising:
   using at least a portion of said solution as the larger volume of ammonia-acid gas solution in d).

6. The process of claim 4 wherein said ammonia containing gas stream comprises one or more other basic gases.

7. The process of claim 4 further comprising absorbing an acid gas with the ammonia to form an acid gas rich, ammonia-rich solution.

8. The process of claim 7 wherein an acid gas is desorbed from said acid gas rich, ammonia-rich solution to form an acid gas lean, ammonia-rich solution and desorbed acid gas.

9. The process of claim 4 wherein the ammonia containing gas stream further comprises an acid gas.

* * * * *